US012641064B1

(12) United States Patent  
Wilson et al.

(10) Patent No.: US 12,641,064 B1  
(45) Date of Patent: *May 26, 2026

(54) AGENTIC ARTIFICIAL INTELLIGENCE (AI) SYSTEMS AND METHODS FOR SECURE, COMPLIANT, MULTI-AGENT LLM-ASSISTED NETWORKED COMMUNICATIONS

(71) Applicant: HAMACHI.AI, INC., Encinitas, CA (US)

(72) Inventors: Michael Wilson, Encinitas, CA (US); Eric Clarke, Omaha, NE (US); Brian McLaughlin, Mather, CA (US); Mustapha Baassiri, New York, NY (US)

(73) Assignee: HAMACHI.AI, INC., Encinitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/409,469

(22) Filed: Dec. 4, 2025

(51) Int. Cl.  
    *G06F 21/00*     (2013.01)  
    *G06N 5/043*     (2023.01)  
    *H04L 9/40*     (2022.01)

(52) U.S. Cl.  
    CPC ......... *H04L 63/0428* (2013.01); *G06N 5/043* (2013.01)

(58) Field of Classification Search  
    CPC ............................ H04L 63/0428; G06N 5/043  
    See application file for complete search history.

(56) References Cited

U.S. PATENT DOCUMENTS

| | | | | |
|---|---|---|---|---|
| 2025/0373428 | A1* | 12/2025 | Wang | H04L 9/3213 |
| 2025/0384162 | A1* | 12/2025 | Maiti | G06F 21/6245 |
| 2025/0384215 | A1* | 12/2025 | Pine | G06F 40/216 |
| 2026/0019379 | A1* | 1/2026 | Bhat | G06F 8/35 |
| 2026/0025438 | A1* | 1/2026 | Li | H04L 67/34 |

* cited by examiner

*Primary Examiner* — Ghazal B Shehni

(74) *Attorney, Agent, or Firm* — MARSHALL, GERSTEIN & BORUN LLP

(57) ABSTRACT

The present disclosure provides systems and methods for secure, compliant, context-driven electronic communications using an agentic AI platform. Within a server, modular AI bot components are dynamically instantiated, sequenced, and deallocated by a bot orchestration engine in response to workflow context extracted from inbound communication data. Computer-executable instructions stored in memory implement a multi-stage privacy pipeline including REGEX matching, NER, and locally retrainable SLMs language models to redact PII and other sensitive identifiers prior to further processing. The architecture incorporates parallel processing routines for privacy enforcement, context extraction, compliance evaluation, and agentic bot management. Composite prompts generated from bot outputs are supplied to downstream LLMs for draft creation. Generated drafts undergo post-processing and automated review for regulatory compliance by a compliance engine, while an audit log module records transactions for traceability and continuous system optimization.

30 Claims, 28 Drawing Sheets

300

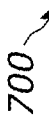

700

Outlook    Q Search

Home   View   Help   Link   Signature   Message   Insert   Pictures   Focused Text   Emoji   Table   Apps   Draw   Options   Scheduling pod Attach file > Favorites
> michaelwilsoninc@...
> mike@hamachi.ai
> mike@Hamachit.o...
> joe.jackson.wholes...

☑ Inbox
✐ Drafts
▷ Sent Items
🗑 Deleted Items
☐ Junk Email
☐ Notes
🗐 Archive
☐ Conversation History
☐ Outlook
🔍 Search Folder
👤 Shared with me
👥 Go to Groups
👤 Add account Focused   Other ∨ This month > ☐ Bob Wilson    Tue 9/4
Looking for Alternatives to
Hi Bob, Some of my client (AS) Alice Smith    Tue 9/2
Alternatives to fixed
Hi Bob, frequently got (EW) Ed Wilson    Tue 9/2
Looking for Alternatives to
Hi Bob, Some of my client (AS) Alice Smith    Tue 1/2
Looking for Alternatives to
Hi Bob, Some of my client (H) [Draft] Client    Tue 1/2
invitation to join
Your invitation to Hamachi (H) Hamachi    Tue 1/2
invitation to join
Your invitation to Hamachi Looking for Alternatives to Bored
Equity Exposure (AS) Bob Wilson
To: Jon Jackson Hi Jon, Some of my clients are worried
that simply telling the SAP 500
might not be the best way to
position themselves going
forward. They're asking if there
are approaches that can tilt
exposure toward areas of
opportunity without taking an
unnecessary risk.

Does Mars have anything that
would be a good for xxxx? It so,
how does it works and why would
it be good for xxxxx who want to
stay invested in equities but in a
more thoughtful way?

Thanks,

Bob

From: Jon.Jackson.@outlook.com ∨ ◈ ∧ ☒

To    Bob Wilson ×    Cc   Bcc

▷ Send ∨   ☐ Discard

---

⊕ Hamachi AI     ×

Conversation with   ↻
Bob Wilson    ✎

Draft Email

Thank you for reaching
out with your clients'
concerns regarding
broad S&P 500
exposure.

⚙ AI Assistant

↵ Reply

☐ What should your

Add key points,

+ Add items

Attach Files

Generate Reply

Cancel

FIG. 7

Figure 8:
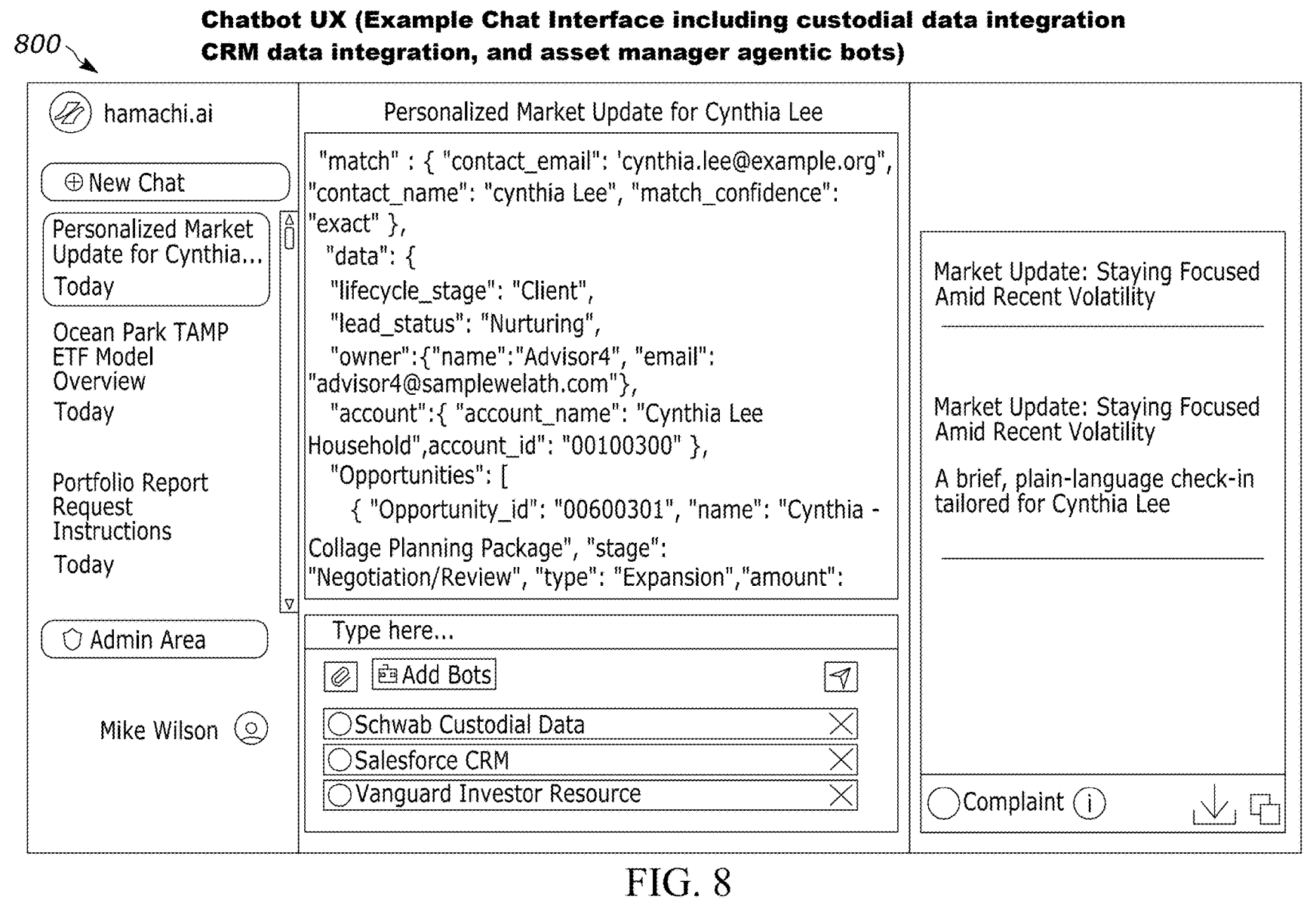

Chatbot UX (Example Chat Interface including custodial data integration CRM data integration, and asset manager agentic bots)

hamachi.ai

⊕ New Chat

Personalized Market Update for Cynthia... Today

Ocean Park TAMP ETF Model Overview Today

Portfolio Report Request Instructions Today

◇ Admin Area

◉ Mike Wilson

Personalized Market Update for Cynthia Lee

"match" : { "contact_email": "cynthia.lee@example.org", "contact_name": "cynthia Lee", "match_confidence": "exact" },
"data": {
  "lifecycle_stage": "Client",
  "lead_status": "Nurturing",
  "owner":{"name":"Advisor4", "email": "advisor4@samplewelath.com"},
  "account":{ "account_name": "Cynthia Lee
Household","account_id": "00100300" },
  "Opportunities": [
    { "Opportunity_id": "00600301", "name": "Cynthia - Collage Planning Package", "stage": "Negotiation/Review", "type": "Expansion", "amount":

Type here...

📎  ☷ Add Bots   ◁┃

◯ Schwab Custodial Data    ✕
◯ Salesforce CRM    ✕
◯ Vanguard Investor Resource    ✕

Market Update: Staying Focused Amid Recent Volatility

Market Update: Staying Focused Amid Recent Volatility

A brief, plain-language check-in tailored for Cynthia Lee

◯ Complaint  ⓘ

Hamachi AI ×

Conversation with
Bob Wilson ○ &

Composing Response

○

Anonymizing PII...

This may take a few
moments...

Cancel generation

✧ AI Assistant

Figure 11:
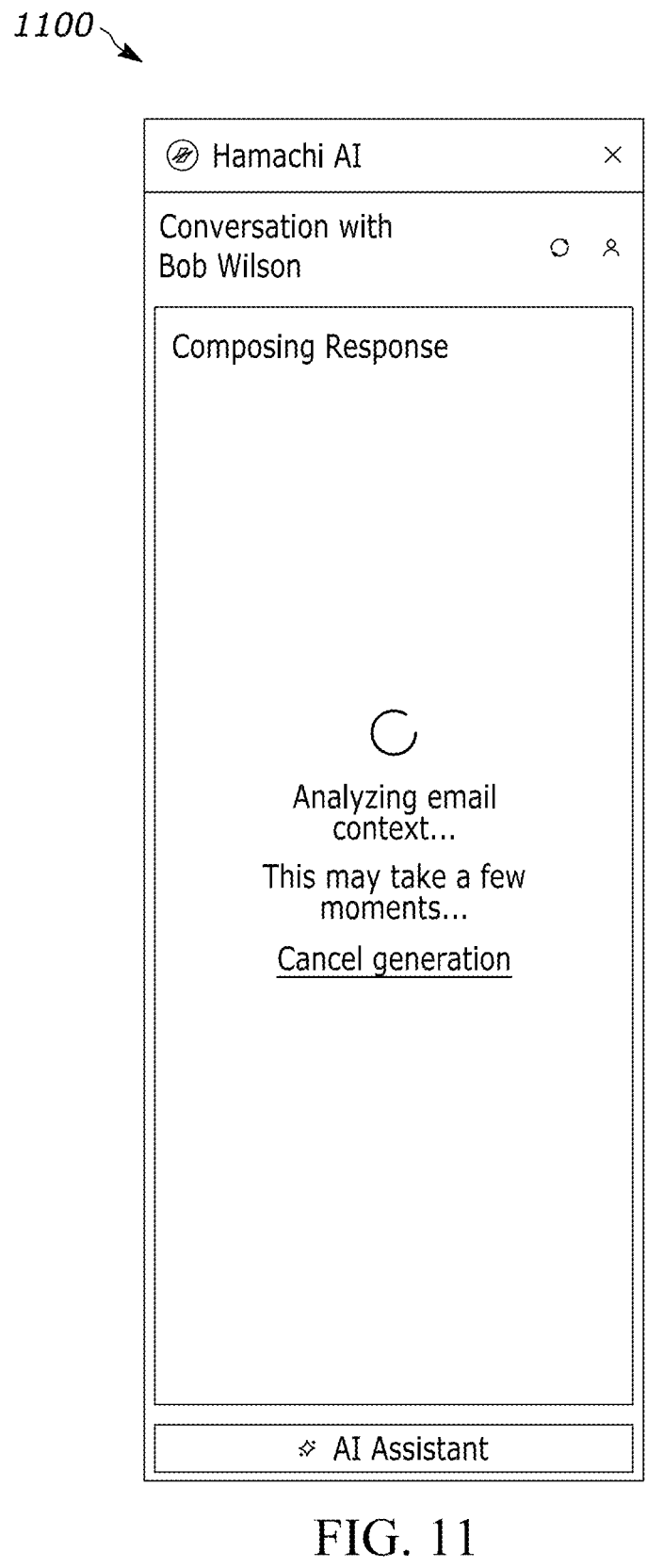

_1100_

Hamachi AI                                    ×

Conversation with
Bob Wilson                              ↻   ⚇

Composing Response

Analyzing email
context...

This may take a few
moments...

Cancel generation

✧ AI Assistant

Figure 12:
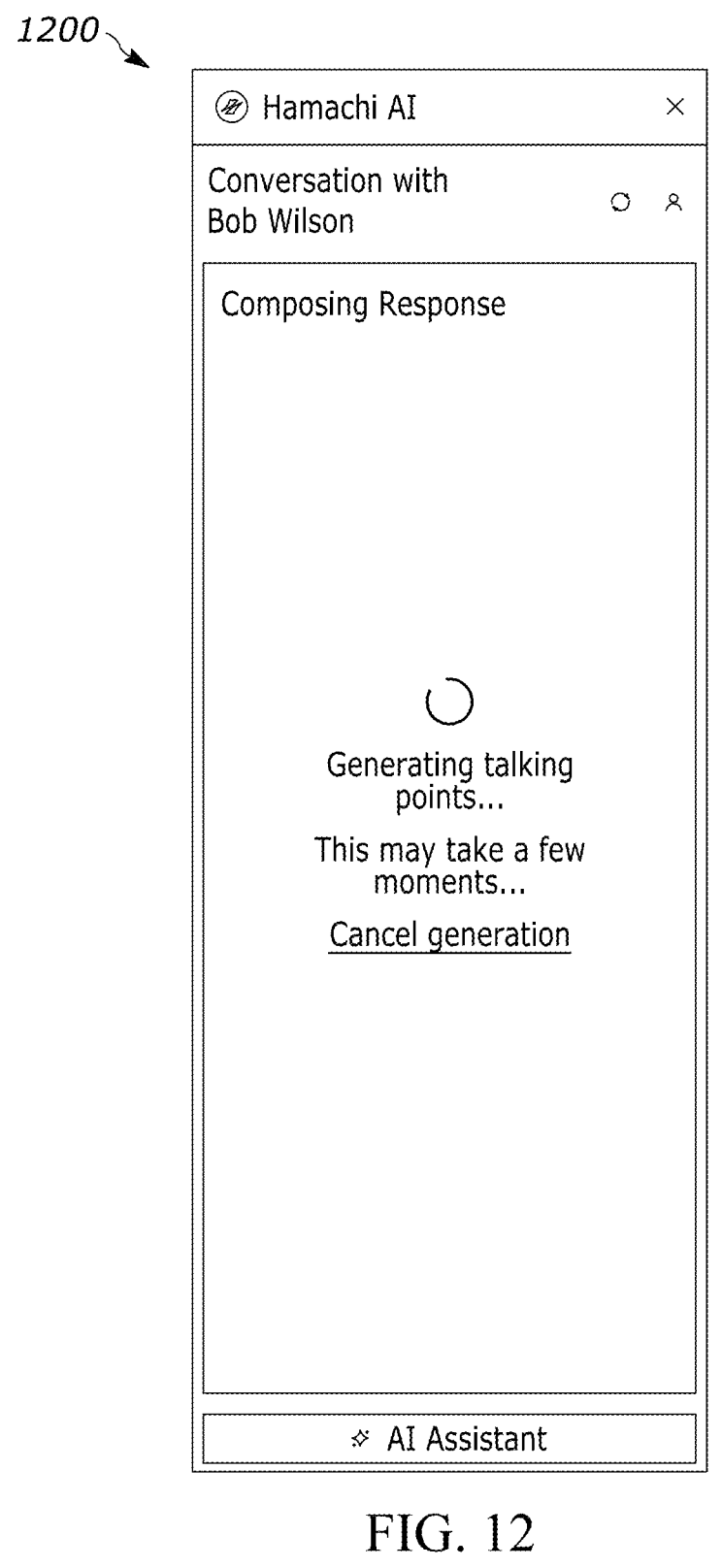

Hamachi AI                                    ✕

Conversation with                        ↺    ⚇
Bob Wilson

Composing Response

◯

Generating talking
points...

This may take a few
moments...

Cancel generation

✧ AI Assistant

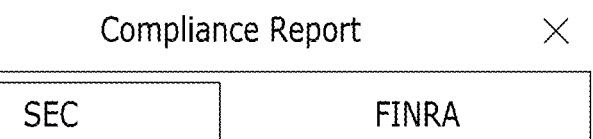

Compliance Report     ✕

| SEC | FINRA |
|-----|-------|

The email largely avoids explicit performance promises and uses factually descriptive language about strategy design. However, there are moderate compliance risks due to: (1) potential for implied performance claims without requisite disclosures, (2) omission of certain risks and limitations of the strategies, (3) lack of important disclosures regarding conflicts, fees, and compensation, and (4) generalized language implying superior risk or return outcomes which could be misinterpreted as guarantees or misleading for retail clients.

Key Violations:

| Medium | SEC Marketing Rule (Rule 206(4)-1 under the Advisers Act) |
|--------|-----------------------------------------------------------|

The language implies a level of performance optimization, risk reduction, and income generation that may lead clients to believe these outcomes are assured or highly probable. The SEC's Marketing Rule prohibits unsubstantiated claims or implying that a strategy is likely to achieve specific results unless the firm can substantiate them with adequate proof, and appropriate disclosures regarding risks, limitations, and variability of results must accompany such statements.

| Problematic Language |
|----------------------|
| aiming to optimize risk and return while retaining core equity e |

Compliance Report                    ✕

| SEC | FINRA |
|-----|-------|

The email contains unsubstantiated and potentially misleading performance claims, specifically the statement that a portfolio 'is going to return very well next year.' This represents a high- severity violation under the SEC Marketing Rule. Additionally, the marketing of hypothetical or model strategies requires prominent disclosures, which are missing. There is also insufficient discussion of risks, limitations, and potential conflicts related to the targeted strategies. The overall risk level is High due to the unqualified performance prediction.

Key Violations:

| High | SEC Marketing Rule (Rule 206(4)-1(a)(1), (a)(5)) |

This is an unsubstantiated and promissory performance claim. The SEC prohibits advisers from making statements that imply or guarantee certain future results, as these are inherently misleading unless based on specific, supportable, and prominently disclosed criteria. The statement creates a false sense of certainty about future performance and lacks required disclaimers and risk disclosures.

Problematic Language

This portfolio is going to return very well next year!

1900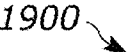

| × | Submit Correction |
|---|---|

Referenced from:
Growth_Model_Q2_FactSheet.pdf

| ASSEST | 00.00% | 00.00% | 00.00% | 00.00% | 00.00% |
|---|---|---|---|---|---|
| xxxxxxxx | 00.00% | 00.00% | 00.00% | 00.00% | 00.00% |
| xxxxxxxx | 00.00% | 00.00% | 00.00% | 00.00% | 00.00% |
| xxxxxxxx | 00.00% | 00.00% | 00.00% | 00.00% | 00.00% |
| xxxxxxxx | 00.00% | 00.00% | 00.00% | 00.00% | 00.00% |
| xxxxxxxx | 00.00% | 00.00% | 00.00% | 00.00% | 00.00% |
| xxxxxxxx | 00.00% | 00.00% | 00.00% | 00.00% | 00.00% |
| xxxxxxxx | 00.00% | 00.00% | 00.00% | 00.00% | 00.00% |
| xxxxxxxx | 00.00% | 00.00% | 00.00% | 00.00% | 00.00% |
| xxxxxxxx | 00.00% | 00.00% | 00.00% | 00.00% | 00.00% |

Extracted Text:
"The optimal allocation consists of 25% in Large Cap Growth Fund A as determined by our Q2 growth model analysis."

Current Sentence:

Our growth model consists of 25% in Large Cap Growth Fund A.

Corrected Sentence: *

Our growth model consists of 25% in Large Cap Growth Fund A.

Please make changes to the sentence to submit a correction.

Comment (Optional):

Let us know what went wrong or how we can improve.

| Cancel | Submit Correction |
|---|---|

| Subject | From | To | Date | Status |
|---|---|---|---|---|
| Re: Looking for Alternative to Broad Equity... | joe.jackson.wholesaler@Ha... | bob@Hamachi1.onmicrosoft... | 9/10/2025 | ⊘ Draft |
| Re: Looking for Alternative to Broad Equity... | joe.jackson.wholesaler@Ha... | bob@Hamachi1.onmicrosoft... | 9/4/2025 | ⊘ Used |
| Re: Looking for Alternative to Broad Equity... | joe.jackson.wholesaler@Ha... | bob@Hamachi1.onmicrosoft... | 9/4/2025 | ⊘ Draft |
| Re: Looking for Alternative to Broad Equity... | joe.jackson.wholesaler@Ha... | bob@Hamachi1.onmicrosoft... | 9/4/2025 | ⊘ Draft |
| Re: Exploring Creative Income Solutions for... | joe.jackson.wholesaler@Ha... | edward.grant.advisor@Ham... | 9/3/2025 | ⊘ Draft |
| Re: Exploring Creative Income Solutions for... | joe.jackson.wholesaler@Ha... | edward.grant.advisor@Ham... | 9/3/2025 | ⊘ Draft |
| Re: Exploring Creative Income Solutions for... | joe.jackson.wholesaler@Ha... | edward.grant.advisor@Ham... | 9/3/2025 | ⊘ Draft |
| Re: Exploring Creative Income Solutions for... | joe.jackson.wholesaler@Ha... | edward.grant.advisor@Ham... | 9/3/2025 | ⊘ Draft |
| Re: Exploring Creative Income Solutions for... | joe.jackson.wholesaler@Ha... | edward.grant.advisor@Ham... | 9/3/2025 | ⊘ Draft |

◉ Hamachi AI

⌂ Home

Administration
▢ General
⚲ Users
⚎ Parent Organization

Knowledge Base
⊙ About Your
   Organization
⚲ About you
▢ Communication Tone
▢ Documents AI Bots
⊕ Bot Marketplace
⚙ Custom Bots Audit and Compliance
⊙ Regulatory Status
▣ Generated Emails ▥ Home > Audit and Compliance    > Generated Emails Generated Emails
View and manage emails generated by the system 🔍 Search emails...    ▢ Search Archive Showing 1 to 9 of 9 results    Previous Page 1 to 1 Next

Main Management
Custom Bot Configuration

| Create | Configure | Publish |
|--------|-----------|---------|

Publication Settings
Control where and how your custom bot is available.

Status: ⊛ Live          Visibility: ⊕ Public

Public Bot
Make this bot available for use. You can control who
can access it below.    ⊂◯

Visibility
Choose who can discover and use your bot.

◯ ⚇ Organization Only
    Only members of your organization can see and use
    this bot.

◯ ⬡ Restricted Access
    Users need an access code to install this bot. Share
    the code with specific users or organizations.

◉ ⊕ Public
    Anyone can discover and install this bot from the
    Hamachi Bot Store.

Bot Appearance
Customize how your bot appears in the bot store.

| | Letters (1-3) | Background Color | Text Color |
|---|---|---|---|
| (MM) | MM | ■ #0e2648 | ☐ Default |

1-3 characters
for the avatar

⊚ This avatar will be displayed
   next to your bot in the bot store   ◯ Reset to Default

Chat with Hamachi

How can I help you today?

Show me my analytics for this month

Show analytics

Generate post

Type your message....

Welcome back, Sarah!
Here's what's happening with your insights

Your Insights In Action

| Total Users | Insights Used | Most Used Topic |
|---|---|---|
| 12,400 | 8,320 | Inflation Forecasts |
| ↑+15% this month | ↑+23% this month | 234 users this month |

Trending Conversations Themes

| Theme | Your Insights Used | Platform-Wide Used |
|---|---|---|
| Cryptocurrency | 340 | 12,500 |
| Inflation | 290 | 9,100 |
| Taxation | 215 | 7,800 |

Contribute to the Knowledge Base
Upload research reports, white papers, and insights for AI-powered distribution.

Drag and drop your files here, or browse
Supports PDF, DOCX, PPTX, TXT

| File Name | Type | Visibility | Uploaded On | Actions |
|---|---|---|---|---|
| Market Trends 2024.pdf | Market Outlook | Public | 03/10/2024 | Edit Delete |

⌂ Dashboard Home
⌾ Metrics & Engagement
⌾ Top Threads & Themes
⌾ Integrations
⌾ Upload Content
⚙ Settings

FIG. 23

AGENTIC ARTIFICIAL INTELLIGENCE (AI) SYSTEMS AND METHODS FOR SECURE, COMPLIANT, MULTI-AGENT LLM-ASSISTED NETWORKED COMMUNICATIONS

FIELD

The present disclosure is generally related to agentic artificial intelligence (AI) systems and methods, and more particularly, to agentic AI systems and methods for implementing secured networked communications.

BACKGROUND

Regulated industries face security and network-based communication challenges in managing and responding to client communications, particularly through email correspondence and/or other digital communications. Complexity in regulatory frameworks, elevated privacy risks, compliance risks, and highly variable client contexts contribute to persistent bottlenecks, excessive manual workload, and inconsistent message quality. Current communications systems predominantly employ isolated, non-integrated tools for handling email, customer relationship management (CRM), and compliance, yielding fragmented processes with minimal automation or contextual awareness. Tasks such as PII redaction, compliance review, and message drafting are largely manual or driven by simplistic rule-based methods, which are often inadequate for the nuanced requirements of regulated workflows.

While AI-assisted methodologies for message generation (e.g., the use of large language models (LLMs) have shown theoretical promise, actual implementations within these industries have proved inadequate. Most enterprises continue to rely on discrete, non-integrated software for email, customer relationship management (CRM), and compliance management, lacking any unified or automated process. Consequently, existing systems are deficient in several respects: they do not implement strong or adaptive privacy controls for handling PII, fail to produce context-aware or personalized message output, and provide little or no capability for continuous auditability or operational analytics.

SUMMARY

In one aspect, an agentic artificial intelligence (AI) bot system configured to implement secured networked communications includes: (1) a server including one or more processors and one or more memories; (2) a set of agentic AI bots each configurable for instantiation in the one or more memories of the server, each agentic AI bot accessible by the one or more processors of the server; (3) a bot orchestration engine configured to programmatically access the set of agentic bots; (4) an integration layer communicatively coupled to the bot orchestration engine and exposing one or more application programming interfaces (APIs) accessible, via a computer network, by one or more software platforms; and (5) computing instructions stored in the one or more memories that, when executed by the one or more processors of the server, cause the one or more processors to: (i) ingest, by the integration layer, a network communication via the computer network, the network communication generated for transmission between a client device and a software platform of the one or more software platforms, wherein the network communication includes platform data generated by the software platform; (ii) extract context data from the platform data, the context data including one or more data attributes of the network communication; (iii) dynamically select from the set of agentic AI bots, by the bot orchestration engine and based on the context data, one or more handler agentic AI bots detected as operable for the network communication; (iv) dynamically generate an engineered prompt for a large language model (LLM), wherein the engineered prompt includes one or more portions each generated as output by each of the one or more handler agentic AI bots; (v) generate, by providing the engineered prompt as input to the LLM, a draft output; (vi) analyze the draft output to identify omissions or errors; (vii) transmit the draft output to the client device; and (viii) receive feedback data from the client device, the feedback data defining updates or corrections to the draft output.

In another aspect, an agentic artificial intelligence (AI) bot system configured to implement secured networked communications includes: (1) a server including one or more processors and one or more memories; (2) a set of agentic AI bots each configurable for instantiation in the one or more memories of the server, each agentic AI bot accessible by the one or more processors of the server; (3) a bot orchestration engine configured to programmatically access the set of agentic bots; (4) an integration layer communicatively coupled to the bot orchestration engine and exposing one or more application programming interfaces (APIs) accessible, via a computer network, by one or more software platforms; and (5) computing instructions stored in the one or more memories that, when executed by the one or more processors of the server, cause the one or more processors to: (i) ingest, by the integration layer, a user-drafted network communication from the client device, wherein the user-drafted network communication includes platform data generated by the software platform; (ii) extract context data from the platform data, the context data including one or more data attributes of the user-drafted network communication; (iii) dynamically select from the set of agentic AI bots, by the bot orchestration engine and based on the context data, one or more handler agentic AI bots detected as operable for the user-drafted network communication; (iv) analyze the user-drafted network communication, by the one or more handler agentic AI bots, for compliance with one or more regulatory rules; (v) implement one of: (a) visibly flagging, by the one or more handler agentic AI bots, the user-drafted network communication as blocked or quarantined based on a determination that the user-drafted network communication fails to comply with one or more regulatory rules, whereby transmission of the user-drafted network communication is prevented until corrective action is taken, or (b) augmenting, by the one or more handler agentic AI bots, the user-drafted network communication to include modifications, required disclosures, or annotations necessary to bring the user-drafted network communication into compliance with the one or more regulatory rules, wherein the augmented user-drafted network communication is enabled for transmission to the client device; and (vi) receive feedback data from the client device, the feedback data defining updates or corrections to the user-drafted network communication.

In yet another aspect, a computer-implemented method configured to implement secured networked communications includes: (1) ingesting, by the integration layer, a user-drafted network communication from a client device, the user-drafted network communication including platform data generated by a software platform; (2) extracting context data from the platform data, the context data including one or more data attributes of the user-drafted network communication; (3) dynamically selecting, from the set of agentic AI bots, by a bot orchestration engine and based on the context data, one or more handler agentic AI bots detected as operable for the user-drafted network communication; (4) analyzing, by the one or more handler agentic AI bots, the user-drafted network communication for compliance with one or more regulatory rules; (5) implementing one of: (a) visibly flagging, by the one or more handler agentic AI bots, the user-drafted network communication as blocked or quarantined based on a determination that the user-drafted network communication fails to comply with one or more regulatory rules, whereby transmission of the user-drafted network communication is prevented until corrective action is taken, or (b) augmenting, by the one or more handler agentic AI bots, the user-drafted network communication to include modifications, required disclosures, or annotations necessary to bring the user-drafted network communication into compliance with the one or more regulatory rules, wherein the augmented user-drafted network communication is enabled for transmission to the client device; and (6) receiving feedback data from the client device, the feedback data defining updates or corrections to the user-drafted network communication.

In yet another aspect, a non-transitory computer-readable medium storing processor-executable instructions includes instructions that, when executed by one or more processors, cause the one or more processors to perform operations including: (1) ingesting, by the integration layer, a user-drafted network communication from a client device, the user-drafted network communication including platform data generated by a software platform; (2) extracting context data from the platform data, the context data including one or more data attributes of the user-drafted network communication; (3) dynamically selecting, from the set of agentic AI bots, by a bot orchestration engine and based on the context data, one or more handler agentic AI bots detected as operable for the user-drafted network communication; (4) analyzing, by the one or more handler agentic AI bots, the user-drafted network communication for compliance with one or more regulatory rules; (5) implementing one of: (a) visibly flagging, by the one or more handler agentic AI bots, the user-drafted network communication as blocked or quarantined based on a determination that the user-drafted network communication fails to comply with one or more regulatory rules, whereby transmission of the user-drafted network communication is prevented until corrective action is taken, or (b) augmenting, by the one or more handler agentic AI bots, the user-drafted network communication to include modifications, required disclosures, or annotations necessary to bring the user-drafted network communication into compliance with the one or more regulatory rules, wherein the augmented user-drafted network communication is enabled for transmission to the client device; and (6) receiving feedback data from the client device, the feedback data defining updates or corrections to the user-drafted network communication.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts an aspect of a particular aspect of the disclosed system and methods, and that each of the figures is intended to accord with an aspect thereof. Further, wherever possible, the following description refers to the reference numerals included in the following figures, in which features depicted in multiple figures are designated with consistent reference numerals.

The drawings illustrate examples of the present disclosure, which will be discussed in detail below. However, it will be understood that the embodiments described are not limited to the exact configurations and components shown in the figures.

FIG. 7 depicts an exemplary graphical user interface of an integrated email client and Hamachi AI assistant application, in accordance with various aspects herein;

FIG. 8 depicts an exemplary graphical user interface illustrating CRM integration and context data extraction within the Hamachi AI assistant application, in accordance with various aspects herein;

FIG. 11 depicts an exemplary graphical user interface of Hamachi AI-powered conversational assistant application, illustrating a session in which the assistant is analyzing email context and composing a response, in accordance with various aspects herein;

FIG. 12 depicts an exemplary graphical user interface of Hamachi AI-powered conversational assistant application, illustrating a session in which the assistant is performing prompt construction and composing a response, in accordance with various aspects herein;

FIG. 13 depicts an exemplary graphical user interface of Hamachi AI-powered conversational assistant application, illustrating a session in which the assistant is performing draft generation and composing a response, in accordance with various aspects herein;

FIG. 17A depicts a graphical user interface of a compliance report tool, illustrating analysis of an email for SEC guideline adherence, in accordance with various aspects herein;

FIG. 17B depicts an alternative embodiment of an exemplary graphical user interface for a compliance report tool, illustrating analysis of an email with a high-severity SEC violation, in accordance with various aspects herein;

FIG. 19A depicts an exemplary graphical user interface Hamachi AI-powered conversational assistant application, illustrating a feedback submission workflow for correcting extracted content in a referenced document by providing an inline annotation of a compliance warning in a draft, in accordance with various aspects herein;

FIG. 21 depicts an exemplary graphical user interface of an audit logging dashboard, in accordance with various aspects herein;

FIG. 22 depicts an exemplary graphical user interface for configuring and instantiating agentic AI bots, in accordance with various aspects herein;

FIG. 23 depicts an exemplary graphical user interface of an integrated analytics dashboard, in accordance with various aspects herein.

Figure 1:
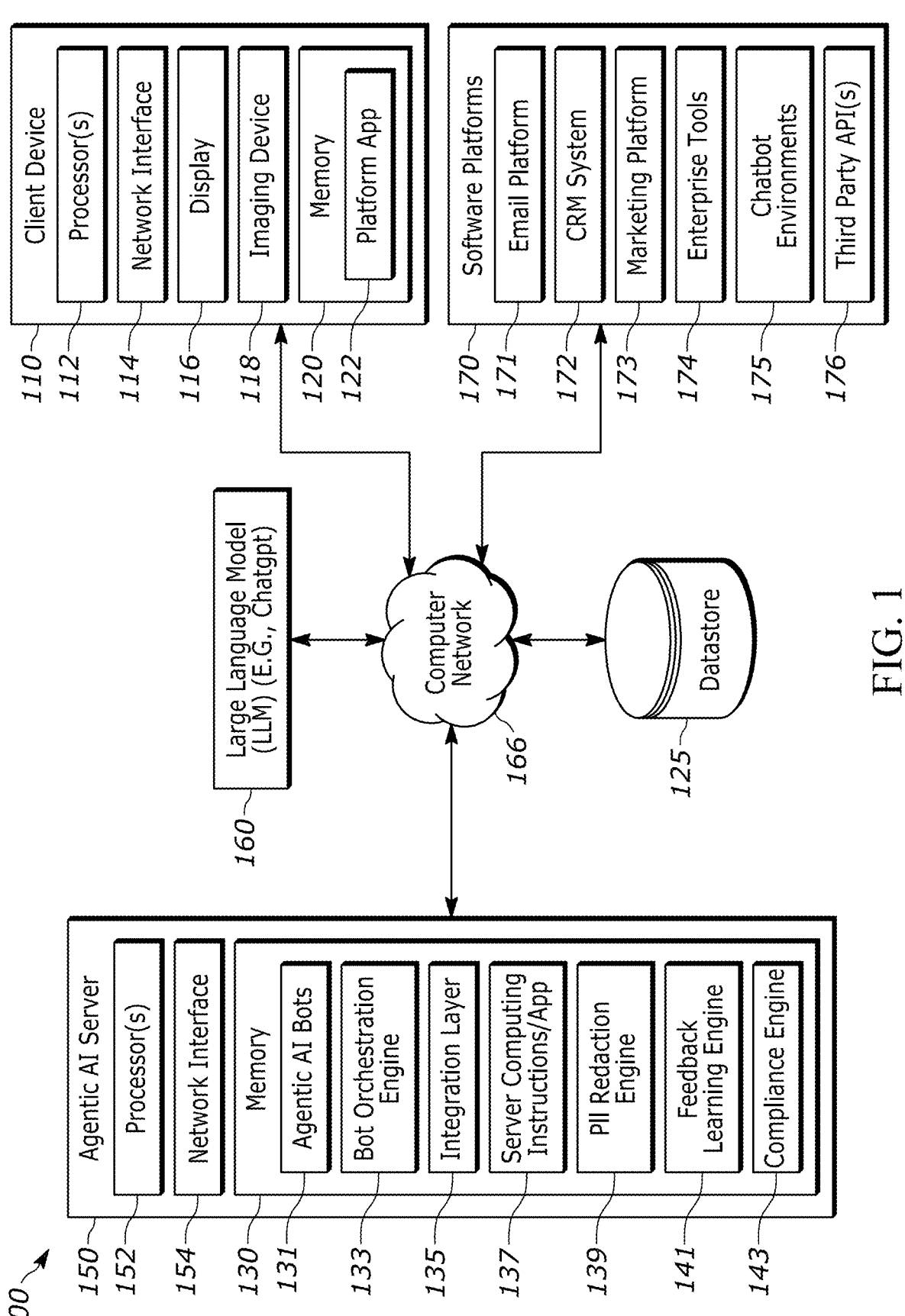
FIG. 1 depicts a block diagram of an example computing environment including a server device, in accordance with various aspects herein.

In the following description and figures, the term "Hamachi AI-powered conversational assistant application" (or "Hamachi™") may be used for illustrative purposes as an example name for an AI assistant platform implementing the described agentic AI systems and methods. All references to "Hamachi AI-powered conversational assistant application" or "Hamachi" should be understood as descriptive, non-limiting examples of the disclosed platform, and the invention is not restricted to any particular implementation name, product branding, or commercial deployment. Unless otherwise specified, uses of "Hamachi AI-powered conversational assistant application" or "Hamachi" in the detailed description and in any figure(s) are exemplary only.

In some embodiments, the disclosed AI-assisted communication platform may be referred to herein by terms term "Hamachi AI-powered conversational assistant application" (or "Hamachi™") may be used for illustrative purposes as an example name for an AI assistant platform implementing the described agentic AI systems and methods. All references to "Hamachi AI-powered conversational assistant application" or "Hamachi" should be understood as descriptive, non-limiting examples of the disclosed platform, and the invention is not restricted to any particular implementation name, product branding, or commercial deployment. Unless otherwise specified, uses of "Hamachi AI-powered conversational assistant application" or "Hamachi" in the detailed description and in any figure(s) are exemplary only.

The figures depict preferred embodiments for purposes of illustration only. Alternative embodiments of the systems and methods illustrated herein may be employed without departing from the principles of the invention described herein.

DETAILED DESCRIPTION

Overview and Advantages

The present disclosure is generally directed to agentic AI bot systems that improve secure, compliant, and context-driven communication workflows in regulated industries by overcoming longstanding limitations of legacy approaches. Conventional approaches typically rely on siloed, manual, and/or fragmented workflows, in which communications, CRM management, and compliance checks are handled by unintegrated tools, static template libraries, and/or rule-based processes with minimal contextual awareness. Such approaches generally require agentic AI bots to be persistently loaded in memory, resulting in inefficient resource use, excessive operational overhead, and lack customizable privacy and/or compliance controls, often exposing PII prior to proper redaction or audit. Notably, conventional approaches often conduct post-hoc, manual, or batch compliance reviews, which introduce delays, increase risk of non-compliant disclosure, and fail to reliably prevent the transmission of communications violating jurisdiction or entity policies.

In contrast, the present techniques help overcome these limitations by implementing a unified, programmable orchestration architecture that may integrate with trusted enterprise platforms (e.g., email, CRM, marketing, and/or chat platforms) via an API-enabled integration layer. Upon receiving native-platform data, the server computing instructions may transform and normalize this input into structured data suitable for downstream operations.

Furthermore, the present techniques realize operational advantages by implementing role-based orchestration logic, wherein handler agentic AI bots and compliance policies are selectively activated according to detected user identity, organizational role, and workflow context. Unlike conventional approaches that frequently rely on undifferentiated control schemes or static rule sets—thereby imposing uniform compliance logic across all users regardless of authority, responsibility, or jurisdiction—the present techniques facilitate dynamically granular assignment of bot functions and compliance thresholds matched to the compliance profile and operational responsibilities of each user or user group. For instance, communications initiated by compliance officers may programmatically trigger enhanced review modules, layered audit logging, and multifactor verification, thereby enforcing stricter oversight and traceability. Sponsor bot outputs may feature prioritized processing, customized branding, or differential disclosure logic reflecting entity-specific communication protocols. Similarly, end-user messages may invoke adaptive privacy filtering and tailored context enrichment contingent on detected user role or transaction type, assuring that every workflow segment receives the appropriate level of scrutiny and customization. This tiered, role-driven orchestration architecture enables organizations to align messaging, privacy, and compliance policies to granular organizational hierarchies and functional assignments, substantially reducing operational risk and improving defensibility in complex, multi-user, multi-tenant enterprise environments.

Unlike monolithic AI copilots, present techniques introduce a modular multi-agent orchestration layer that composes output from Sponsor Bots, Expert Bots, and Company Bots, each configured with domain-specific knowledge, policy constraints, and attribution requirements. This architecture enables composable intelligence while maintaining deterministic enterprise control over brand, compliance, and product messaging. A real-time compliance engine evaluates content against configurable policy rule sets (e.g., SEC, FINRA, FCA), applies disclosures, enforces attribution, and can block message transmission at send time to prevent non-compliant communications.

The present techniques further incorporate structured preprocessing that enable increased downstream model precision. Unlike conventional AI inputs, which rely on partially sanitized raw text, the present techniques may perform entity linking, placeholder harmonization, and context-aware anonymization prior to orchestration or model invocation. This preprocessing layer produces internally consistent data representations by enforcing persistent identifiers for people, firms, accounts, and/or financial entities. As a result, the present techniques reduce hallucination and ambiguity in generated content, maintain logical continuity across multi-turn communications, and constrain LLM reasoning to verified input context rather than inferred speculation. This in turn enhances reliability, reduces user correction effort, and improves safety when AI is used in professional communications. For example, the present techniques further incorporate programmable compliance gates that reference dynamic rule sets for regulatory enforcement at both pre-send and post-send communication stages. This stands in sharp contrast to conventional approaches that frequently relied on manual audit trails or batch compliance checks performed only after message transmission, which frequently latency and/or compliance risks. Here, compliance requirements (e.g., jurisdiction-specific, entity-defined, or platform dependent) are systematically evaluated prior to message approval and delivery, with non-compliant messages blocked, quarantined, or programmatically augmented (e.g., insertion of required disclosures or annotations) in accordance with real-time rule logic.

Additionally, by further including a feedback learning engine that ingests updated feedback and revises agentic AI bots and orchestration rules accordingly, the present techniques advantageously implement a closed-loop dynamic optimization absent in conventional approaches. As such, the present techniques implement continuous audit, feedback, and retraining cycles wherein user edits, compliance interventions, and operational outcomes may be aggregated and processed to refine privacy, orchestration, and compliance modules over time. This feedback learning enables adaptive learning from real-world data, improving privacy detection, reducing false positives/negatives in PII handling, and tuning compliance enforcement granularity as organizational or regulatory requirements evolve. This represents a significant advance over conventional approaches in the art, as legacy systems frequently fail to incorporate feedback-driven retraining, and as such, often exhibit declining efficacy as operational boundaries evolve in response to new threats or regulatory mandates.

Further, the present techniques improve upon existing communication systems by implementing agentic AI bots as modular microservices, programmatically accessible via APIs. In contrast to monolithic, or statically integrated bot architectures, the microservice configuration enables isolated deployment, independent version control, and granular security management for each agentic AI bot, reducing system complexity and vulnerabilities. This microservice approach further facilitates integration with heterogeneous platforms, supports parallel orchestration of distinct bot roles, and enables scaling or replacement of individual agentic AI bots to accommodate evolving business logic, compliance requirements, or operational loads. Unlike conventional approaches that frequently suffer from rigid update cycles and operational downtime when modifying bot logic, the present techniques allow for targeted microservices and horizontal scaling, maximizing system uptime, adaptability, and resource utilization across multitenant and geographically distributed deployments. Furthermore, because of this microservice approach, bots customized bots may be specialized for sponsor and/or user roles, and may be updated through APIs and/or microservice logic, supporting enterprise business objectives, regulatory protocols, and high-fidelity branding requirements.

Complementing the microservice architecture, the present techniques further implement a configurable bot store, which may be implemented as a secure, extensible marketplace supporting a variety of handler agentic AI bots (e.g., sponsor bots, expert bots, and company bots). Unlike static bot categories in legacy systems, the bot store architecture enables organizations and third parties to deploy branded and compliant agentic AI bots that can be dynamically updated, versioned, and orchestrated in real-time. Policy and access controls may enforce secure onboarding and lifecycle management, while dynamic configuration enables entities to tailor bot logic, compliance attributes, and contextual targeting to specific operational needs or regulatory regimes. Therefore, the bot store can support faster integration or newly developed or third-party components without platform downtime, facilitating continuous adaptation to evolving communication or regulatory requirements. As such, by integrating a bot store architecture, the present techniques advantageously enable organizations to maintain up-to-date, context-responsive messaging workflows and to scale branded compliance solutions across enterprise and partner environments-capabilities not feasible in prior static or manually provisioned architectures.

Moreover, the present techniques introduce a hierarchal prompt engineering subsystem within the bot orchestration engine, wherein engineered prompts for LLMs may be constructed by aggregating and layering outputs from dynamically selected handler agentic AI bots based on context specificity, regulatory constraints, and operational requirements. This approach enables the generation of composite prompts that may integrate multi-source contextual attributes, compliance logic, and entity preferences, yielding communication drafts that are both contextually optimized and regulation compliant. In contrast, conventional approaches typically employ static, prebuilt prompts or single-source context injection, failing to achieve dynamic adaptation to evolving user, client, and/or jurisdiction profiles, which result in uniform, unresponsive messaging workflows. Therefore, the disclosed hierarchal prompt engineering subsystem enables every engineered prompt utilized for LLM draft generation to better reflect and encapsulate the operational context, regulatory landscape, and feedback-derived optimizations, which in turn, yields higher fidelity outputs, risk mitigation, and real-time responsiveness across enterprise communication environments.

Notably, the present techniques implement multimodal compliance enforcement, wherein regulatory privacy, and policy gating may be applied across various formats of draft outputs (e.g., text, audio, graphical, and/or video), and across all communication channels. The bot orchestration engine may transform structured platform data into the appropriate modality for downstream handler agentic AI bots and LLMs, and the compliance engine may evaluate message compliance irrespective of transmission medium or output type. Conventional systems are typically limited to text-based compliance checks and fail to adapt enforcement for non-text modalities, resulting in inconsistent coverage and compliance vulnerabilities within omnichannel enterprise settings. However, by applying compliance logic in a modality-agnostic manner to all generated outputs, the present techniques enable consistent regulatory control, preserve continuity of auditability, and eliminate technical gaps that otherwise permit non-compliant communication in channels outside of traditional plaintext workflows. This advancement enables enterprise deployments to achieve operational and regulatory assurance in complex digital environments characterized by multi-format, cross-channel messaging.

Improvements to Underlying Technologies

Systems, methods, and techniques for controlling (e.g., for dynamic, context-dependent instantiation and operation) of agentic AI bot modules within a networked computing environment are disclosed. As used herein, the terms "agentic AI bots" and "bot orchestration engines," or alternatively "microservice agents," generally and categorically refer to software constructs and management routines that may persist on a server and may be configured as modular executables in system memory to control operational behaviors in ways that are measurable and detectable at the computing device layer. Conventional approaches typically rely on siloed, manual, and/or fragmented workflows, in which communications, CRM management, and compliance checks are handled by unintegrated tools, static template libraries, and/or rule-based processes with minimal contextual awareness. Such approaches generally require agentic AI bots to be persistently loaded in memory, resulting in inefficient resource use, excessive operational overhead, and lack customizable privacy and/or compliance controls, often exposing PII prior to proper redaction or audit. Notably, conventional approaches often conduct post-hoc, manual, or batch compliance reviews, which introduce delays, increase risk of non-compliant disclosure, and fail to reliably prevent the transmission of communications violating jurisdiction or entity policies.

In some embodiments, such bot and orchestration functions may be governed by input context data (e.g., workflow attributes, compliance requirements, and user role) and may be activated to generate outputs which are processable by enterprise communication systems. Examples of such context-aware operations include, for example, memory-efficient allocation of bots for compliance gating, processor-triggered creation of AI-generated message drafts, multilayered privacy redaction routines, and device-level audit logging. Further, preemptive control by the bot orchestration engine, which executes prior to message transmission or platform data export, serves as a technical safeguard to ensure privacy and regulatory compliance before data is exposed to network or external systems. Accordingly, with such preemptive, context-driven communication orchestration controls, the underlying computing device may dynamically optimize resource usage, prevent unauthorized data transmission, and maintain a higher standard of security and operational efficiency, thus overcoming the limitations of static, manual, or post-hoc conventional approaches.

Systems, methods, and techniques for dynamic, context-aware instantiation and deallocation of handler agentic AI bots within a networked server environment are disclosed. As utilized herein, the terms "handler agentic AI bots" and "bot orchestration engine" refer to programmatically managed microservice modules that operate onboard a computing device and are instantiated only when required by message-specific context, user role, or compliance requirements detected in incoming communication data.

Unlike conventional approaches, that statically instantiate all agentic AI bots or rigidly allocate resources regardless of active need, the present techniques dynamically select, instantiate, and deallocates handler agentic AI bots in memory according to message-specific context from each transaction. By structuring memory allocation around real-time context extraction from platform data, server resources are conserved and optimally allocated and/or activated for each transaction cycle. This advantageously yields measurable improvements in memory and/or computing efficiency, which may support complex enterprise and multitenant deployments without persistent agent overhead.

Moreover, the ability to dynamically instantiate and deallocate bots enables phased adoption and migration paths for legacy architecture, enabling users to implement new bot functionalities and compliance routines incrementally. New agentic AI bots may be introduced and validated in production settings alongside existing workflows, supporting organizational agility without requiring disruptive wholesale system migrations.

Systems, methods, and techniques for implementing a multi-stage privacy enforcement pipeline at the device level are disclosed. As utilized herein, the term "multi-stage privacy pipeline" refers to a sequence of processor-executed routines, including regular expression (REGEX) matching, named entity recognition (NER), and locally retrainable small language models (SLMs), on a computing device to parse, identify, and redact personally identifiable information (PII) and jurisdictionally restricted attributes at data ingress.

Unlike conventional approaches that rely on a single-stage or static redaction routine, the present techniques provide a technical improvement by enabling each configured stage of the privacy pipeline, whether a multi-stage sequence or an SLM-only implementation, to function as a gating mechanism. Incoming platform data is systematically cleansed before any further processing, context extraction, agentic-AI-bot instantiation, or delivery to downstream modules. In multi-stage embodiments, the pipeline may sequentially apply REGEX, NER, and SLM components; in SLM-only embodiments, a locally retrainable small-language-model performs all detection and redaction functions. This layered and configurable approach ensures sensitive data is intercepted and removed at the earliest opportunity, typically local to the device, before storage in memory or exposure to networked or external services.

The architecture further allows the SLM stage to be locally retrained in response to audit logs or feedback, supporting dynamic adaptation to new entity types, regulatory requirements, or organization-specific privacy needs. Legacy systems lack adaptive, multi-stage cleansing, and thus are prone to propagating unredacted or misclassified data through internal memory buffers or to external APIs, which results in an increased risk of data breach and reduced privacy compliance.

Through the enforcement of this multi-stage privacy pipeline at the initial integration layer, the system establishes a concrete, auditable processing boundary on the computing device. This approach not only improves regulatory compliance and device security but also reduces the platform's attack surface and ensures privacy protection in multitenant, multi-jurisdictional, or distributed deployments. This technical solution overcomes limitations of conventional post-hoc or static privacy models by integrating adaptive, device-level redaction as a core system function.

Furthermore, compliance operations (e.g., approval, blocking, redaction, bot orchestration logic, and applied feedback) may be persistently logged in an end-to-end audit trail. This continuously updated audit log enables better traceability for regulatory reporting, rapid incident response, or continuous system-level learning. These improvements surpass conventional approaches that depend on delayed, retrospective compliance enforcement. Moreover, the incorporation of post-send compliance further enhances the system's capacity to ensure downstream message integrity by enabling detection of unauthorized edits, omissions, or insertions that may occur outside the controlled drafting environment and are not captured by pre-send compliance checks. This functionality provides an additional layer of protection by automatically logging all detected discrepancies and triggering real-time alerts or escalation workflows, thereby strengthening auditability and regulatory accountability in a manner conventional approaches fail to.

Additionally, systems, methods, and techniques for feedback-driven dynamic optimization of agentic AI bots within computing environments are disclosed. As utilized herein, the terms "feedback learning engine" and "closed-loop retraining logic," or, in the alternative, simply "feedback engine," generally and categorically refer to components that operate on a server and are configured to aggregate, process, and apply user edits, compliance interventions, and operational outcomes to continuously update the functional logic of the agentic AI bots and orchestration engine in real-time. In some embodiments, the feedback learning engine that ingests and processes feedback data generated throughout the audit, compliance, and communication-handling workflows (e.g., edits made by users, automated compliance actions, and results of redaction and corresponding enforcement), allowing it to refine privacy, compliance, and orchestration parameters at the device layer. Through this architecture, the present techniques enable adaptive learning from real-world data, improving implement ongoing, automated retraining cycles that autonomously revises agentic AI bots, orchestration rules, and compliance behavior as operational context or regulatory requirements change, without requiring schedule downtime or manual rule modifications.

Furthermore, because the feedback learning engine is coupled to the orchestration logic and bot configuration, the present techniques enable adaptive, transaction-level learning from real-world data. As such, this yields improved PII classification accuracy (e.g., reducing both false positives and negatives in PII handling) and tunes compliance enforcement to match evolving operational demands. Accordingly, with continuous feedback-driven retraining, the present techniques enables levels of operational resilience and adaptability that are not feasible in conventional approaches in the art. as legacy systems are limited to static, manually-updated rules, and fail to incorporate feedback-driven retraining, and thus, often exhibit declining efficacy as operational boundaries evolve in response to new threats or regulatory mandates.

According to other aspects of the present disclosure, the systems and techniques for modular deployment and orchestration of agentic AI bots within computing environments are disclosed. As utilized herein, the terms "agentic AI bot microservices" and "API-accessible modular bots," or in the alternative, simply "microservice bots," generally and categorically refer to self-contained software agents deployed on a server, each instantiated as an independent process within system memory, and each programmatically accessible by one or more processors through defined APIs.

In contrast to monolithic or statically integrated bot architectures, the present techniques may implement agentic AI bots as modular microservices. In this approach, each bot may be deployed, updated, or replaced independently within the server memory, supporting independent version control, and enabling granular security enforcement. This microservice approach further facilitates integration with heterogeneous platforms, as the system may interact with a variety of enterprise environments via API-driven interfaces. As such, individual microservice bots may be scaled, updated, or replaced in response to evolving business logic, compliance requirements, or operational loads, all without requiring downtime for the overall platform. Furthermore, each agentic AI bot may be customized in real-time for specific user or sponsor roles via targeted API interactions and/or microservice updates. By enabling decentralized, context-aware bot management and eliminating the constraints of centralized process control, the present techniques maximize operational uptime, enhance adaptability, and optimize resource utilization across multitenant and geographically distributed deployments.

Moreover, the present techniques introduce systems, methods, and techniques for hierarchal prompt engineering subsystem within agentic AI bot orchestration engines are disclosed. As utilized herein, "hierarchical prompt engineering subsystem" and "composite prompt generator," or, in the alternative, simply "prompt subsystem," generally and categorically refer to device-resident components that operate within the bot orchestration engine and are configured to construct prompts for LLMs by aggregating and sequencing outputs from dynamically selected handler agentic AI bots.

In some embodiments, this prompt engineering approach enables the generation of composite prompts by integrating multi-source contextual attributes, compliance logic, and entity preferences, according to detected operational context, regulatory requirements, user or system-specific attributes. Real-time construction of these tailored prompts ensures that LLM-generated drafts are optimized for both content and compliance, adapting effectively to the demands of each communication instance. Unlike conventional techniques that frequently rely on static, prebuilt prompts, and/or single-source context injection, which result in generic, inflexible, or unresponsive messaging, the described hierarchical subsystem enables the system to produce outputs that evolve in step with changing requirements, regulatory conditions, and feedback. This capability results in messaging that is better aligned with compliance standards and user needs, representing a concrete technical advance over earlier, less adaptable approaches to prompt engineering.

Furthermore, the present techniques include systems, methods, and techniques for modality-agnostic compliance enforcement within agentic AI orchestration frameworks. As utilized herein, "modality-agnostic compliance enforcement" and "channel-independent policy gating," or, in the alternative, "multiformat compliance subsystem," generally and categorically refer to device-resident components configured to apply regulatory privacy controls and compliance logic across all output formats (e.g., text, audio, graphical, and video) regardless of communication channel. The bot orchestration engine may transform structured platform data into the appropriate modality for downstream handler agentic AI bots and LLMs, and the compliance engine may evaluate message compliance irrespective of transmission medium or output type. Unlike conventional approaches, which are typically limited to text-based compliance checks, which leave other modalities potentially unprotected and create vulnerabilities in omnichannel deployments, the present techniques apply enforcement procedures to every communication format. This yields uniform regulatory control, uninterrupted auditability, and mitigates risks for non-compliance transmission in non-text environments. This advancement enables a system that better delivers operational assurance in deployments engaged in complex, multiformat, cross-channel messaging workflows.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

Example System

FIG. 1 presents a system architecture for an agentic AI framework 100, which includes a client device 110 and agentic AI server 150, interconnected via computer network 166. Client device 110 comprises processor(s) 112, network interface 114, display 116, imaging device 118, memory 120, and a platform app 122 designed for platform integration and server communication. Agentic AI server 150 comprises processor(s) 152, network interface 154, and memory 130 storing executable instructions for agentic AI bots 131, bot orchestration engine 133, an integration layer 135, server computing instructions 137, a PII redaction engine 139, feedback learning engine 141, and compliance engine 143. The agentic AI server 150 interfaces with a datastore 125 for persistent data storage, communicates with a LLM 160 for advanced language processing, and connects to a range of software platforms 170, including an email platform 171, CRM system 172, marketing platform 173, enterprise tools 174, chatbot environment 175, and third party API(s) 176. Computer network 166 may establish bidirectional dataflows among all components, enabling secure, automated, and context-adaptive communication flows and data management within the agentic AI framework 100.

At a high level, the agentic AI framework 100 may begin its operation by receiving a network communication from client device 110 (equipped with platform equipped with platform app 122) and/or software platforms 170. As used herein, the term "software platform," may include, inter alia, any enterprise or third-party application, system, or downloadable add-in that generates, transmits, receives, or stores communications or data integrated into the agentic AI framework 100, including but not limited to cloud-based software-as-a-service (SaaS) solutions, desktop or mobile applications, enterprise resource planning (ERP) systems, downloadable plug-ins, or on-premises CRM/email/collaboration systems.

"Platform data" may further comprise, inter alia, all structured and/or unstructured data objects, records, files, messages, logs, attachments, metadata, and workflow artifacts created, managed, and/or executed by software platform, including but not limited to communications, account information, transaction records, user profiles, workflow triggers, activity logs, policies and/or related artifacts. In some implementations, platform data may comprise regulated or sensitive information, including but not limited PII, financial records, communication histories, and/or regulated client interactions, and be subject to jurisdiction-specific privacy controls and preprocessing prior to downstream AI handling.

Integration layer 135 of agentic AI server 150 may ingest these network communications and structured or unstructured platform data from a range of integrated software platforms, including but not limited to email platform 171, CRM system 172, marketing platform 173, enterprise tools 174, chatbot environment 175, and third party API(s) 176. Ingested data may arrive in native platform formats (e.g., HTML email or CRM JSON objects), and integration layer 135 may perform secure API acquisition, initial authentication, integrity validation, consistency checks, and normalization to a structured internal schema suitable for downstream context extraction.

Figure 14:
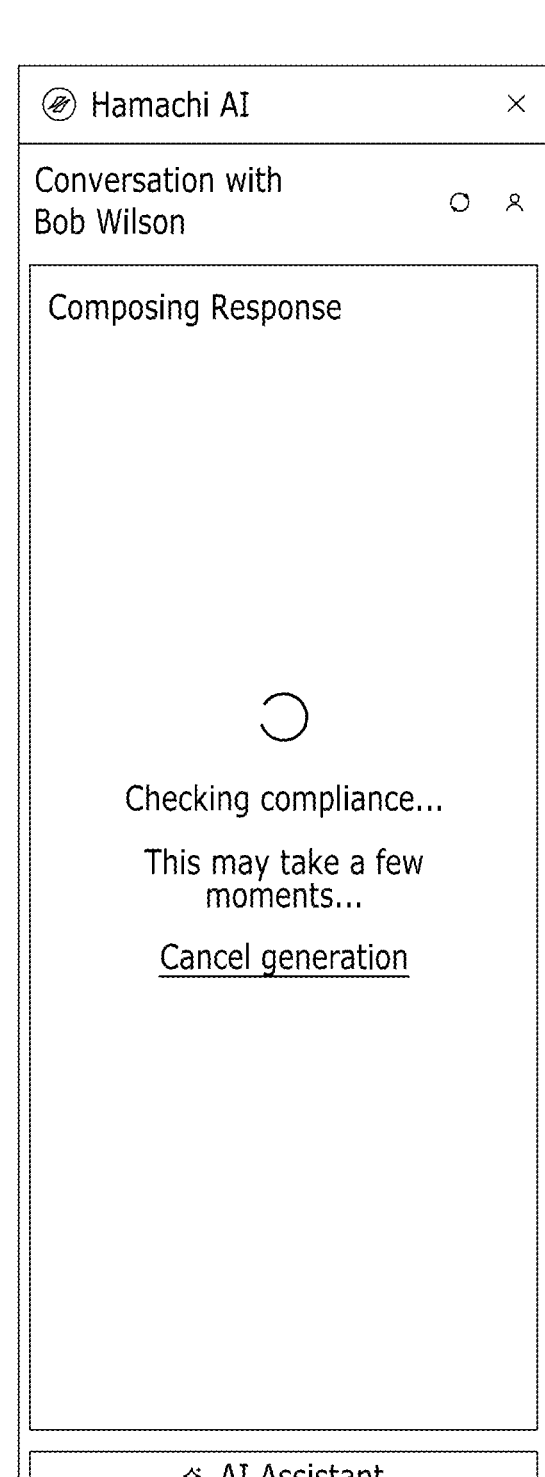
FIG. 14 depicts an exemplary graphical user interface of Hamachi AI-powered conversational assistant application, illustrating a session in which the AI assistant is performing compliance checking and composing a response, in accordance with various aspects herein.

Following ingestion and normalization, the communication may be transmitted to PII redaction engine 139. PII redaction engine 139 may employ a multi-stage privacy processing pipeline: first using REGEX matching to detect standard identifiers, next applying named entity recognition (NER) to identify names and organizations in content or headers, and then invoking a retrainable small language model (SLM) to detect and redact ambiguous or context-dependent PII. The configuration, thresholds, and detection logic for each stage of the PII redaction pipeline described herein may be dynamically parameterized based on detected user role (e.g., advisor, client, administrator), firm-specific policies, and applicable jurisdictional regulations, ensuring privacy enforcement aligns with operational context and legal requirements. As depicted in GUI 1400, FIG. 14 provide a graphical user interface for configuring multi-stage privacy controls within PII redaction engine 139, enabling administrators to adjust detection thresholds for REGEX matching, NER models, and SLM components on a per-jurisdiction or per-client profile basis, thereby supporting granular privacy enforcement tailored to specific regulatory requirements or organizational policies.

For example, in the communication "Jack from Evergreen Wealth is transferring $250,000 from his IRA at Fidelity into a Roth IRA this quarter. Please send documents to john.smith@clientco.com," a REGEX subroutine may detect and redact explicit monetary values and account references (e.g., "$250,000," "IRA"). In some embodiments, a NER subroutine may resolve contextual may identify and mark firm and institution names (e.g., "Fidelity," "Evergreen Wealth"). However, only the SLM subroutine resolves that "Jack" and "john.smith@clientco.com" refer to the same individual and applies consistent entity placeholders to preserve reference continuity (e.g. replacing both with [PERSON_1]). Furthermore, if the communication matches FINRA Rule 3110 criteria (Supervision of Communications), PII redaction engine 139 may elevate risk classification, trigger stricter masking (e.g., full entity redaction), and may require supervisory routing prior to downstream processing. In other embodiments, PII redaction engine 139 may apply jurisdiction-aware anonymization rules (e.g., masking firm names in EEA regions where MiFID II privacy guidance restricts cross-referencing of identifiable investment entities).

PII redaction engine 139 may perform entity linking to associate multiple references, aliases, or nicknames to a single entity, as well as account attribution that maps detected PII to specific user, client, or account records when available. The SLM may further perform placeholder harmonization, ensuring that all redacted tokens for a given entity are replaced throughout the communication with a consistent placeholder (e.g., all variations of "Bob," "Robert Wilson," and "bob.w@example.com" become [REDACT-ED_BOB]). This entity consistency is critical for downstream reliability, as it prevents the system or any downstream AI model from inferring that multiple aliases refer to separate individuals, which could otherwise lead to logic errors, privacy leakage, or incorrect compliance outcomes. By normalizing entity references before orchestration, the system maintains conversational coherence and enables deterministic behavior during multi-agent processing and prompt construction. This structured entity representation reduces hallucination risk and constrains LLM reasoning to verified contextual anchors rather than latent pattern inference.

PII redaction engine 139 may redact all detected PII and replace it with neutral placeholders. PII redaction engine 139 may log every redaction event at the message level in memory 130 or datastore 125 for audit and compliance tracking. The system then performs context extraction, parsing sender roles, message thread history, workflow triggers, and relevant metadata for downstream orchestration.

In some embodiments, PII redaction engine 139 may implement a reversible tagging mechanism wherein each detected PII element may be substituted with a unique placeholder token or "smart tag" (e.g., [PI_PERSON_1], [PI_EMAIL_2]) at the time of redaction. These smart tags may be consistently propagated across all downstream processing stages, including, inter alia, context extraction, engineered prompt generation, agentic AI bot orchestration, and LLM inference to ensure referential and contextual continuity without exposing the underlying identifiers. Upon completion of all AI-based processing routines, a secure re-association operation is performed within the same governed execution environment, rejoining the original PII values to their corresponding smart tags by referencing tag-to-value mappings maintained exclusively in protected memory or datastore 125. At no point do the tag-to-value mappings exit the privacy boundary or become accessible to external modules, thereby maintaining strict privacy isolation while permitting accurate and deterministic reinsertion of sensitive content for authorized user display, outbound communication, or compliance audit logging.

The resulting enriched context vectors may be provided to the bot orchestration engine 133. Based on operational context, eligibility logic, and workflow rules stored in a bot store registry, bot orchestration engine 133 may dynamically select and instantiate a subset of handler agentic AI bots 131 in memory 130. Each agentic AI bot may retrieve custom sponsor content, active compliance policy, or user personalization data from datastore 125 or external sources as appropriate. Outputs from the subset of agentic AI bots (e.g., sponsor, expert, company, or other handler agentic AI bots) are aggregated, sequenced, and normalized into an engineered prompt that encodes compliance, sponsor, historical, and personalization fragments for downstream processing by LLM 160.

The engineered prompt may be supplied to LLM 160 (e.g., an enterprise instance of GPT or similar), which may generate candidate draft output (e.g., a compliant investment proposal, personalized meeting follow-up, or automated customer support reply). Compliance engine 143 may then perform automated draft evaluation, applying firm, jurisdictional, and product-specific rule sets (e.g., NDA requirements, state-mandated disclaimers, or sponsor directives). In some embodiments, compliance engine 143 may perform rule enforcement and gating functions, whereas feedback learning engine 141 is dedicated to non-blocking, adaptive optimization. The feedback learning engine 141 may analyze historical compliance decisions, user edits, and override patterns to refine orchestration eligibility, model prompts, or disclosure templates without altering immediate compliance outcomes.

As described herein, feedback learning engine 141 does not override, veto, or otherwise modify compliance engine 143's gating determinations in real-time. Rather, all feedback learning adjustments are applied only to subsequent cycles, ensuring strict temporal separation between compliance enforcement and non-blocking optimization. In some embodiments, the LLM 160 receives only privacy-preserved, placeholder-substituted content rather than raw PII, such that model inference is performed exclusively over redacted tokens and structured context features, and the original PII values remain isolated and resolvable only within the secure reversible tagging subsystem.

Non-compliant drafts may be automatically blocked, quarantined, or augmented with required language or missing disclosures before approval. The validated draft is then transmitted back to client device 110, where the user may review, edit, personalize further, or submit feedback (e.g., revised verbiage, updated sponsor content, or compliance corrections). These user edits are ingested by agentic AI server 150, processed by feedback learning engine 141, and used to incrementally retrain agentic AI bots 131 (such as refining sponsor modules for changing marketing requirements or tuning personalized bots for evolving user communication patterns). All actions may be persistently logged to datastore 125, supporting complete auditability, workflow optimization, and continuous system learning required for regulated industry operations.

Client device 110 may comprise a computing device configured to facilitate secure, interactive communication workflows within the agentic AI framework 100. Client device 110 may include processor(s) 112, memory 120, network interface 114, display 116, imaging device 118, and optional input/output (I/O) peripherals.

Platform app 122 may comprise a software application or integrated module residing in memory 120 of client device 110, configured to manage user engagement and communication workflows with agentic AI server 150 via computer network 166. Platform app 122 may operate as an enterprise email client, customer relationship management (CRM) system, secure messaging interface, collaboration suite, or custom regulatory workflow utility, with operational logic supporting authenticated connection, message assembly, and compliance-driven transmission. Platform app 122 may instantiate interfaces for drafting, editing, reviewing, and submitting communication records (e.g., the entry and validation of message content, recipient information, file attachments, workflow context labels, and supporting media) via imaging device 118. For example, platform app 122 may provide an assembly interface within Microsoft Outlook (e.g., GUI 700 of FIG. 7), a CRM module for onboarding entries (e.g., GUI 800 of FIG. 8), or a marketing campaign drafting dashboard, each via display 116.

Platform app 122 may enforce compliance requirements by integrating local validation routines and prompting users to review metadata, compliance status indicators, or redaction warnings prior to submission. Prior to transmission, platform app 122 may tag or temporarily mask known PII in outbound communications and trigger automated PII detection and redaction workflows, routing content for multi-stage processing by PII redaction engine 139 on agentic AI server 150, where REGEX matching, named entity recognition, and small language model routines may be sequentially applied. Furthermore, platform app 122 may manage revision histories for unsent drafts, log user edits and annotation actions locally, enforce session authentication and role-based privilege regimes, and synchronize context and record state with integration layer 135 and agentic AI server 150. Each communication or workflow record processed by platform app 122 may be stored in datastore 125 alongside compliance results, revision versions, user feedback, and action logs, enabling retention and reporting for regulatory or administrative review. Platform app 122 may be configurable according to enterprise privacy, workflow, and compliance protocols, governing user access, message handling, and security for all communications within agentic AI framework 100.

Datastore 125 may comprise computer-readable storage configured to organize, archive, and enable retrieval of communication records, compliance state logs, and workflow data generated throughout the agentic AI framework 100. For example, the datastore 125 may store platform data received from the integration layer 135, redacted message content from the PII redaction engine 139, structured context vectors produced by server computing instructions 137, compliance evaluation results from compliance engine 143, engineered LLM prompts, draft message versions, user edits, and post-send transmission metadata compliance findings. In relation to method 250, the datastore 125 may be used to persist detailed audit log entries as illustrated by FIG. 21, which depicts an exemplary graphical user interface of an audit logging dashboard comprising a plurality of audit log data. Further, datastore 125 may be used to persist compliance scoring outputs from step 254, compliance decision outcomes from decision 256, user review actions at step 258, post-send transmission metadata at step 262, and post-send compliance check outcomes as described at step 264 and decision 266.

The persistent audit log maintained within datastore 125 may further record, for each communication or workflow transaction: (i) all detected and redacted PI); (ii) agentic AI bot selection, instantiation, and invocation order for each workflow along with the captured context state and selection rationale at the time of invocation; (iii) the results of every compliance engine 143 evaluation, including generated compliance scores and associated human-readable rationales; (iv) any user or reviewer modification, edit, or annotation to message drafts; (v) each instance and contextual detail of message blocking, quarantine, override, or release by compliance checks; (vi) all post-send discrepancies detected between transmitted messages and compliance-approved drafts, along with records of any alerts or escalation actions initiated in response; and (vii) provenance records identifying any sponsor, expert, or firm content injected into the communication via bot orchestration to maintain attribution and lineage traceability. This audit record enables regulatory review, incident response, and system optimization.

Figure 20:
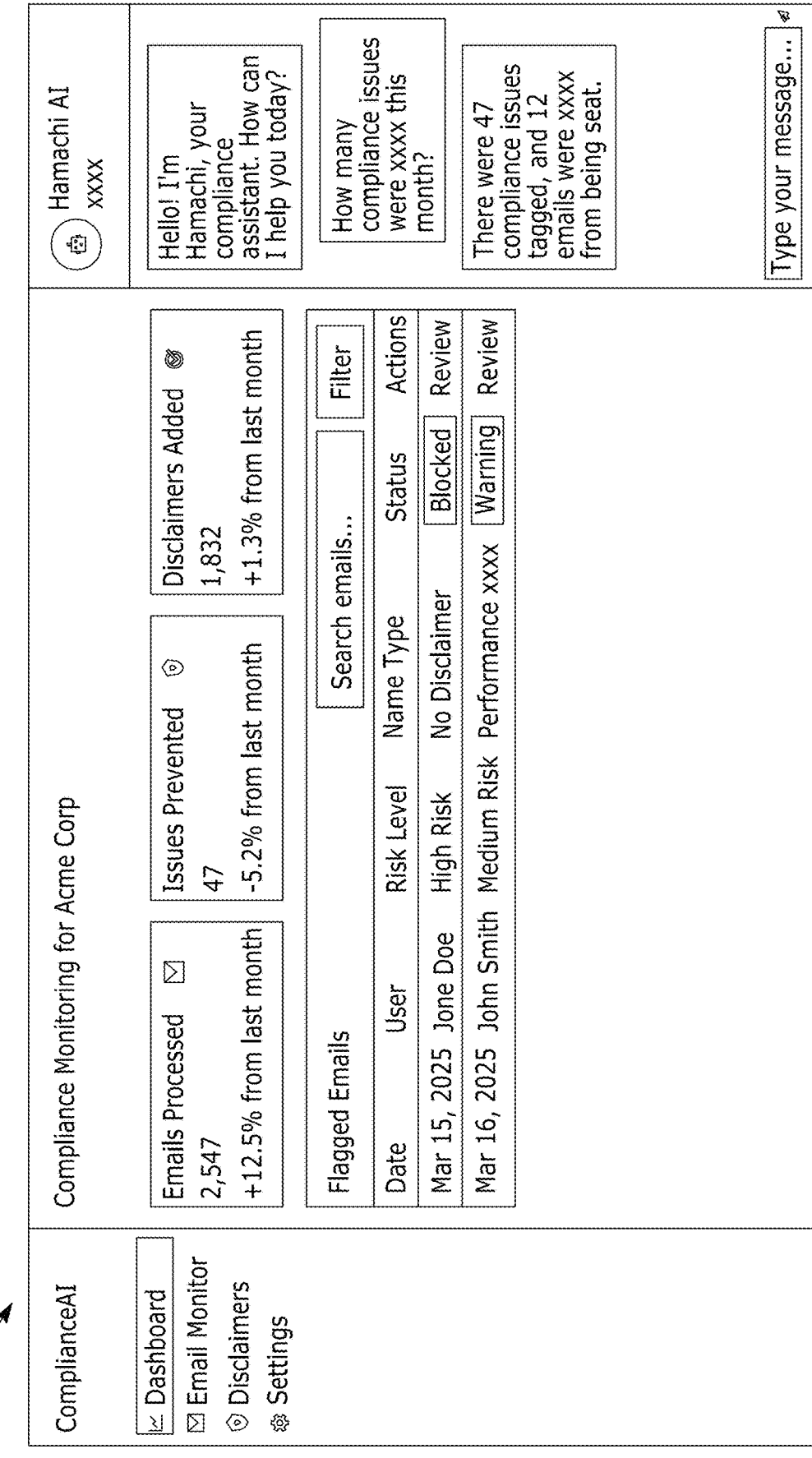
FIG. 20 depicts an exemplary graphical user interface of a post-send compliance dashboard displaying comparative message analysis, compliance deltas, and sponsor engagement metrics, in accordance with various aspects herein.

Upon receiving workflow records, compliance logs, or message artifacts from components such as server computing instructions 137 or integration layer 135, datastore 125 may archive and structure these records to maintain associations with relevant message identifiers, sender and recipient details, workflow context labels, compliance state, and applied policy versions. Datastore 125 may preserve version history for draft communications, record all compliance inspection and escalation actions, and maintain archives for audit and regulatory review. Datastore 125 may further implement protocols for data retrieval to support querying by analytics, compliance, or reporting modules, as well as facilitating user and administrator access to stored records for dashboard review or audit reporting. Datastore 125 may maintain the complete revision and compliance history for each message instance, including all detection and action events logged during method 250. The datastore 125 may support index-based retrieval and search functions for analytics, compliance review, reporting modules, or administrator dashboard display (as shown in FIG. 20), permitting filtering by communication, user, workflow stage, compliance outcome, or time period, as required for organization operations or regulatory response.

Agentic AI server 150 may comprise an integrated computing environment configured to orchestrate, execute, and manage the end-to-end workflows, computational modules, and adaptive learning mechanisms within agentic AI framework 100. Agentic AI server 150 may include processor(s) 152, memory 130, network interface 154, and persistent connectivity to datastore 125, LLM 160, and software platforms 170 (e.g., email platform 171, CRM system 172, marketing platform 173, enterprise tools 174, chatbot environment 175, and third party API(s) 176).

When user communications, workflow records, user feedback, or compliance artifacts are ingested by integration layer 135, agentic AI server 150 may coordinate all aspects of message normalization, PII detection, context extraction, orchestration logic execution, compliance evaluation, and adaptive system retraining. Processor(s) 152 may supervise the instantiation and lifecycle management of agentic AI bots 131, direct the execution of bot orchestration engine 133, and govern multi-stage privacy enforcement via PII redaction engine 139.

Agentic AI server 150 may oversee the persistent storage, versioning, and retrieval of data and workflow artifacts in datastore 125. Agentic AI server 150 may maintain metadata, provenance records, and audit trails associated with each communication record, bot output, compliance action, and user-submitted feedback, ensuring complete traceability and data lineage for regulatory review and operational monitoring. Agentic AI server 150 may execute version control procedures across all modules (e.g., redaction routines, bot logic, compliance rules), logging and benchmarking retraining actions orchestrated by feedback learning engine 141. For example, as shown in FIG. 8, GUI 800 displays how agentic AI server 150 retrieves and presents stored context data from datastore 125, including client profile information (e.g., contact name "Cynthia Lee," lifecycle stage "Client"), account details (e.g., account owner, account type), and opportunity metadata (e.g., opportunity stage "Proposal," close date, monetary amount) extracted from integrated CRM system 172. Integration layer 135 presents this versioned, normalized data in structured JSON format, demonstrating how stored workflow artifacts are retrieved and made accessible for downstream bot orchestration, compliance processing, and audit review within the agentic AI framework 100. FIG. 8 shows an example chatbot user experience (UX), illustrating an example chat interface including custodial data integration CRM data integration, and asset manager agentic bots. It should be understood that additional and/or different UX or otherwise user interfaces may be implemented in accordance with the disclosure herein.

Upon receiving contextualized, redacted communication content and extracted workflow features, agentic AI server 150 may assemble engineered prompts and interact with LLM 160 for advanced response generation. Server computing instructions 137 may validate LLM outputs, apply real-time compliance logic via compliance engine 143, and block, quarantine, or auto-augment non-compliant communications prior to transmission to client device 110. Agentic AI server 150 may further archive all processed drafts, compliance evaluations, feedback events, transmission data, and message revisions in datastore 125, supporting revision histories, audit record generation, and compliance reporting.

Agentic AI server 150 may facilitate adaptive system retraining and workflow optimization using feedback learning engine 141, aggregating compliance override events, user edits, and operational outcome metrics to trigger incremental or batch updates to PII redaction engine 139, agentic AI bots 131, or compliance engine 143. Retraining mechanisms may employ cross-validation, statistical error analysis, model reparameterization, and performance benchmarking, with retrained modules propagated across system pipelines and assigned new version identifiers for traceability.

Additionally, agentic AI server 150 may expose programmatic interfaces supporting integration with external platforms, third-party data sources, and regulatory services, enforce secure permission levels for user and administrator access, enable audit logging, and support automated backup, failover, and recovery protocols. In operation, agentic AI server 150 may maintain continuous compliance with privacy, security, and regulatory requirements, ensuring integrity, resilience, and explainability of all message handling, compliance enforcement, and adaptive model updates throughout agentic AI framework 100.

In certain embodiments, the agentic AI framework 100 may further incorporate an auction-based bot selection mechanism, wherein sponsor or third-party agentic AI bots submit dynamic bids associated with keywords, themes, or workflow contexts relevant to the current transaction. Bot orchestration engine 133 may evaluate these bids in real time, applying eligibility filters, compliance weighting, and context-relevance scoring to determine which sponsor bot content is prioritized for insertion or recommendation within user workflows. All bids, agentic AI bot selections, and resulting impressions or bot-generated outputs may be logged for audit, traceability, and billing or reporting purposes. In all such embodiments, auction evaluation is only applied after bots have passed baseline eligibility and compliance gating, such that only pre-qualified candidate bots may enter the bidding process, and the auction may not override firm-level compliance and/or stakeholder priority policies.

Memory 130 may comprise one or more non-transitory computer-readable storage media operable to store computer-executable instructions and persistent operational data for use by agentic AI server 150. In some implementations, memory 130 may include volatile and non-volatile memory components (e.g., RAM, ROM, flash memory, and/or solid-state drives). Memory 130 may organize instructions into distinct modules supporting functionality of the agentic AI server 150, including routines for agentic AI bots 131 (e.g., sponsor, expert, or company bots), bot orchestration engine 133, integration layer 135, server computing instructions 137, PII redaction engine 139, feedback learning engine 141, and compliance engine 143. Memory 130 may further retain message context, revision histories, sponsor and compliance content, audit log records, user feedback, and structured workflow metadata originating from client device 110 or server-side processes.

In operation, memory 130 may: (i) store multiple sets of instructions segregated for dynamic module loading and context-driven execution by agentic AI bots 131 and bot orchestration engine 133; (ii) manage the allocation of runtime data for concurrent processing of user communications, draft generation, compliance checks, and redaction events across PII redaction engine 139 and compliance engine 143; (iii) maintain persistent versioning and rollback capability for adaptive modules including retrainable models in feedback learning engine 141 and current compliance rule sets in compliance engine 143; (iv) log state changes in execution flows, context annotations, and bot orchestration events for integration layer 135 and server computing instructions 137; (v) enforce encryption and access control policies governing sponsor data, compliance records, and bot templates stored in memory 130; (vi) support automated backup, restore procedures, and data integrity validation routines for operational records associated with audit log retention and revision histories; (vii) allocate and persist context data vectors, including user profile data, firm profile data, message content, workflow context, customer relationship management (CRM) data, and software platform data associated with network communications ingested through integration layer 135; (viii) dynamically retrieve context data across computer network 166 from software platforms 171-176 or access stored information within memory 130 for local processing by one or more processors 152; (ix) cache source context and message attributes in association with communication workflows, revision histories, audit logs, and compliance events recorded for later retrieval, system optimization, or regulatory reporting; and (xi) organize and secure all context data according to enterprise governance policies, supporting role-based access, traceability, and multi-tenant separation for regulated deployments.

In some embodiments, memory 130 may be provisioned with resource allocation controls for agentic AI bots 131, secure partitioning for multi-tenant storage of workflow data, remote update mechanisms for instruction sets used by server computing instructions 137, and prioritized cache routines for compliance-related data generated by compliance engine 143. Memory 130 may further facilitate persistent audit logging of revision events, retraining actions, and compliance state transitions, enabling traceability, operational diagnostics, and review in accordance with enterprise privacy, governance, and regulatory mandates.

Agentic AI bots 131 may comprise computer-executable instructions and modular logic components configured to perform autonomous, context-sensitive operations supporting automated communication, compliance enforcement, privacy assurance, sponsor attribution, and workflow orchestration on agentic AI server 150. In certain embodiments, bot orchestration engine 133 may employ a deterministic control model that applies explicit priority and policy hierarchies to govern execution order, output authority, and resolution of conflicting bot instructions. For example, compliance-critical bots may be assigned precedence over sponsor or personalization bots to ensure alignment with regulatory policies, and dependency-aware scheduling may prevent execution of a downstream bot until prerequisite verification or contextual data is supplied by an upstream bot. Task assignment logic may bind each bot to a defined operational role within a processing cycle (e.g., contextual enrichment, fact verification, disclosure enforcement, sponsor content insertion), preventing uncontrolled role overlap and ensuring traceable delegation of responsibility. The orchestration engine may also implement eligibility filtering to exclude bots that do not satisfy contextual constraints (e.g., jurisdiction, user license level, entity permissions) and may apply early termination logic if policy overrides, risk thresholds, or compliance conflicts are triggered mid-cycle. In some embodiments, a fallback procedure may be invoked to replace a blocked or failed bot with a safe alternative, such as substituting a sponsor content bot with a compliance remediation bot, or reverting to a baseline firm policy template. This orchestration framework ensures reliable, auditable, and reproducible system behavior under variable workflow conditions without uncontrolled model behavior.

During execution, agentic AI bots 131 may operate exclusively on structured, privacy-cleansed message data output by PII redaction engine 139. This ensures that downstream processing by each bot is performed without exposure to undeclared PII or restricted identifiers, maintaining alignment with all privacy, security, and jurisdictional safeguards. Each agentic AI bot 131 executes its designated operational scope, which may include data filtering to remove irrelevant or unauthorized content, contextual enrichment with workflow- or user-specific attributes, automated insertion of regulatory disclosures, dynamic template construction, adaptive tone or style rendering, and logic-driven branching determined by detected workflow triggers or recipient role.

Agentic AI bots 131 may be personalized for individual users or entities and can be continuously updated and retrained based on identified user preferences or entity attributes from feedback data, in coordination with feedback learning engine 141. For example, sponsor agentic AI bots may be dynamically provisioned or updated with current sponsor, entity, or product data as required by the transactional context or regulatory triggers. Bots can be instantiated in memory 130 through real-time updates to an existing instance, creation of new instances in response to incoming workflow context, or allocation from a trusted external data provider or subscription system, following instructions from bot orchestration engine 133.

Bot orchestration engine 133 may comprise computer-executable control logic configured to manage the end-to-end selection, instantiation, parameterization, sequencing, execution, and lifecycle management of agentic AI bots 131 in agentic AI server 150. Upon receiving structured, privacy-cleansed vectors, bot orchestration engine 133 may evaluate operational requirements against eligibility logic, dependency rules, and stakeholder assignments defined in a bot store registry. As depicted in FIG. 22, display 116 may render GUI 2200 for configuring and instantiating agentic AI bots, enabling administrators to manage bot selection criteria, operational parameters, eligibility rules, and workflow assignments through an interactive configuration interface that supports real-time bot deployment and lifecycle management.

Bot orchestration engine 133 may dynamically select, instantiate, and allocate the required subset of agentic AI bots 131 required for each processing cycle, instantiating new bot instances in memory 130 as necessary, updating operational parameters for existing allocations, or provisioning bots from third-party configuration or subscription data where dictated by workflow rules. Bot orchestration engine 133 may fetch advocate bots in memory 130 by (a) updating an already-running instance with new context-specific parameters, (b) creating a new bot instance in response to the current workflow context received via integration layer 135, or (c) pulling configurations from trusted third-party data providers or subscription profiles, as dictated by operational or regulatory requirements. This just-in-time allocation model allows agentic AI server 150 to adaptively compose a minimal pool of context-relevant bots, each tailored to the unique data, compliance mandates, and user or sponsor requirements of the current transaction.

Moreover, bot orchestration engine 133 may manage the sequencing and aggregation of outputs from multiple concurrently active bots within the same processing cycle. Bot orchestration engine 133 may merge, order, or prioritize these outputs according to workflow rules and policy logic, resolving content dependencies or potential conflicts. For example, when both a sponsor bot and an expert compliance bot generate outputs for the same draft, bot orchestration engine 133 may ensure compliance statements are positioned as required before sponsor branding, or that tone and language are consistent across all content blocks. Outputs from filtered, merged, and sequenced bots are assembled into composite prompts for LLM 160 in cases requiring automated draft generation, or into compliance-ready message drafts for direct evaluation by compliance engine 143, supporting context-sensitive automation and auditability throughout the agentic AI framework 100. Winning sponsor bots may then be inserted into the message orchestration sequence, alongside expert, compliance, or entity-specific bots, subject to eligibility filters and hard policy precedence that prioritize regulatory compliance and user protections over sponsor placement. For example, if an expert compliance bot flags a content block as high-risk or requiring mandatory disclosure, sponsor bot placement is automatically deprioritized until compliance criteria are satisfied.

Outputs generated by agentic AI bots 131 (e.g., output content, processing timestamps, audit trails, version tags, and context-action mappings) may be persistently logged in memory 130 or written to datastore 125 for full version history, diagnostics, traceability, and retrospective audit review. Each bot may log all handling events, including initial input context, decision branches, modules invoked, templates or compliance content generated, disclosures inserted, exception conditions encountered, and connection or handoff status to downstream modules. All actions may be tagged with workflow identifiers, sender, recipient, compliance flags, and operational state.

Bot orchestration engine 133 may then transmit the aggregated, normalized output through server computing instructions 137 for engineered prompt construction (in messaging workflows requiring downstream draft generation via LLM 160) or directly to compliance engine 143 for final adjudication and policy enforcement. For example, if the draft output is an email for a registered investment advisor, orchestration logic guarantees that sponsor and compliance bots have contributed required disclosures and regulatory notices, that all content has been verified by compliance engine 143, and that outputs are captured and versioned in memory 130 for downstream audit and audit analytics.

Notably, all operational events (e.g., selection, instantiation, output merging, condition evaluation, escalation, output handoff, prompt construction, and compliance adjudication) may be logged in memory 130, supporting granular auditability and forensic traceability for every orchestration cycle. Edits, audit findings, compliance overrides, and user feedback routed from client device 110 may be processed by feedback learning engine 141, which may update orchestration eligibility logic, dependency configuration, bot templates, and workflow sequencing for subsequent cycles, thus closing the adaptive feedback loop.

Further, although not explicitly shown in the figures, in some implementations, bot orchestration engine 133 may integrate with a sponsor bidding and prioritization module configured to facilitate auction-based selection among eligible sponsor agentic AI bots 131. This module may rank candidate sponsor bots by evaluating a plurality of context-specific selection parameters, including, inter alia, relevance scores computed from context data, bid values, and/or selection attributes received from associated sponsor entities via integration layer 135. In some embodiments, the sponsor bidding and prioritization module may support a variety of auction mechanisms, such as, real-time auctions, scheduled bidding rounds, and/or hybrid models, wherein sponsor bots (i.e., each tagged with, inter alia, a product identifier(s), associated keywords, target audience segment, and/or content type) submit formal bids or selection responses indicating their preference for placement or activation priority with the current message orchestration. For example, sponsor bots representing investment funds may bid for primary message placement when the extracted workflow context indicates a client inquiry about product types aligned with their mandates, whereas insurance sponsor bots may submit bids in workflows triggered by platform data related to, inter alia, coverage, policy comparisons, and/or risk assessments.

In certain embodiments, bot orchestration engine 133 may execute bid evaluation by using a weighted selection algorithm that may rank candidate sponsor agentic AI bots 131 according to a combination of monetary bid value, historical engagement statistics (e.g., prior click-through or conversion rates), compliance risk modifiers reflecting the sensitivity of the product, jurisdictional requirements, context-specific risk levels, and/or contextual fit derived from analysis of extracted workflow attributes. The algorithm may further account for predefined contractual constraints (e.g., required impression minimums, exclusivity commitments, rate limits set by the sponsor, minimum eligibility commitments, rate limits set by the sponsor, and/or prioritized targeting underrepresented customer segments). Further, a sponsor entity may submit selection parameters such as bid amount, target audience metadata, preferred placement position, product-specific compliance certifications, engagement history, and/or implementation version(s) of the corresponding agentic AI bot 131. For example, in a workflow where the context data includes a user request for information about retirement solutions, sponsor bots linked to retirement products may submit competing bids, which are algorithmically scored and ranked based on relevance to current conversation content, engagement and performance history with the specific client segment, dynamic compliance constraints, and weighted business priority.

Server computing instructions 137 may comprise computer-executable routines and program modules operable to coordinate, manage, and execute the principal server-side processing functions within agentic AI framework 100. For example, server computing instructions 137 may manage the intake of platform data and network communications from integration layer 135, invoke multi-stage privacy enforcement by PII redaction engine 139, trigger context extraction and workflow annotation, and direct the selection and instantiation of handler agentic AI bots 131 via bot orchestration engine 133. Server computing instructions 137 may further: (i) normalize and pass structured, privacy-cleansed context vectors to the relevant modules for personalization, compliance, or message drafting; (ii) assemble and sequence outputs from agentic AI bots 131 for engineered prompt construction; (iii) interact with LLM 160 for automated draft or response generation; (iv) initiate compliance reviews and multi-point validation via compliance engine 143 at pre-orchestration, post-personalization, and pre-send stages; (v) log all processing events, content modifications, and operational state transitions in memory 130 or datastore 125 for audit and regulatory traceability; (vi) schedule, queue, or parallelize task execution across available system resources for scalable workflow management; and (vii) coordinate storage, transmission, and retrieval of processed drafts, compliance scores, user feedback, and workflow artifacts between server-side modules and client device 110, in conjunction with integration layer 135.

Compliance engine 143 may comprise computer-executable instructions and rules-processing logic configured to enforce regulatory and organizational requirements on messages within agentic AI framework 100. Compliance engine 143 may be invoked at multiple points in the workflow, including: (i) prior to selection and orchestration of handler agentic AI bots 131 by bot orchestration engine 133, in order to validate input data and preliminary context against applicable requirements ("pre-orchestration"); (ii) after the agentic AI bots 131 have generated or personalized content and prior to final draft assembly ("post-personalization"); and (iii) immediately prior to downstream transmission of the finalized draft output via integration layer 135 ("pre-send"). At each of these checkpoints, compliance engine 143 applies relevant regulatory, privacy, and firm-specific rule sets to ensure requirements are maintained throughout draft preparation, orchestration, and release.

Compliance engine 143 may generate a compliance score and associated rationale trace for each evaluated draft, identifying violations based on detected risk categories such as promissory language, unapproved claims, misleading performance statements, missing disclosures, or jurisdictional restrictions. In some embodiments, compliance engine 143 may enforce real-time message gating (e.g., by blocking, quarantining, or returning drafts requiring revision) prior to release. In some further embodiments, compliance engine 143 may dynamically synchronize its enforcement logic with one or more compliance checker modules that are automatically updated based on changes to regulatory rules (e.g., FINRA Rule 2210, SEC Rule 206(4)-1), firm policies (e.g., custom disclosure templates for product launches), or supervisory annotations (e.g., flagged user patterns or region-specific thresholds), thereby maintaining alignment with evolving compliance standards. Compliance engine 143 may further support supervisory workflows by routing high-risk drafts to designated users (e.g., escalated to compliance officers for approval), generating compliance annotations or required disclosure insertions (e.g., branding disclaimers, jurisdictional risk statements), and/or appending compliance metadata tags (e.g., review status, triggering rule identifier, policy version) to each transaction for persistent audit and downstream monitoring.

After upstream processing by integration layer 135, PII redaction engine 139, server computing instructions 137, and bot orchestration engine 133, compliance engine 143 may receive a structured draft output accompanied by metadata (e.g., context vector, sender/recipient attributes, workflow tags, bot output fragments). For each evaluated communication, compliance engine 143 may calculate and assign a compliance score. The compliance score may be a quantitative, categorical, or risk-index value (e.g., a pass/fail flag, a numerical flag, or a tiered risk level), reflecting the degree of compliance of the communication with applicable policies and rules. Additionally, for each evaluated communication, compliance engine 143 may generate a corresponding human-readable rationale, which may specify the compliance rules and policy checks applied, and may identify any specific violations, omissions, or deficiencies, and, where appropriate, may recommend required changes or remediation actions. For example, if a draft message lacks a required securities disclosure, compliance engine 143 may return a compliance score of "Fail (Score: 3/5)" with a rationale of "Missing mandatory FINRA disclosure for investment recommendations; Section 2210(b)(1)(A) violated, insert required language before sending."

In some implementations, the compliance score may be computed using a weighted risk model, in which risk categories (e.g., suitability violations, presence of promissory statements, unbalanced performance claims, missing regulatory disclosures, and/or jurisdictional restrictions) are assigned configurable weights determined by firm policy, supervisory requirements, or jurisdictional regulations, enabling tailored compliance enforcement by organization or region. For example, a firm may assign increased weight to omissions of FINRA-mandated disclaimers in investment communications, whereas a healthcare provider may prioritize privacy compliance or HIPAA restrictions in outbound communications.

In some embodiments, the compliance score may additionally be evaluated against firm- or jurisdiction-specific policy thresholds to trigger automated enforcement actions (e.g., blocking, quarantine, or mandatory supervisory escalation), prior to message release. For example, a draft flagged as missing a required Section 2210(b)(1)(A) disclosure and/or containing unsubstantiated performance figures may trigger and/or auto-route to a user for remediation before any release, while a minor documentation omission below a risk threshold may yield a warning, but still permit user correction and subsequent approval. This approach enables organizations to tailor the enforcement and routing of messages to their specific policy priorities and applicable regulatory environment.

Upon receipt, compliance engine 143 may access jurisdiction-specific, client-specific, and organization-specific rule sets and policy templates stored in memory 130 or datastore 125. Compliance engine 143 may then parse the draft according to a defined compliance workflow, wherein it may verify presence, placement, and content of required regulatory disclosures, legal statements, sponsor attributions, policy disclaimers, and any mandatory or prohibited content (e.g., steps 252-254). If compliance rules are satisfied, compliance engine 143 may authorize message release downstream via integration layer 135 (e.g., step 256b).

Conversely, if non-compliance is detected (e.g., missing disclosures, erroneous positioning, or improper investment language), compliance engine 143 may block transmission, assign the draft to a quarantined review state, or automatically augment the draft with required compliance elements (e.g., step 256a, step 258). When blocking or quarantine occurs, compliance engine 143 may notify the user, generate guided remediation actions for the user, which may include auto-inserting required regulatory disclosures, offering suggested compliant modifications, or providing annotated inline recommendations, and specific instructions for actionable feedback, thus enabling rapid remediation and resubmission. In some embodiments, remediation is not limited to blocking or quarantine. Compliance engine 143 may also provide "hard" remediation (e.g., required corrections that must be resolved prior to release), as well as "soft" remediation, which may include optional, advisory compliance suggestions that support risk mitigation, policy alignment, or enhanced communication clarity. An example low-severity item may include a suggestion such as: "Consider adding a brief risk-balancing statement to accompany benefit statements to align with FINRA Rule 2210 guidance," where the system detects emphasis on investment benefits without a mention of associated risks. Both hard and soft remediation events, together with their associated rationales, may be serialized as compliance metadata to the audit record for each draft to support supervisory review, explainability, behavior analytics, and continuous optimization of compliance rule sets.

In some implementations, such events (e.g., agentic AI bot selection and execution sequence, compliance evaluation results with scores and rationales, user or reviewer edits or annotations, blocking, quarantine, or override actions by compliance engine 143, and any post-send discrepancies with associated alerts or escalations) may be persistently recorded in the audit log in datastore 125 (e.g., step 260) for traceability and post-hoc review. In such embodiments, each audit record may include the policy version, decision timestamp, and the specific triggering conditions for every action taken, establishing precise linkage between system state and compliance outcomes. In some embodiments, an audit record may also capture the context state at the time of each decision, including workflow attributes, user role, and jurisdictional policy configuration, enabling reproducible audit replay. Additionally, an audit log may further record orchestration decisions and bot selection rationale, including eligibility filtering outcomes and policy precedence resolution. Provenance metadata may also be included to track the origin of injected content (e.g., sponsor source, expert source, or firm library reference), supporting downstream attribution integrity, billing reconciliation, and supervisory review.

Following user or system-driven correction, compliance engine 143 may perform re-evaluation to confirm all compliance criteria are fulfilled before release. In post-send workflows, compliance engine 143 may conduct field-level verification of delivered communication against the final approved draft to ensure no unauthorized modification has occurred (e.g., steps 264-266).

In addition to pre-send compliance enforcement, compliance engine 143 may also perform a post-send compliance re-evaluation by retrieving the delivered communication, comparing it to the corresponding compliance-approved draft stored in memory 130 or datastore 125, and analyze the two versions for any unauthorized alterations, omissions, or insertions. Compliance engine 143 may log any detected discrepancies in the audit trail, with timestamp and user attribution, and may trigger user and/or compliance officer notification, as well as escalation or remediation workflows. In some embodiments, post-send enforcement may further initiate supervisory escalation, user suspension from communication privileges, or forced retraining workflows based on severity thresholds. The system may also detect patterns of repeated policy violations or message tampering and automatically elevate such events to firm-level risk monitoring dashboards. Post-send compliance events may feed back into compliance risk scoring and rule tuning, reinforcing firm policy alignment over time.

Compliance engine 143 may also output compliance analytics and contextual event data to feedback learning engine 141, enabling rule set adaptation, policy tuning, system optimization, and closed-loop improvement. Throughout all operations, compliance engine 143 enforces a defensible, explainable audit trail for every compliance event, interfacing with all relevant system modules as described in the present disclosure to maintain end-to-end regulatory, legal, and organizational alignment for secure communications.

Software platforms 170 may comprise interconnected enterprise applications, communication services, and data sources accessible via computer network 166 and integrated with agentic AI server 150 through secure APIs, as orchestrated by integration layer 135. Software platforms 170 may include, but are not limited to email platform 171 (e.g., Microsoft Outlook, Gmail), CRM system 172 (e.g., Salesforce, HubSpot, Zoho), marketing platform 173 (e.g., Marketing Cloud), enterprise tools 174 (e.g., document management systems, portfolio management, trading, billing, and/or accounting systems), chatbot environment 175 (e.g., Slack, Teams), and third party API(s) 176.

Integration layer 135 may expose APIs and secure connection endpoints for bidirectional data exchange between agentic AI framework 100 and these software platforms 170 (e.g., components 171-176). Through these interfaces, the integration layer 135 may ingest inbound network communications, platform data (e.g., messages, account information, profile data, workflow tasks, attachments, system events), and contextual metadata originating from any of the platforms 171-176. Incoming data may range from emails and threaded communications (e.g., from email platform 171), CRM transactions and contact records (e.g., from CRM system 172), marketing campaigns or client engagement logs (e.g., from marketing platform 173), to financial transactions, document workflows, or operational logs (e.g., from platforms 174-176).

In operation, integration layer 135 may receive, validate, and transform inbound network communication streams and platform data from software platforms 170 into structured, system-compatible formats. This normalized data may be routed to downstream processing modules, including PII redaction engine 139 for multi-stage privacy enforcement, server computing instructions 137 for context parsing and annotation, bot orchestration engine 133 and agentic AI bots 131 for automation and message enrichment, compliance engine 143 for evaluation against policy and regulatory rules, and feedback learning engine 141 for operational learning and optimization. For outbound transmission, integration layer 135 may transmit the finalized communications, compliance notifications, audit records, and workflow events from agentic AI server 150 back to software platforms 170.

Processor(s) 112 may comprise one or more processing units located within client device 110, including general-purpose central processing units (CPUs), mobile application processors, or embedded microcontrollers. Processor(s) 112 may execute instructions from the platform app 122 to render user interfaces, process user input for drafting, reviewing, and sending communications, manage local data storage and validation, and facilitate secure connectivity to the agentic AI server 150 over computer network 166. In operation, processor(s) 112 may manage user authentication, buffer and encrypt draft content, initiate communication sessions, provide responsive status feedback in the GUI, and synchronize local actions with server-side workflow states for secure, interactive enterprise communication.

Network interface 114 may comprise hardware and computer-executable instructions configured to manage packet-based communication between the client device 110 and the agentic AI server 150 over the computer network 166. For example, network interface 114 may facilitate the secure transmission of user-drafted communications, workflow data, compliance feedback, audit log entries, and system notifications to and from authorized endpoints, including one or more external software platform 170 (e.g. email platform 171, CRM system 172, marketing platform 173, enterprise tools 174, chatbot environment 175, and/or third party API(s) 176).

In operation, network interface 114 may: (i) utilize standard network protocols such as TCP/IP for data transmission, with SSL/TLS encryption to provide end-to-end confidentiality and integrity of all communications; (ii) authenticate users and devices prior to enabling data exchange, using credential-based, certificate-based, or multi-factor authentication as dictated by enterprise security policy; (iii) enable secure upload and download of communication content, AI-generated drafts, and compliance analytics, ensuring message and data integrity via checksum or hash validation routines; (iv) monitor and log all network events, including connection establishment, session state, transmission and reception status, packet loss incidents, and protocol errors; (v) manage compatibility with institutional infrastructure such as enterprise firewalls, proxy servers, or network segmentation by supporting configurable static IP assignments, port forwarding, and NAT; and (vi) support automated diagnostic and troubleshooting routines, including the generation of event logs for failed transmissions, network latency analysis, and anomaly detection.

In some embodiments, network interface 114 may be provisioned with bandwidth allocation controls, support for remote firmware or software updates, and policy-driven throttling or prioritization of compliance-relevant traffic. Network interface 114 may further support audit record generation of all data transfers and network operations, enabling review for cybersecurity, regulatory compliance, or operational diagnostics. Network communications are performed such that unredacted PII and restricted compliance data may be transmitted in encrypted form, in accordance with enterprise data governance and regulatory mandates.

Display 116 may comprise a graphical output device and associated control instructions configured to render interactive user interfaces and workflow notifications for client device 110 within the agentic AI framework 100. For example, display 116 may present structured message drafting panels, recipient and attachment fields, compliance status banners, redaction alerts, sponsor disclosures, revision histories, feedback prompts, and visual audit trail summaries associated with enterprise communications processed through platform app 122. Display 116 may further present stepwise compliance status indicators, reporting results from pre-orchestration, post-personalization, and pre-send validation performed by compliance engine 143 and related modules, so that users are informed of compliance state at each major stage of message generation and approval. In some embodiments, display 116 may further present explainable compliance output including rule-level rationale traces, severity tags (e.g., informational, warning, blocking), citation of triggered policy rules (e.g., FINRA Rule 2210, SEC Rule 206(4)-1), and inline guided remediation suggestions that allow the user to address compliance findings directly within the drafting interface. For elevated risk classifications or supervisory workflows, display 116 may also surface routing status, reviewer assignments, escalation flags, and redline comparison views between message versions, enabling traceable review under organizational approval hierarchies.

In operation, display 116 may: (i) render multi-panel input screens for composing, editing, and reviewing messages, supporting dynamic insertion and highlighting of compliance-relevant content provided by agentic AI server 150 and associated agentic AI bots 131; (ii) present real-time compliance state indicators, approval banners, or risk alerts sourced from compliance engine 143, enabling users to identify and respond to policy violations prior to submission; (iii) display administrative configuration interfaces for multi-stage privacy controls, enabling adjustment of PII detection thresholds across REGEX, NER, and SLM models according to jurisdictional or client-specific requirements; (iv) visually annotate and mask fields containing personally identifiable information detected by PII redaction engine 139, displaying required redaction and correction actions before content transmission; (v) show sponsor content, expert disclosures, or template guidance injected by bot orchestration engine 133, differentiating regulated elements from general correspondence in accordance with business logic; (vi) display audit log summaries and workflow analytics retrieved from datastore 125, providing revision history, compliance outcomes, feedback statistics, and operational reporting for user review and compliance tracking (e.g., GUI 2300 of FIG. 23); (vii) render contextual prompts, notifications, modal dialogs, and task-specific guidance appropriate to user role, workflow context, or session state; (viii) display adaptive feedback interfaces (e.g., GUI 1800 of FIG. 18) that visualize how user edits and compliance interventions contribute to system learning and optimization of orchestration logic, prompt engineering, and compliance heuristics; and (ix) display bot configuration and management interfaces (e.g., GUI 2200 of FIG. 22) for configuring and instantiating agentic AI bots, enabling administrators to define bot parameters, eligibility criteria, and operational workflows.

In some embodiments, display 116 may be provisioned with user-configurable options for adaptive layout, accessibility controls for high-contrast or screen-reader modes, and platform-specific rendering profiles to support varying enterprise deployment environments. Display 116 may further support secure display protocols that prevent exposure of unredacted PII or restricted compliance data when operating in shared, remote, or virtualized presentation contexts, in accordance with institutional privacy policies and regulatory mandates.

Imaging device 118 may comprise a hardware component and associated software instructions configured to capture, process, and transmit visual data on client device 110 within the agentic AI framework 100. For example, imaging device 118 may include a built-in camera, external scanner, or mobile imaging module operable to acquire photographs, scanned documents, or video streams relevant to enterprise workflows managed by platform app 122.

In operation, imaging device 118 may: (i) capture images of physical documents, identification cards, or handwritten forms required for onboarding, KYC verification, or compliance record collection; (ii) scan and digitize supporting materials such as receipts, signed agreements, or annotated contracts for direct upload into message drafts or CRM records; (iii) facilitate real-time image acquisition for use in collaborative messaging platforms, including context-relevant attachments embedded via platform app 122; (iv) support user-initiated capture of workflow evidence, providing timestamp, geolocation, and user attribution metadata for audit trail linkage to datastore 125; (v) enable automated image preprocessing routines (e.g., cropping, contrast enhancement, text extraction via optical character recognition (OCR)), and redaction of sensitive information for preliminary privacy enforcement prior to transmission to agentic AI server 150; and (vi) provide feedback mechanisms on display 116 to confirm successful image capture, display preview thumbnails, and relay corrective alerts regarding resolution, document completeness, or field-of-view requirements.

In some embodiments, imaging device 118 may be provisioned with security features (e.g., biometric capture modules, encrypted image buffer management), and access restrictions aligned with user role and enterprise policy. Imaging device 118 may further support secure transfer of acquired visual data over network interface 114 in encrypted form, ensuring that all transmitted images or video attachments comply with organizational privacy policies and regulatory mandates, and are properly routed for downstream processing, PII redaction by engine 139, and storage in datastore 125.

Memory 120 may comprise one or more non-transitory computer-readable storage media operable to store computer-executable instructions and data for use by client device 110. In some implementations, memory 120 may include volatile and non-volatile memory components (e.g., RAM, ROM, flash memory, and/or solid-state drives). Memory 120 may store multiple sets of instructions and data modules supporting secure operation of platform app 122, management of draft communications, local caching of workflow records, temporary storage of attachments captured via imaging device 118, and persistent storage of application state and user authentication credentials. The organization of memory 120 may permit isolation of sensitive message content prior to PII redaction, encryption of compliance-relevant information, and segregation of communication records according to workflow, user role, or operational context.

Integration layer 135 may comprise computer-executable instructions and interconnection logic modules configured to handle standardized data exchange, normalization, secure transmission, and contextual enrichment for network communications between client device 110, agentic AI server 150, agentic AI bots 131, and software platforms 170. Integration layer 135 may function as the primary I/O point for all platform data and workflow triggers within agentic AI framework 100, supporting interoperability, data consistency, and policy enforcement.

In operation, integration layer 135 may: (i) receive inbound network communications, workflow data, and context data originating from platform app 122 on client device 110, or from software platforms 170 accessible via secure APIs over computer network 166; (ii) validate the integrity, format, and authorization of each inbound data stream, normalize incoming payloads to a structured, canonical format (e.g., converting HTML email, CSV, or JSON platform logs to system-standard schema), and associate requisite user attributes, identity tokens, firm identifiers, workflow designators, and conversation history metadata; (iii)

enforce session-based and role-based authentication and access control, consistent with enterprise and regulatory policy, using security credentials and protocol routines maintained in memory 130; (iv) forward normalized and context-enriched payloads to PII redaction engine 139 for multi-stage privacy processing, passing post-redaction outputs, user context, and platform-derived parameters to server computing instructions 137 for advanced context extraction, classification, and workflow annotation; (v) supply enriched and privacy-cleansed context vectors to bot orchestration engine 133, which in turn may instantiate, allocate, and coordinate handler agentic AI bots 131 for compliant message augmentation and content generation.

After a draft message undergoes compliance adjudication by compliance engine 143 and receives audit event classification via feedback learning engine 141, integration layer 135 may handle secure transmission to the originating platform app 122, synchronize data with third-party CRM or marketing tools, or register audit records for workflow analytics and reporting. More specifically, integration layer 135 also may coordinate outbound transmission, ensuring that finalized drafts, compliance status updates, audit logs, and system notifications are transmitted from the agentic AI server 150 or datastore 125 back to client device 110 or software platforms 170.

In certain embodiments, integration layer 135 may intercept message transmission or "send" actions initiated by a software platform, such that all outbound communications undergo a final compliance review. If compliance engine 143 detects unmet compliance, regulatory, or privacy requirement is unmet, integration layer 135 may block or quarantine the outbound communication, withhold transmission until all identified issues are remediated. In such instances, completion of the transmission is only permitted after successful compliance review, ensuring delivery only to the intended recipient(s).

In some embodiments, integration layer 135 may establish trusted connections with supported software platforms via secure plug-in authorization or API tokens, enabling interception of communication transmission events at the point of action without exposing platform credentials or raw data to external services. For example, when a user attempts to send a client email via email platform 171, integration may authorized the connection through an encrypted API token, intercept the send command, and trigger a final compliance review before permitting transmission, ensuring that all security and privacy requirements are met without revealing sensitive access information and/or unredacted content beyond system boundaries.

The integration layer 135 may further enforce tamper-resistant send control by preventing local bypass attempts, disabling unsanctioned message channels, or rerouting messages for supervisory review based on risk classification. Outbound enforcement may be applied across multiple platform types, including email clients, CRM systems, enterprise chat platforms, document workflow tools, and programmatic API integrations, ensuring consistent compliance enforcement across heterogeneous communication environments.

When the agentic AI framework 100 receives feedback data, audit trail entries, compliance interventions, or user-initiated edits associated with prior communication drafts, the feedback learning engine 141 may ingest these data streams along with corresponding metadata describing user identity, workflow context, compliance event type, involved agentic AI bots 131, and message-specific attributes (e.g., client profile, regulatory jurisdiction, thematic classification, transmission status, and detected PII categories).

Figure 19B:
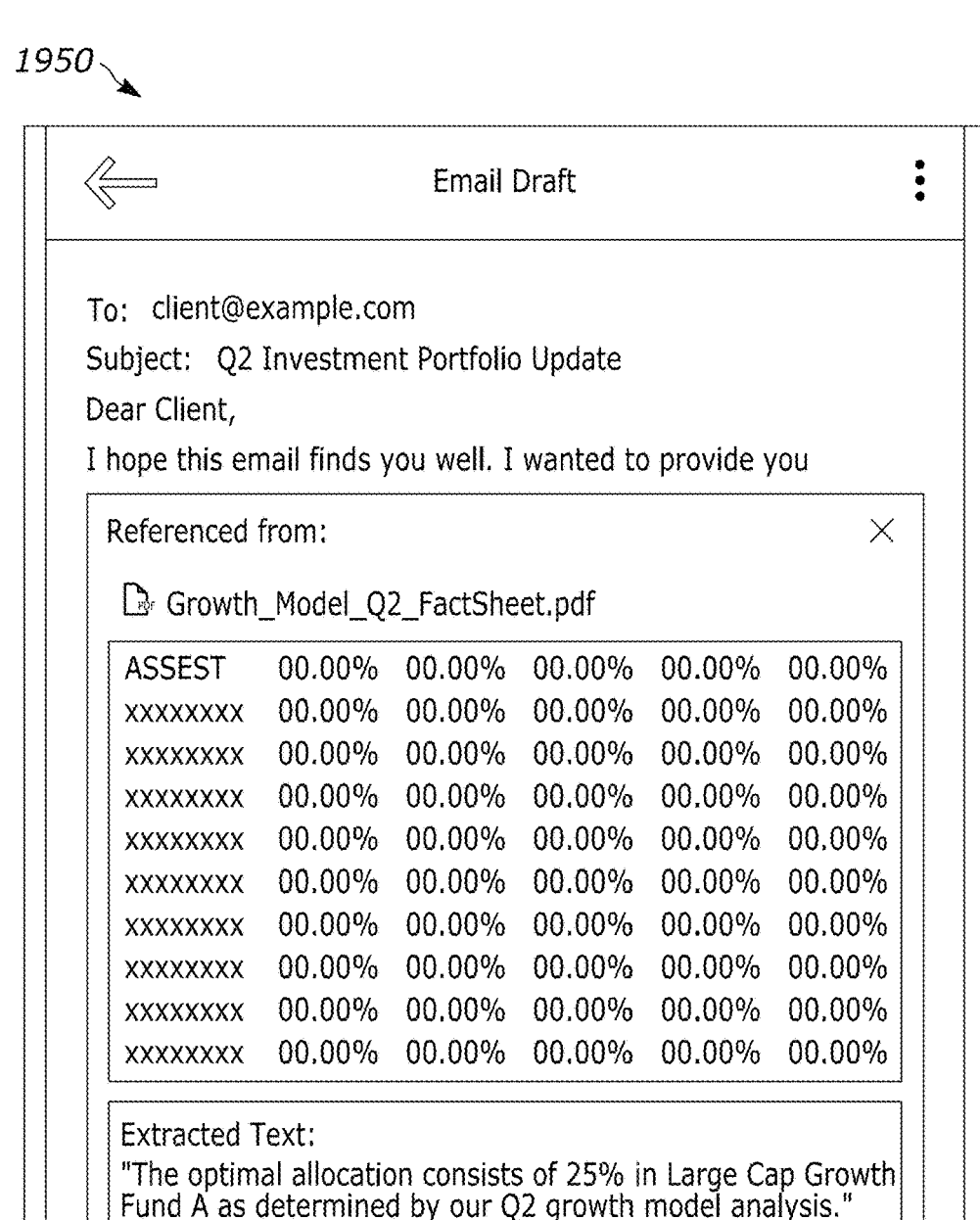
FIG. 19B depicts an exemplary graphical user interface of an email draft composition workflow with corrected language after user acceptance of recommend changes, in accordance with various aspects herein.

As illustrated in FIG. 19A, GUI 1900 may enable feedback submission workflows, enabling users to correct extracted content in referenced documents by providing inline annotations of compliance warnings in drafts, facilitating targeted remediation and system learning. As shown in FIG. 19B, GUI 1950 may display email draft composition workflows with corrected language after user acceptance of recommended changes, demonstrating the integration of user feedback into the drafting process. The feedback learning engine 141 may aggregate these new feedback and audit data with existing historical records maintained within datastore 125, constructing or augmenting datasets for supervised or semi-supervised retraining of adaptive system components.

Feedback learning engine 141 may then initiate system updating workflows that may include, but are not limited to retraining, reparameterization, and/or re-ranking of modules (e.g., PII redaction engine 139, bot orchestration engine 133, agentic AI bots 131, and compliance engine 143). For instance, when recurring user edits or compliance override events indicate limitations in PII detection algorithms or compliance rule applicability, feedback learning engine 141 may apply incremental or batch-based retraining to underlying REGEX models, NER components, or local SLMs to enhance contextual coverage and reduce error rates. This retraining may incorporate feature selection, hyperparameter optimization based on cross-validation, and statistical evaluation of post-retraining error, recall, or compliance rates benchmarked against historical operational metrics.

Post-retraining, feedback learning engine 141 may assign version identifiers to each updated module, document retraining actions and updated parameter states, and generate detailed logs of retraining triggers, datasets, and performance metrics for traceability and reproducibility. Feedback learning engine 141 may further coordinate the automated or manual deployment of updated modules to all relevant workflow pipelines (e.g., updating the deployed SLM instance within PII redaction engine 139, pushing new selection heuristics or eligibility rules to bot orchestration engine 133, or distributing revised compliance rule sets and gating logic to compliance engine 143), ensuring system-wide use of the latest validated models and configurations.

In certain embodiments, feedback learning engine 141 may support proactive retraining triggers based on pre-defined performance, accuracy, or compliance thresholds, automatically launching model or rule updates when audit incident rates, false positive or negative rates, or user intervention frequency deviates beyond acceptable limits. Feedback learning engine 141 may additionally support incremental, rolling adaptation in response to continuous feedback and new data influx, or permit configuration of supervised, human-in-the-loop retraining cycles whereby compliance officers or administrators review, approve, and finalize updates to privacy, orchestration, or compliance logic. This schema enables ongoing enhancement of adaptive system modules, maintaining alignment with evolving regulation, enterprise policy, messaging context, and threat landscapes, and supports regulatory documentation, operational resilience, and explainability throughout the agentic AI framework 100.

Processor(s) 152 may comprise one or more processing units capable of executing computer-executable instructions stored in memory 130 of the agentic AI server 150. Processor(s) 152 may include central processing units (CPUs), graphics processing units (GPUs), neural processing units (NPUs), field-programmable gate arrays (FPGAs), application-specific integrated circuits (ASICs), digital signal processors (DSPs), or specialized accelerators for AI and NLP workloads. Processor(s) 152 may manage and coordinate the execution of server computing instructions 137, PII redaction engine 139, compliance engine 143, feedback learning engine 141, integration layer 135, and the bot orchestration engine 133. In operation, processor(s) 152 may ingest data received from client device 110, control the instantiation and lifecycle of agentic AI bots 131, execute context extraction and compliance workflows, construct and transmit prompts to LLM 160, and handle concurrent user requests. Processor(s) 152 may queue and schedule message handling tasks, track workflow state, and manage communication between modules for the real-time, secure, and audit-ready operation of the agentic AI framework 100.

Network interface 154, as implemented on the agentic AI server 150, may operate analogously to network interface 114 and conforms to the same technical, security, and compliance requirements. Network interface 154 may manage the secure, authenticated reception and dispatch of communications between the agentic AI server 150, client device 110, software platforms 170, LLM 160 (when permitted under privacy constraints), and the datastore 125. Transmissions performed by network interface 154 may be logged, subject to integrity and error checking, and managed in accordance with the requirements described herein for secure enterprise communication networks.

LLM 160 may comprise a locally hosted, cloud-based, or federated large language model that performs constrained natural language generation. LLM 160 may operate within the secure environment of agentic AI framework 100 or interface with external providers under privacy-preserving access controls, ensuring redacted and structured data only. LLM 160 may be governed by deterministic prompt engineering logic defined by bot orchestration engine 133 and compliance engine 143. In some embodiments, LLM 160 may comprise a large language model instance, implemented as a computer-implemented system configured to perform advanced natural language processing (NLP) and natural language generation (NLG) tasks within the agentic AI framework 100. LLM 160 may include, for example, domain-adapted or general-purpose AI models (e.g., GPT, Gemini) or similar transformer-based architectures, which may be hosted on-premises, deployed via a secure cloud-hosted environment, or hybrid service accessible to agentic AI server 150 via secure network interface 154. LLM 160 may be provisioned with pre-trained weights and further fine-tuned on enterprise- or industry-specific datasets to optimize contextual relevance, operational compliance, and linguistic fidelity for regulated communications.

LLM 160 is invoked only after PII redaction engine 139 has replaced sensitive values with reversible smart tags, context extraction has produced structured vectors, and bot orchestration engine 133 has applied eligibility logic and prompt assembly rules, such that the LLM receives a deterministic, privacy-preserved prompt that reflects orchestrated policy-constrained content. Within the described architecture, LLM 160 may receive structured, privacy-cleansed engineered prompts assembled by bot orchestration engine 133 and server computing instructions 137. Upon receiving an engineered prompt, LLM 160 may execute sequence modeling using attention-based neural architecture across tokenized input, conditioning on embedded context, intent, and compliance markets. LLM may generate candidate message drafts in different modalities, which may include by are not limited to: (i) formal client email responses addressing regulatory inquiries; (ii) automated meeting follow-up summaries consolidating multi-party discussion threads; (iii) marketing outreach messages incorporating sponsor branding in a compliance-approved manner; (iv) internal escalation memos with compliance tagging for specific rule sets; and (v) stepwise procedure documents or chatbot responses that adapt language complexity according to recipient profile.

LLM 160 may optionally integrate with retrieval-augmented generation (RAG) modules or enterprise knowledge stores, fetching up-to-date sponsor content, legal case citations, policy guidance, FAQs, or prior communication samples for inclusion in drafted content. LLM 160 may retrieve claim process workflows and adapt language based on both the user's historical communication profile and active jurisdictional requirements.

As an adaptive, policy-aware module, LLM 160 may be bound by privacy and security controls inherited from upstream modules. LLM 160 processes only inputs that have passed the multi-stage privacy pipeline (i.e., PII redaction engine 139), ensuring no PII or jurisdictionally protected data leaks into model inference or is included in output. Contextual constraints and compliance tokens embedded in the prompt may activate response throttling, template enforcement, or output filtering (e.g., truncating a draft to omit speculative investment guarantees, rejecting inclusion of blacklisted language, or flagging output for manual compliance review) before external delivery.

Each invocation of LLM 160 is logged with metadata including prompt versioning, model identifier, workflow context, compliance result, inference duration, and output scoring. These records are linked to audit trails within datastore 125 for accountability and post-hoc review. Users may configure weightings, temperature, or decoding strategies according to enterprise policy (e.g., increasing determinism for legal notices, enabling higher entropies (diversity) for marketing copy; or enforcing token sequence codes in template-driven forms. If output fails compliance review, LLM 160 may be auto-invoked with revised prompts, updated context vectors, or alternate templates as dictated by compliance engine 143 feedback.

Computer network 166 may comprise one or more data communication channels configured to facilitate secure transmission of messages, platform data, user context, prompts, draft outputs, and compliance metadata between the client device 110, agentic AI server 150, datastore 125, LLM 160, and software platform 170 (e.g., as email platform 171, CRM system 172, marketing platform 173, and chatbot environment 175). Computer network 166 may include combinations of wired Ethernet, wireless (Wi-Fi, cellular, etc.), virtual private networks (VPNs), or cloud-based routing infrastructure, each supporting encrypted, authenticated, and policy-controlled access to system resources.

Integration layer 135 and server computing instructions 137 may utilize computer network 166 to transmit inbound messages from client device 110 to agentic AI server 150, exchange intermediate data and compliance evaluations, and route finalized outputs, audit records, and user feedback for downstream delivery or archiving (e.g., step 258, step 260, and step 262 of method 250). Computer network 166 may further support third-party API communication, external compliance checks, and real-time user notification, ensuring low-latency and policy-compliant operation across all stages of the agentic AI framework 100.

In operation, computer network 166 may: (i) transport structured communication payloads, compliance metadata, context vectors, redacted content, LLM prompts, and user edits between client device 110, agentic AI server 150, datastore 125, LLM 160, and a range of integrated enterprise software platforms; (ii) support standard network protocols including TCP/IP, HTTPS, and provide encrypted, authenticated, and policy-enforced session management through technologies such as SSL/TLS, mutual authentication, or IPSec; (iii) enable secure transmission of application-layer metadata (e.g., sender and recipient identifiers, workflow triggers, audit log pointers, user session tokens, compliance status codes, orchestration signals, and bot selection parameters) parallel to main message content; (iv) enforce role-based access control and authorization for bidirectional data exchange, including administrative and compliance monitoring activities; (v) handle reliable delivery for both real-time interactive workflows (e.g., live message drafting, compliance intervention, and user feedback) and scheduled or asynchronous background operations (e.g., batch audit uploads, LLM retraining set transfer, or synchronization with third-party regulatory APIs); (vi) ensure resilience and business continuity through failover routing, network redundancy, and secure handoff to cloud-based or remote tenants where organizational requirements dictate multi-site or federated deployments. In some configurations, computer network 166 may support segmentation for isolating sensitive message flows, audit traffic, or integration points with external regulatory feeds, and may maintain full logging of communication events for security, operational analytics, and regulatory reporting.

It will be appreciated by anyone of ordinary skill in the art that the agentic AI bots 131, bot orchestration engine 133, integration layer 135, server computing instructions 137, PII redaction engine 139, feedback learning engine 141, and compliance engine 143 described herein may be integrated within or across components of the agentic AI server 150, client device 110, LLM 160, or relevant software platforms 171-176 in any suitable configuration. Furthermore, although no explicitly illustrated, the functional modules, datastores, and interface components of the agentic AI framework 100 may be instantiated on a single server, be distributed across multiple physical or cloud-based servers, or be instantiated on virtualized hardware and geographically separated computing resources, as required to support scalability, redundancy, high availability, parallel processing, enterprise security requirements, or multi-tenant SaaS deployments.

Example Methods

FIGS. 2A, 2B, and 3-6 describe various methods that may be implemented by combinations of hardware, software, firmware, etc., for example, by components of the exemplary agentic AI server 150.

Figure 2A:
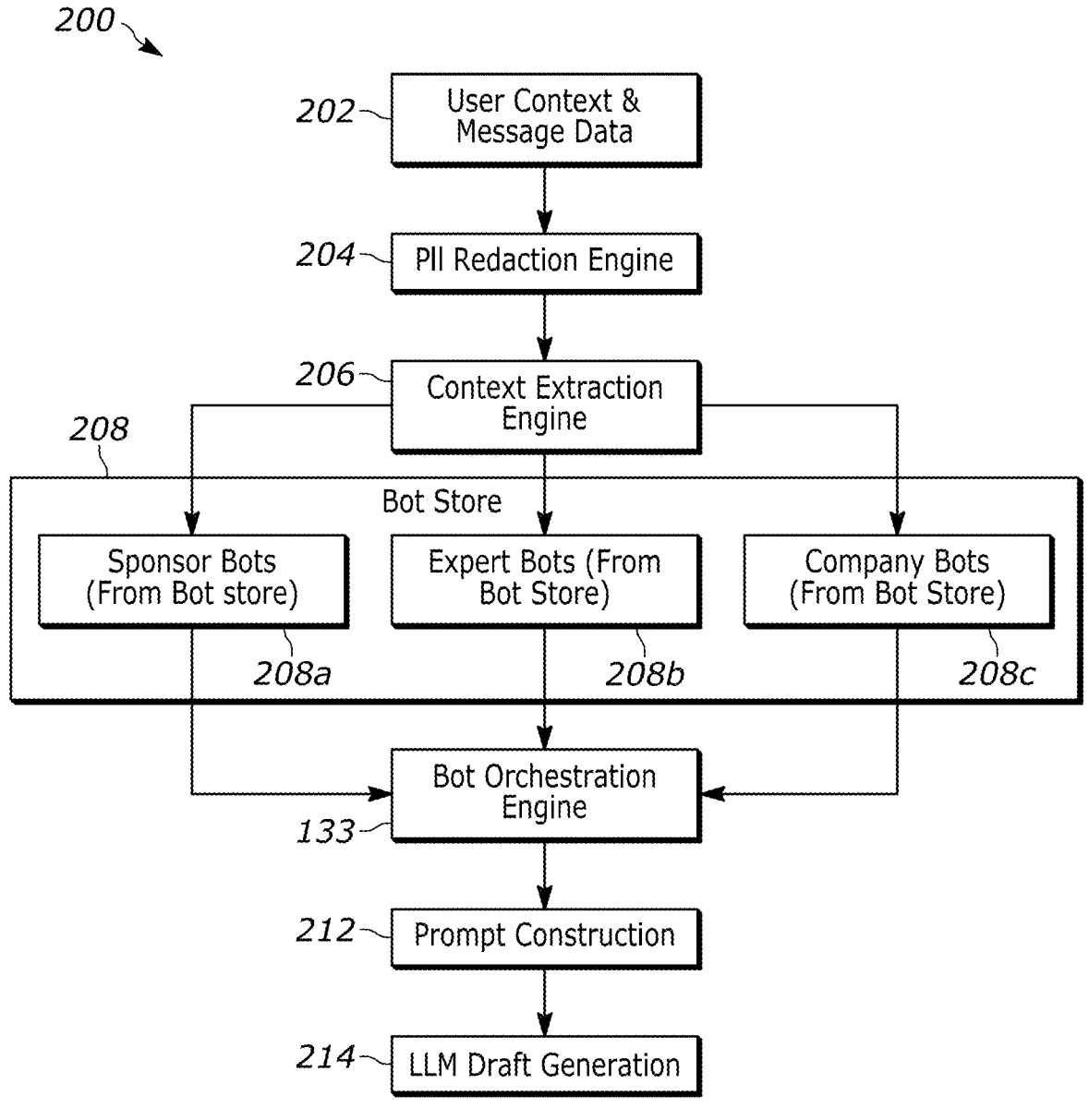
FIG. 2A depicts a flow diagram of an example method for generating textual drafts, in accordance with various aspects herein.
Figure 2B:
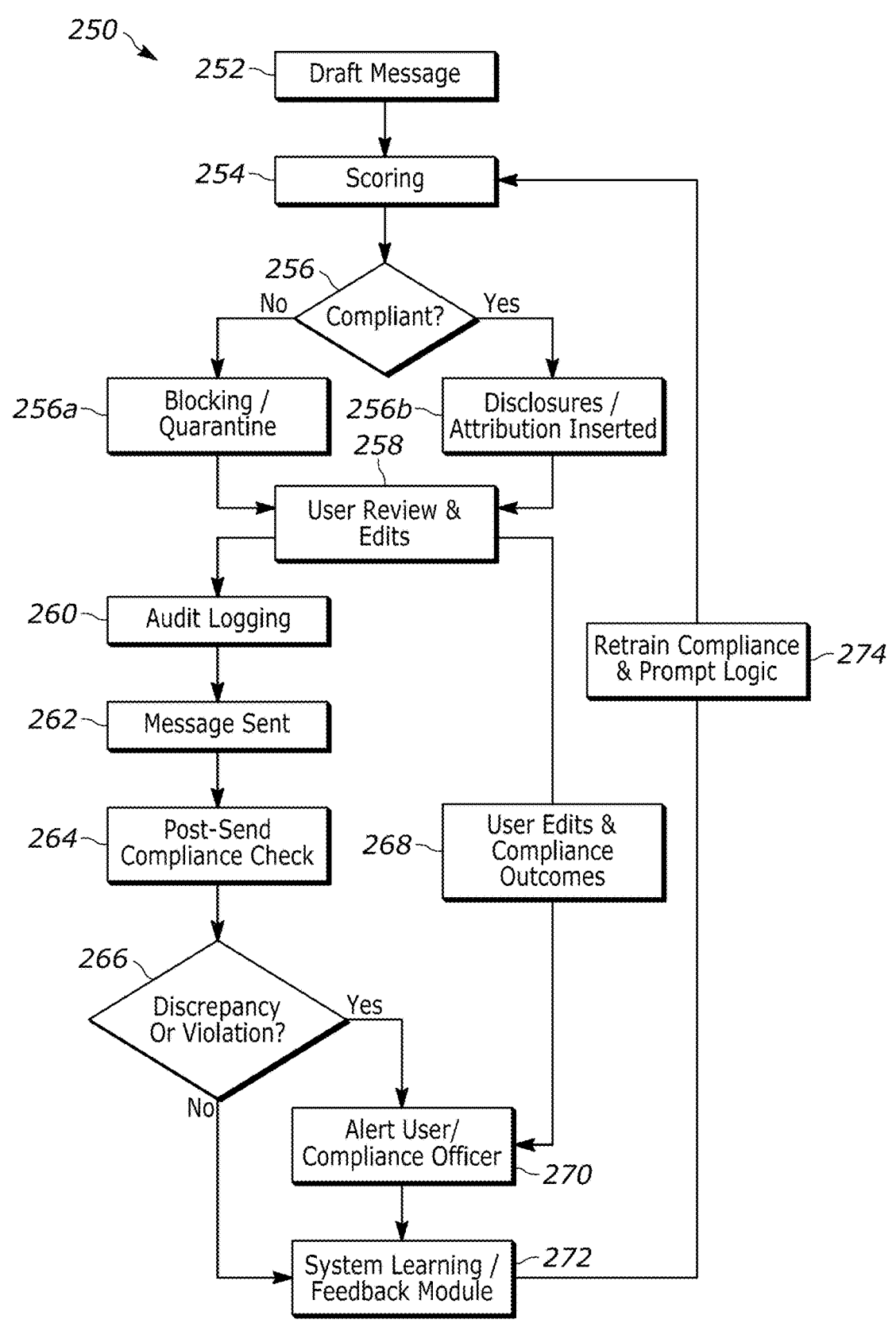
FIG. 2B depicts a flow diagram of an example method for evaluating, enforcing, and auditing message compliance within a draft and review system, in accordance with various aspects herein.
Figure 3:
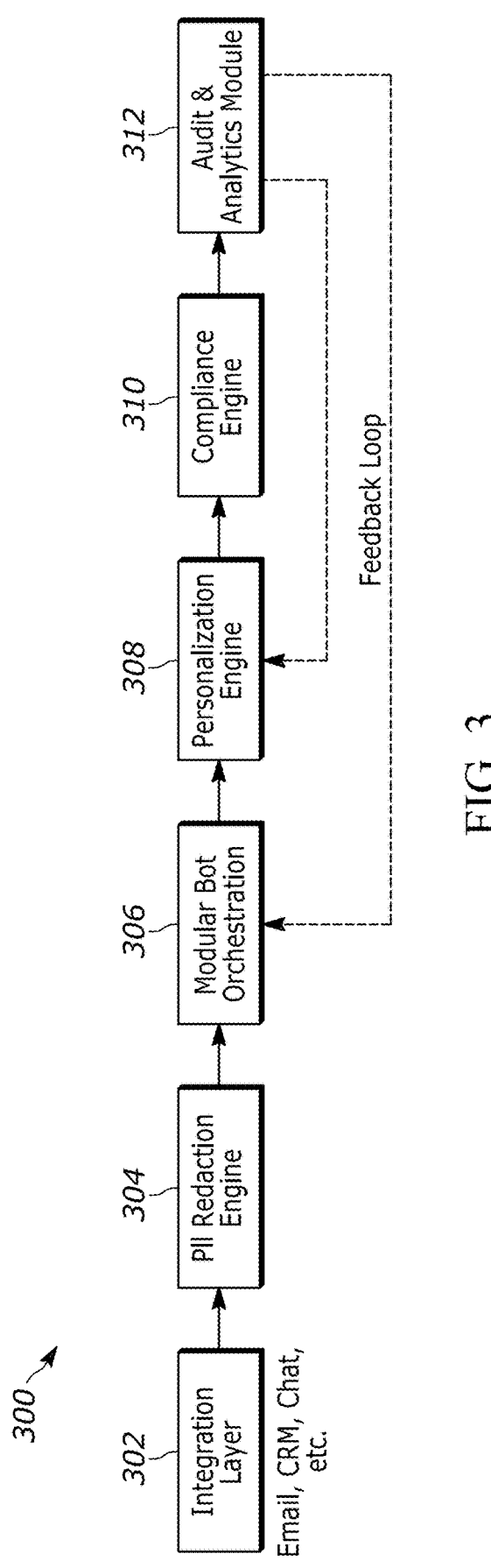
FIG. 3 depicts a block diagram of an example system architecture for secure communications, in accordance with various aspects herein.

Referring now to FIG. 3, FIG. 3 depicts a block diagram of an example method 300 illustrating a modular system architecture for secure, compliant communication processing within agentic AI framework 100. Method 300 comprises multiple interconnected processing modules arranged in a sequential workflow configuration, with feedback mechanisms enabling continuous system optimization. The following steps (e.g., steps 302-310) are described in greater detail, as illustrated, for example, in FIG. 2A and FIG. 2B, and in accordance with various aspects of the present disclosure.

In some implementations, method 300 begins with step 302 (e.g., integration layer 135), which serves as the initial ingress point for network communications from various communication channels, including email platform 171, CRM system 172, chatbot environment 175, and other enterprise platforms such as marketing platform 173, enterprise tools 174, and third party API(s) 176.

Following step 302, method 300 may proceed to PII redaction engine 304 (e.g., PII redaction engine 139), which performs multi-stage privacy processing on incoming communications by applying sequential privacy detection and removal mechanisms to identify and redact personally identifiable information before downstream processing occurs (e.g., step 204).

Upon processing the communication data, method 300 may proceed to modular bot orchestration 306 (e.g., bot orchestration engine 133), which may dynamically select, instantiate, and manage handler agentic AI bots 131 (e.g., step 208) based on the extracted context data (e.g., step 206). In some embodiments, modular bot orchestration 306 may coordinate the execution of multiple specialized bot modules to generate composite outputs for subsequent processing stages (e.g., step 212).

Following modular bot orchestration 306, personalization engine 308 may adapt content and responses according to user-specific attributes, preferences, and contextual parameters extracted from the communication workflow.

Method 300 may proceed to compliance engine 310 (e.g., compliance engine 143, steps 252-256), which may evaluate generated content against regulatory rules, organizational policies, and jurisdiction-specific requirements to ensure all outputs meet applicable compliance standards. Method 300 may further include feedback loop mechanisms, as indicated by the dashed lines extending from compliance engine 310 back to modular bot orchestration 306 and from an audit and analytics module back to PII redaction engine 304. These feedback loops enable the system to route compliance outcomes, user edits, and operational data back to earlier processing stages through feedback learning engine 141 for continuous refinement of bot selection logic, orchestration rules, privacy processing routines, and compliance heuristics.

Figure 4:
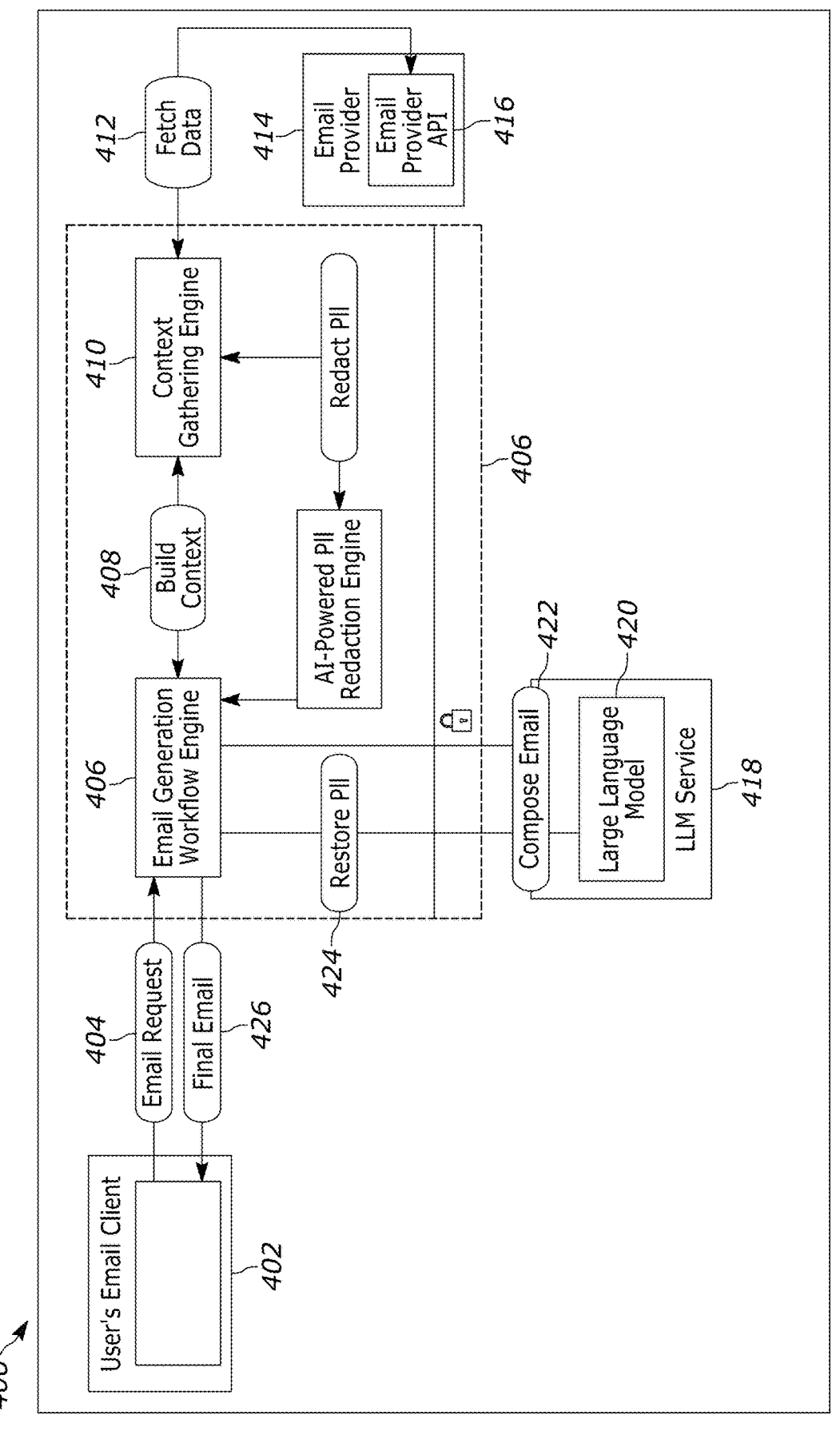
FIG. 4 depicts a flow diagram of an example email generation process within a Hamachi AI Secure Environment, in accordance with various aspects herein.

Referring now to FIG. 4, FIG. 4 depicts an example method 400 providing a high-level overview of an exemplary secure, context-driven email generation workflow implemented by agentic AI framework 100. In some embodiments, the secure processing boundary 406 ("SPB 406") described in FIG. 4 may implement end-to-end encryption, key-based access control, and role-based authorization to satisfy SOC-2, ISO 27001, or equivalent security frameworks.

Within SPB 406, email generation workflow engine 408 coordinates all processing stages, including building context, gathering context, redacting PII, and composing the final email, while maintaining strict isolation between PII handling and model inference. The SPB 406 ensures complete audit trail documentation and provenance tracking across all processing stages of method 400 and supports cryptographic integrity checks on stored communications and audit logs maintained in datastore 125. The SPB 406 further ensures that smart tag-to-real PII mappings remain exclusively within the processing boundary, such that step 428 (e.g., LLM 160 accessed via LLM service) and downstream orchestration logic receive only reversible placeholder tokens without accessing raw identifiers. This architecture enforces separation between identity-bearing data and inference-facing content, maintaining privacy isolation throughout method 400.

Within SPB 406, the email generation workflow engine 408 may coordinate all processing stages, while maintaining strict isolation between PII handling and model inference. The SPB 406 ensures complete audit trail documentation and provenance tracking across all processing stages of method 400 and supports cryptographic integrity checks on stored communications and audit logs maintained in datastore 125. The SPB 406 further ensures that smart tag-to-real PII mappings remain exclusively within the processing boundary, such that LLM 160 and downstream orchestration logic receive only reversible placeholder tokens without accessing raw identifiers. This architecture enforces separation between identity-bearing data and inference-facing content, maintaining privacy isolation throughout method 400.

Method 400 may begin at step 402, where a user's email client initiates an email generation request. In some embodiments, the user's email client may be implemented as a Hamachi Email Add-in integrated with email platform 171 (e.g., Microsoft Outlook, Gmail) operating as platform app 122 on client device 110. In other implementations, the email client integration may be implemented as a native plugin architecture utilizing platform-specific APIs (e.g., Microsoft Graph API for Outlook, Gmail API for Google Workspace), as a cross-platform browser extension compatible with multiple email providers, or as a unified communication interface that aggregates multiple email accounts and platforms within a single user interface. The email generation request may also be initiated through a standalone desktop application, a web-based browser extension, a mobile application add-in, or a cloud-based software-as-a-service (SaaS) interface accessible through standard web browsers.

At step 404, an email request is transmitted from the user's email client to the SPB 406. Integration layer 135 ingests the network communication via computer network 166, performing initial authentication, integrity validation, and format normalization. In some embodiments, this data ingestion and normalization may occur at this stage, or alternatively, may be performed later in the workflow, such as at step 410.

Upon receipt of the email request, email generation workflow engine 408 begins coordinating the subsequent processing stages within SPB 406. At step 410, email generation workflow engine 408 may invoke the context gathering engine 412 (implemented as integration layer 135 and server computing instructions 137, functioning collectively as a context gathering engine 412) to assemble email context including email address, thread history, subject, sender and recipient information, and other metadata.

Integration layer 135 may first ingest and normalize data from the relevant software platform, while server computing instructions 137 may extract, annotate, and structure key context fields for downstream processing. For example, if responding to Bob Wilson, the context gathering engine 412 may retrieve and compile the entire conversation thread, extract sender and recipient roles, correlate referenced CRM records, and link relevant attachments or prior compliance annotations. The resulting assembled context forms a structured context vector that represents both the immediate and historical messaging environment. This enriched context vector is then passed to subsequent modules for privacy cleansing, agentic bot orchestration, and adaptive draft generation, ensuring that downstream personalization and compliance actions are fully informed by user, firm, and situational context.

Figure 9:
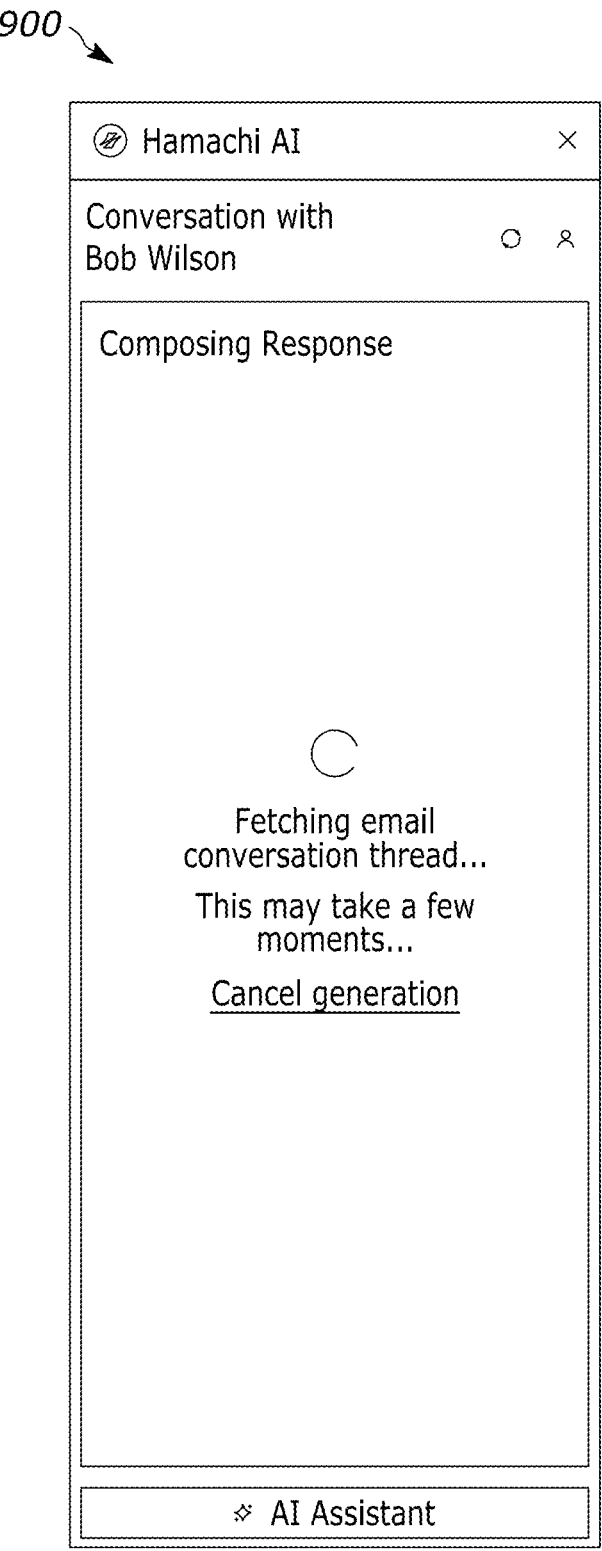
FIG. 9 depicts an exemplary graphical user interface of a Hamachi AI-powered conversational assistant application, illustrating a workflow in which the assistant retrieves an email conversation thread and composes a draft response for the user, in accordance with various aspects herein.

Proceeding to step 414, the context gathering engine 412 may initiate authenticated queries to the email provider 416 (via API 418, or via integration layer 135), to retrieve platform data such as subject lines, full prior message body, recipient lists, file attachments, and persistent thread identifiers. For example, as depicted in GUI 900 of FIG. 9, if the request is in response to a prior email from Bob Wilson, the context gathering engine 412 may fetch the entire conversation history (e.g., the email thread), sender/recipient roles, and contextualized input is further normalized and staged for privacy evaluation at step 420.

Following data retrieval at step 414, at step 420 ("Redact PII"), the context gathering engine 412 transmit complete message context and associated platform data are transmitted to AI-Powered PII Redaction Engine 424 (e.g., implemented as PII redaction engine 139). AI-Powered PII Redaction Engine 424 may execute the multi-stage privacy processing pipeline (e.g., REGEX matching, NER, SLM logic) to redact PII from email message bodies, headers, and attachments. For example, any instance of the name "Bob Wilson," associated email addresses, phone numbers, and client profile identifiers are replaced by context-aware pseudonym tags (e.g., [PI\_NAME], [PI\_EMAIL], [PI\_PHONE]), and then substituted in the outgoing message draft as neutral placeholders (e.g., "[REDACTED\_NAME]," "[REDACTED\_EMAIL]," and "[REDACTED\_PHONE]"), which in turn yields a "PII Barrier" to enforce strict data privacy within SPB 406.

Figure 10A:
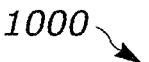
FIG. 10A depicts an exemplary graphical user interface of a Hamachi AI-powered conversational assistant application, illustrating a session in which the assistant is redacting PII during the composition of a response, in accordance with various aspects herein.
Figure 10B:
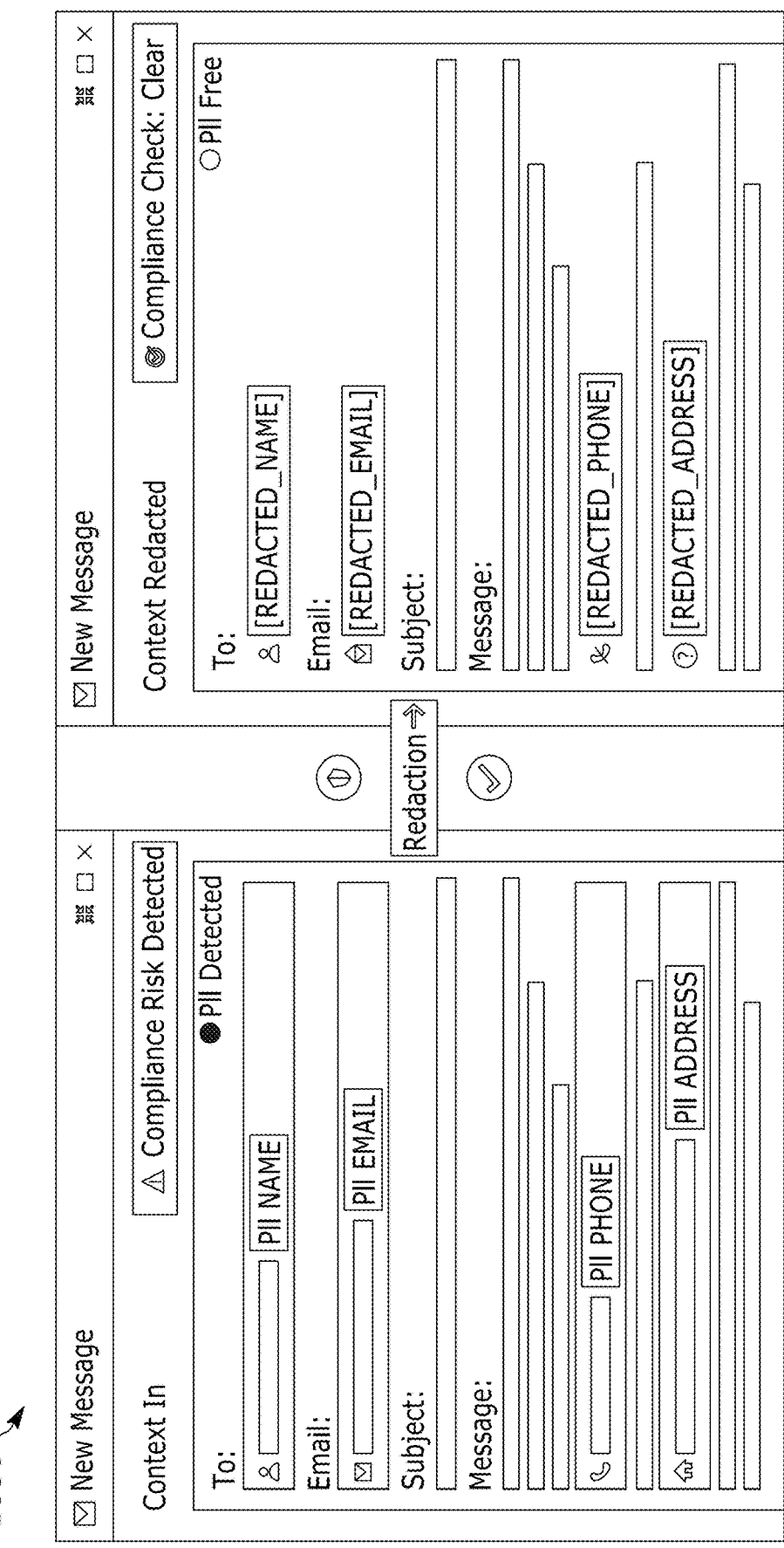
FIG. 10B depicts an exemplary graphical user interface illustrating a side-by-side comparison of email composition states before and after redaction, in accordance with various aspects herein.

FIG. 10A and FIG. 10B illustrate the AI-Powered PII Redaction Engine 424 executing step 420 ("Redact PII"), depicting the real-time redaction of personally identifiable information and the resulting compliance state transition from unredacted to privacy-compliant message content. Referring to FIG. 10A, GUI 1000 shows the AI-Powered PII Redaction Engine 424 in active redaction state (e.g., "Anonymizing PII . . . "), highlighting live sensitive data fields and providing real-time feedback to the user as the PII redaction routine executes. Referring to FIG. 10B, GUI 1050 displays a side-by-side comparison of the input and output of the redaction process. The panel on the left-hand side, titled "Context In" displays the unredacted email, flagging original PII values (e.g., "Bob Wilson," actual email addresses, phone numbers) and flagging the detected compliance risk. On the right-hand side, there is a panel titled "Context Redacted," displaying the post-processing message with all PII converted to generic, neutral tags (e.g., "[REDACTED_NAME]" and "[REDACTED_EMAIL]") and providing a status indicator confirming the communication has passed compliance checks and is now suitable for further processing or transmission in accordance with organizational privacy mandates.

At step 428, following context assembly (e.g., steps 410-418), the structured email content and associated context are routed via server computing instructions 137 outside of SPB 406 to LLM 160 (accessed through LLM service 426) for compliant draft generation (e.g., step 214 of method 200). This architectural separation ensures that LLM 160 operates on privacy-cleansed data containing only reversible placeholder tokens, never accessing raw PII values, thereby maintaining strict privacy isolation between the secure processing boundary and external model inference.

As depicted in FIG. 11, GUI 1100 displays a "Composing Response" state, visually indicating that LLM 160 is analyzing the email context and actively composing a response in real-time. In some aspects, LLM 160 dynamically composes draft emails using conversation context, compliance and brand templates, and workflow attributes extracted from the prior processing stages. For example, LLM 160 produces an email with verbiage such as "Hello [PI\_NAME], thank you for your inquiry about S&P 500 alternatives . . . " with necessary disclosures inserted for regulatory or sponsor compliance, while maintaining the placeholder tags for PII that will be restored in subsequent processing steps within SPB 406.

After draft composition at step 428, method 400 returns within the SPB 406 for PII restoration at step 430. Server computing instructions 137 coordinate with PII redaction engine 139 to restore all pseudonym-tagged data to their original values within the secure processing boundary. For example, each instance of [PI\\_NAME] is securely translated back to "Bob Wilson," and [PI\\_PHONE] to the correct phone number, all within SPB 406, with restoration events fully logged for audit compliance through memory 130 and datastore 125. This restoration process ensures that the final draft output contains actual recipient information while maintaining strict privacy controls throughout the generation workflow, as only placeholder tokens were exposed to LLM 160 during composition. Finally, at step 434, the completed email (integrating restored PII, regulatory language, and historical email thread context) is returned to the user's email client at step 402 (e.g., platform app 122 on client device 110) for review and secure dispatch (e.g., step 262 of method 250).

Figure 5:
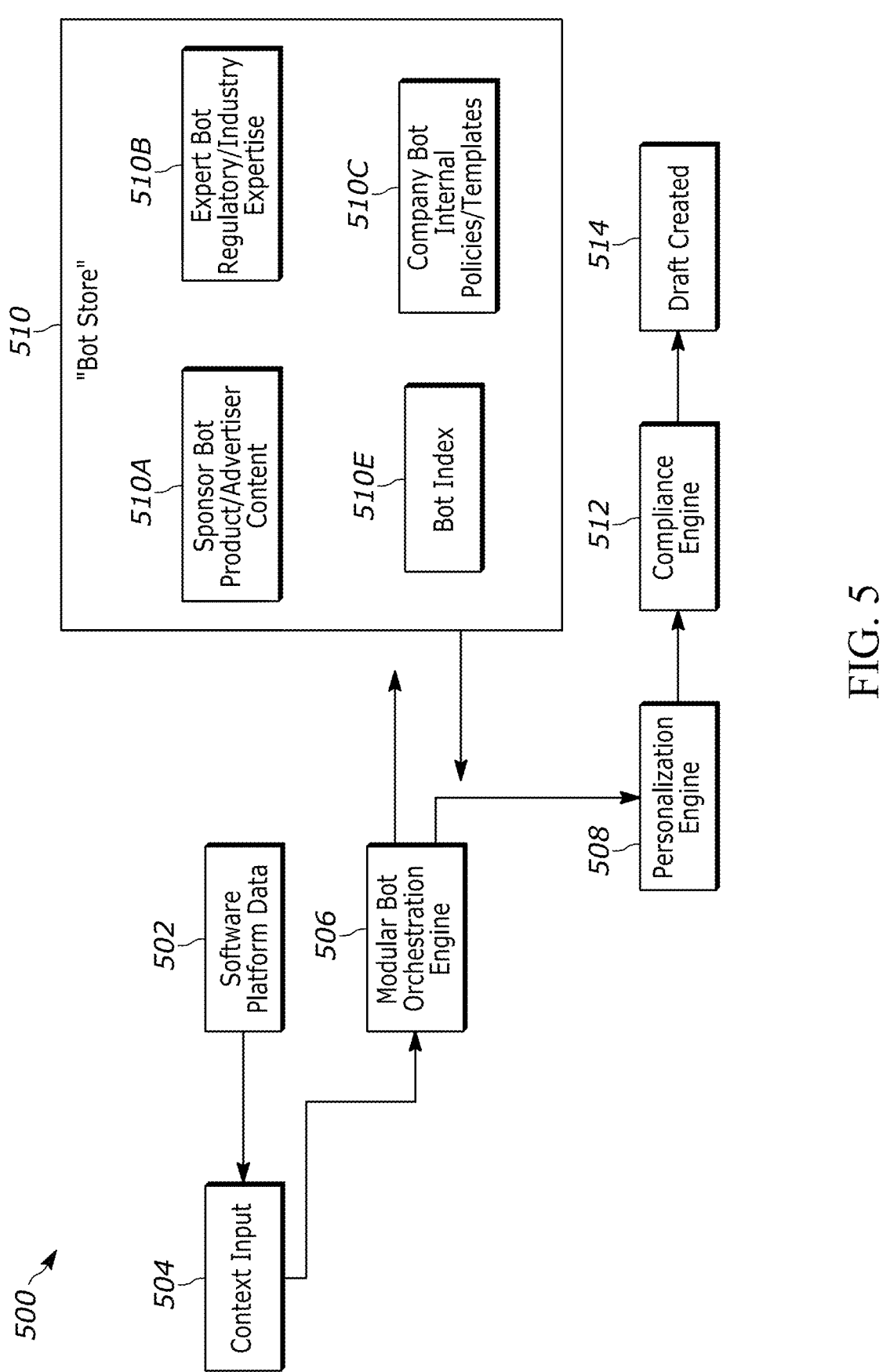
FIG. 5 depicts a block diagram of an example modular bot orchestration system, in accordance with various aspects herein.
Figure 6:
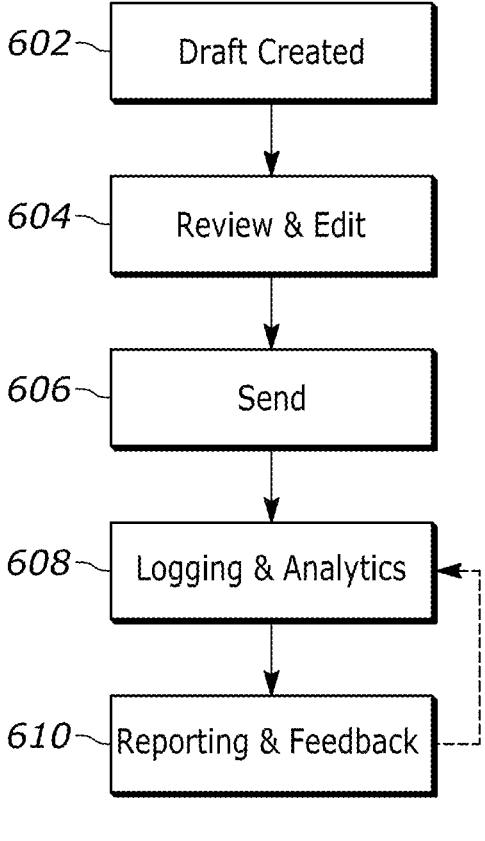
FIG. 6 depicts a flow diagram of an example method for audit and analytics of message workflows, in accordance with various aspects herein.

The subsequent figures (e.g., FIG. 5 and FIG. 6), provide further detail on operational subsystems introduced in FIG. 3 and FIG. 4. FIG. 5 illustrates the architecture and logic of the modular bot-orchestration workflow (e.g., describing the selection, assignment, and sequencing of agentic AI bots in response to contextual inputs). FIG. 6 illustrates the corresponding audit-and-analytics processes, documenting the collection and aggregation of operational, compliance, and user interaction events generated throughout the communication lifecycle by components such as bot orchestration engine 133, compliance engine 143, datastore 125, and feedback learning engine 141.

Referring now to FIG. 5, FIG. 5 depicts a block diagram of an example modular bot orchestration system implementing method 500 within agentic AI framework 100. Method 500 diagram illustrates the architecture and operational flow for dynamic selection, instantiation, and coordination of handler agentic AI bots 131 in response to contextual inputs. Method 500 demonstrates how the modular bot orchestration system receives software platform data 502 and context input 504 as inputs to modular bot orchestration engine 506. Modular bot orchestration engine 506 serves as the central coordination component for managing workflow execution across multiple specialized processing modules.

As illustrated in method 500, modular bot orchestration engine 506 (e.g., bot orchestration engine 133) may receive and process both software platform data 502 and context input 504 to determine which handler agentic AI bots should be dynamically selected and instantiated for the current transaction. Modular bot orchestration engine 506 may reference bot store 510, which may include a registry or repository containing operational metadata, eligibility criteria, configuration parameters, and instantiation logic for multiple types of agentic AI bots available within agentic AI framework 100.

Bot store 510 may include sponsor bot 510A, expert bot 510B, and company bot 510C, each configured to provide specialized outputs based on their respective operational domains and assigned responsibilities. Sponsor bot 510A may be configured with entity-specific content, product information, branding requirements, and sponsor-mandated disclosures for integration into communications where sponsor attribution or product-specific language is required. Expert bot 510B may be configured with regulatory knowledge, compliance rules, industry-specific guidance, and jurisdiction-dependent requirements to ensure generated communications satisfy applicable legal and policy mandates. Company bot 510C may be configured with firm-specific templates, organizational policies, branded tone and style guidelines, and enterprise-approved messaging frameworks to maintain consistency with corporate communication standards.

In method 500, modular bot orchestration engine 506 may dynamically select one or more of sponsor bot 510A, expert bot 510B, and company bot 510C from bot store 510 based on eligibility filtering, context matching, workflow requirements, and policy precedence rules encoded within the orchestration logic. Upon selection, modular bot orchestration engine 506 may instantiate the selected bots in memory 130, configure them with transaction-specific parameters derived from context input 504, and coordinate their execution to generate specialized output fragments. In some embodiments, bot orchestration engine 133 may execute deterministic task assignment and sequencing procedures, binding each selected agentic AI bots 131 to a specific operational role (e.g., contextual enrichment, fact verification, automated disclosure insertion, or sponsor content integration), and ordering bot execution to avoid conflicts (e.g., by precluding operational conflicts and/or non-compliant outcomes). If operational risk thresholds are exceeded and/or a selected agentic AI bot 131 fails or is blocked, bot orchestration engine 133 may invoke fallback logic to substitute a failed/blocked bot with a safe alternative (e.g., a compliance remediation bot), and/or terminate processing as dictated by policy.

Modular bot orchestration engine 506 may interface with personalization engine 508, which adapts content and responses according to user-specific attributes, preferences, communication history, and contextual factors extracted from software platform data 502 and context input 504. Personalization engine 508 may retrieve user profile data, prior interaction records, and preference settings to tailor messaging tone, content emphasis, and presentation style to individual recipients or user groups.

Through method 500, the modular bot orchestration system processes data through these interconnected components to produce draft created 514 as the final output. Draft created 514 may represent a compliant, personalized communication that has been assembled by aggregating and sequencing outputs from the selected agentic AI bots within bot store 510 (e.g., sponsor bot 510A, expert bot 510B, company bot 510C), refined by personalization engine 508 to match user preferences and communication context, and validated by compliance engine 512 to ensure regulatory and policy conformance.

Moreover, in some implementations, bot orchestration engine 133 may merge and normalize outputs generated by concurrently activated agentic AI bots 131, wherein policy precedence logic resolving conflicts across content blocks. These aggregated outputs may be further assembled as engineered prompts for LLM 160 in drafts requiring automated generation, or as compliance-ready message fragments for direct evaluation by compliance engine 143.

Referring now to FIG. 6, FIG. 6 depicts a high-level overview of method 600 for the audit and analytics workflow as implemented in agentic AI framework 100, which may be executed by various components of agentic AI framework 100 (e.g., audit and analytics may be performed by integration layer 135, compliance engine 143, datastore 125, feedback learning engine 141, and (where applicable) display 116) from initial draft creation, review, validation, transmission, and post-send feedback.

Method 600 begins at step 602, where a draft is created. In some embodiments, LLM 160 may generate an initial draft based on engineered prompts, user-authored via platform app 122, or by hybrid approaches wherein outputs from handler agentic AI bots 131 are merged with user-authored content.

Once a candidate draft is assembled at step 602, method 600 may proceed to step 604, wherein the candidate draft undergoes review and editing. In some embodiments users may review, edit, and/or annotate such communications before submission for compliance evaluation.

Upon completion of reviewing and editing, at step 606, the edited draft the candidate draft is sent to its intended via the appropriate communication channel (e.g., one or more software platforms 170).

Prior to transmission, compliance engine 143 may perform multi-point validation: (i) pre-orchestration (e.g., before bots are selected and prompt assembly begins); (ii) post-personalization (e.g., after the communication is tailored for recipient and context); and (iii) pre-send (e.g., immediately before release). At each checkpoint, compliance engine 143 may assess the draft against current regulatory, privacy, and/or enterprise rules, referencing firm policy configurations, jurisdictional mandates, and/or user role requirements. If the draft violates defined thresholds (e.g., missing statutory disclosures, contains prohibited statements, or exhibits any other deficiencies), integration layer 135 may enforce hard blocking, quarantine the draft for remediation, and/or re-route the draft to designated supervisory personnel for further review (based on configured policy thresholds) before transmission proceeds.

During transmission, integration layer 135 may record every outbound transmission event, while datastore 125 may capture a persistent audit trail, including, inter alia, PII detection/redaction events; bot selection and execution sequence; compliance scores and human-readable rationales; inserted disclosures; user/reviewer edits; blocks, overrides, and release decisions; and any post-send discrepancy detected between the approved draft and delivered message, together with timestamps and user attribution.

Following transmission, method 600 may proceed to step 608, where logging and analytics operations are performed. In some embodiments, compliance engine 143 may capture and record multiple categories of audit data including: (i) all PII that has been detected and redacted; (ii) agentic AI bot selection, instantiation, and invocation order along with captured context state and selection rationale; (iii) compliance engine 143 evaluation results including compliance scores and associated rationales that have been generated; (iv) user or reviewer modifications, edits, or annotations that have been applied to message drafts; (v) message blocking, quarantine, override, or release actions that have been taken by compliance checks; (vi) post-send discrepancies that have been detected between transmitted messages and compliance-approved drafts, along with alerts or escalation actions that have been initiated; and (vii) provenance records identifying sponsor, expert, or firm content that has been injected via bot orchestration.

Method 600 may then proceed to step 610, where reporting and feedback activities are conducted. In some embodiments, datastore 125 may aggregate audit records from all communication workflow and provide input to dashboard and reporting interfaces, supervisory reports, trend analyses, and explainability views (e.g., rule-level rationale traces and version comparisons). As depicted in FIG. 23, display 116 may render GUI 2300, an integrated analytics dashboard via display 116 and platform app 122, providing users with engagement metrics including total user counts (e.g., 12,400 users with +15% monthly growth), insights utilization statistics (e.g., 8,320 insights used with +23% monthly growth), and most used topics (e.g., "Inflation Forecasts" with 234 uses). The dashboard may display trending conversation themes in a structured table format showing comparative data between individual user insights and platform-wide usage across topics such as cryptocurrency (340 user insights, 12,500 platform-wide), inflation (290 user insights, 9,100 platform-wide), and taxation (215 user insights, 7,800 platform-wide). The interface may further include knowledge base contribution functionality enabling users to upload research reports, white papers, and insights for AI-powered distribution through a drag-and-drop interface supporting PDF, DOCX, PPTX, and TXT formats, with file management capabilities including visibility controls (e.g., public/private settings), upload tracking with timestamps, and administrative actions (e.g., edit, delete) for contributed content. An integrated chat panel may provide direct access to the AI assistant with predefined action buttons (e.g., "Show analytics," "Generate post") and natural language input capabilities, enabling users to request analytics, generate content, or interact with the system through conversational queries.

In some embodiments, when sponsor bots contribute to the communication, datastore 125 may also aggregate and incorporate sponsor analytics (e.g., content impressions, injection frequency, and/or recipient engagement rates), with attribution linked to the relevant workflow and recipient. Additional analytics may include, inter alia, escalation rates for risk categories, user edit frequencies, and temporal trends in remediation action types, supporting risk management and operational optimization.

As depicted in FIG. 6, a feedback loop extends from step 610 back to earlier stages of method 600, enabling continuous improvement by routing insights, user corrections, compliance findings, and performance data back into the system through feedback learning engine 141.

In some embodiments, feedback learning engine 141 may continuously ingest audit outcomes, analytic signals, compliance violation history, user engagement patterns, and/or supervisory feedback to refine future draft creation at step 602, improve review processes at step 604, and optimize bot orchestration logic and compliance enforcement mechanisms. The feedback learning engine 141 may use these aggregated signals to adjust orchestration eligibility logic in bot orchestration engine 133, refine compliance heuristics and disclosure templates in compliance engine 143, adapt personalization settings in handler agentic AI bots 131, and update privacy triggers in PII redaction engine 139.

In some embodiments, post-send compliance events and recurring errors trigger escalation workflows that feedback learning engine 141 executes, including retraining prompts, user coaching modules, or firm-level risk alerts. For example, if compliance engine 143 detects repeated omission of high-severity regulatory disclosures, feedback learning engine 141 triggers automated retraining of compliance engine 143 rule sets or instigates targeted training for affected users or bot modules. This closed-loop feedback process enables continuous improvement of all adaptive modules within agentic AI framework 100. The combination of audit, analytics, and feedback loops supports compliance with regulatory retention requirements, enables audit replay, facilitates root-cause analysis, and drives ongoing operational enhancement in enterprise deployments.

Referring now to FIG. 2A, an example method 200 generally relates to generating privacy-preserving, context-specific, compliant draft communication using the agentic AI framework 100, in accordance with various aspects herein. At a high level, method 200 involves receiving and ingesting a network communication from one or more sources, such as client device 110 running platform app 122 and/or from software platforms 170 (e.g., email platform processing an inbound email from Bob Wilson), which may validate and normalize both the native platform data and associate user context. The normalized output from integration layer 135 may be transmitted to PII redaction engine 139 for multi-stage redaction of PII.

Upon ingestion, PII redaction engine 139 may execute multi-stage privacy processing pipeline, first executing REGEX matching to remove standard identifiers, then may execute NER to detect names and entities, and finally using a retrainable SLM to redact context-independent and context-dependent PII (e.g., ambiguous codes or industry-specific terms). As further shown in FIG. 4, redacted PII may be replaced with neutral placeholders (e.g., substituting "Bob" with "[REDACTED_NAME]"), and every redaction event may be logged at the message level in memory 130 or datastore 125. Following redaction, server computing instructions 137 may extract and assemble key transactional context (e.g., user identity, workflow tags, product or regulatory references) and aggregate it into a structured context vector associated with the processed communication. In some embodiments, a single model (e.g., a SLM) may perform all or a subset of the detection functions described herein, without requiring distinct REGEX and NER stages.

Upon receiving the structure context vector, bot orchestration engine 133 may reference the bot store, which is a registry containing operational metadata, eligibility logic, and configuration parameters for the set of available agentic AI bots 131 (e.g., sponsor bots 208a, expert bots 208b, and company bots 208c). Bot orchestration engine 133 may evaluate the context vector against bot store criteria to identify and dynamically select the handler agentic AI bots against bot store criteria to identify and dynamically select the handler agentic AI bots most relevant for the specific transaction. Bot orchestration engine 133 may then instantiate and parametrize these bots, passing in the privacy-cleansed content (e.g., output from step 204 by PII redaction engine 139) and the associated context vector as input. Each selected handler agentic AI bot may process this input and return outputs such as compliance annotations, required disclosures, sponsor content, or entity-mandated language. Server computing instructions 137 then aggregate, order, and normalize all bot outputs according to workflow rules, producing an engineered prompt that encodes all necessary compliance, branding, and process logic for subsequent input to LLM 160.

Using this engineered prompt, agentic AI server 150 may transmit the structured, privacy-cleansed input to LLM 160. LLM 160 may process the prompt and generate a candidate draft communication that incorporates all relevant compliance elements, user/firm personalization, and any sponsor-mandated content as specified by upstream handler agentic AI bots 131. The draft output may be output in different modalities (e.g., text, audio, or graphical output), may be transmitted to agentic AI server 150 and/or stored in memory 130 and/or datastore 125, along with associated metadata (e.g., contributing handler bots, prompt version(s), and applied compliance policies).

At step 202, method 200 may include receiving and the initial validation of inbound network communications via integration layer 135, which may ingest data generated for transmission between client device 110 (e.g., platform app 122) and one or more software platforms 170 (e.g., email platform 171, CRM system 172, marketing platform 173, enterprise tools 174, chatbot environment 175, or third party API(s) 176). The platform data may arrive in a variety of native formats, such as an HTML-encoded email from Bob Wilson via email platform 171, a structured JSON record from CRM system 172, or a raw chat log from chatbot environment 175. Integration layer 135 may acquire these inputs through secure APIs over computer network 166, and may perform initial authentication (e.g., validating Bob Wilson's sender credentials and session tokens), integrity validation (e.g., verifying complete message integrity and attachment integrity), and content consistency checks (e.g., parsing multi-recipient data fields, verifying timestamp accuracy, and/or correlating thread identifiers across email and CRM). For example, in the Bob Wilson example, if his email includes attachments or a forwarded thread, integration layer 135 may ensure email attachments not corrupted, thread metadata is preserved, and that network source and recipient identifiers conform to organizational policy before permitting downstream processing. Following these checks, all extracted data (e.g., main message, header information, context metadata, sender-recipient mapping, and/or file attachments) may be normalized into a structured internal schema and routed to downstream modules (e.g., handler agentic AI bots 131, bot orchestration engine 133, PII redaction, and/or LLM 160) for subsequent privacy, compliance, and draft generation steps.

In addition to formatting the native platform data, the integration layer 135 may collect and associate user context necessary for downstream personalization and compliance. As depicted in FIG. 8, integration layer 135 may display the normalized platform data in structured JSON format, showing client information, account details, and opportunity metadata extracted from CRM system 172. For example, "platform data" may include email threads and attachments from an email platform 171; customer records, pipeline statuses, and notes from a CRM system 172; marketing campaign history and analytics from marketing platform 173; chat logs or conversation transcripts from chatbot environment 175; documents and workflow artifacts from enterprise tools 174; as well as any files, logs, or data transmitted or received via relevant third party API(s) 176. User context may include user identity, organizational role, permissions, historical activity, firm profile, prior communication threads, communication thread records, and workflow metadata. Integration layer 135 may retrieve this context by querying CRM records, reviewing messaging logs, or accessing external datastores. For example, if Bob Wilson's prior investment inquiries are stored in CRM system 172 or referenced in previous email threads, integration layer 135 may pull his communication history, advisor assignment, and client status data. Integration layer 135 may then link these attributes to Bob Wilson's current inbound network communication (e.g., email), ensuring that user-specific data (e.g., sender-recipient pairings, communication preferences, historical compliance annotations, transaction status) is available for downstream modules. As depicted in FIGS. 10A and/or 10B, the AI assistant interface may visually indicate to the user that context extraction and data linking are active, showing real-time progress as the integration layer 135 parses and structures all relevant context and metadata associated with the incoming network communication. By maintaining linked user context with the structured platform data, agentic AI framework 100 provides handler agentic AI bots 131, bot orchestration engine 133, and LLM 160 with the necessary contextual signals to generate better personalized, context-sensitive, compliant communications to support role-specific automation in subsequent steps of method 200.

At step 204, after integration layer 135 successfully ingests and normalizes platform data and linked user context, PII redaction engine 139 may initiate a multi-stage privacy processing pipeline on the inbound network communication. Initially, PII redaction engine 139 may apply a REGEX matching routine to detect and redact standard personal identifiers contained within the message or attachments. For example, in the case of Bob Wilson's email, PII redaction engine 139 may detect and redact structured identifiers (e.g., phone numbers, social security numbers, client IDs) present in the email body, subject line, and/or metadata fields. As further shown in FIG. 4, all matches detected by the REGEX matching routine may be removed or replaced with neutral placeholders, and the results of each redaction may be recorded in an audit log associated with the transaction for compliance auditing, diagnostic review, and downstream context tracking.

After REGEX-based redaction, PII redaction engine 139 may execute NER on the message content, headers, and metadata. For example, in an email from Bob Wilson discussing investment options, NER routines may scan the email body, subject line, and any attachment text for person names such as "Bob Wilson," organizational names such as "Hamachi," or "Main Management," geographic terms like "Boston," and other entities commonly present in correspondence. If Bob Wilson's message references a colleague ("Please cc Sarah Park from Main Management on this thread") or mentions sensitive locations ("meeting at our New York branch"), NER will flag and redact "Sarah Park," "Main Management," and "New York," replacing them with neutral placeholders (e.g., [REDACTED_NAME], [REDACTED_ORG], [REDACTED_LOC]). This NER subroutine enables coverage for both sender/recipient names and entities referenced within free-form text or complex multi-recipient workflows, closing privacy gaps that static pattern matching cannot handle. All detected and redacted entities may be logged for compliance traceability and context reassembly in downstream stages.

To further address privacy risks in financial services, insurance, or compliance-driven workflows, PII redaction engine 139 may next deploy a locally installed, retrainable SLM to detect and redact context-dependent or ambiguous identifiers not captured by REGEX and NER. The SLM may analyze message bodies, attachments, and conversation context for entity types such as trade desk nicknames for insurance products (e.g., "Titanium Shield"), custom deal abbreviations for private equity (e.g., "MPF23" indicating a Main Management Portfolio Fund), or specialized role identifiers in KYC updates (e.g., "advisor JJ5" or "client HNW45"). For example, if Bob Wilson's email references "Please coordinate with Joe J. (advisor JJ5) and route to HNW45 for compliance sign-off," the SLM may recognize and redact "advisor JJ5" and "HNW45" even though these are not standard names or numbers. In complex, multi-turn workflows (e.g., multi-party advisor-sponsor chains), the SLM may flag sponsor-side entity codes embedded in message exchanges or abbreviations evolving from firm-specific correspondence.

The local SLM may be further configured to perform entity linking (e.g., associating alternative names, aliases, nicknames, or email addresses with the same logical entity or account) and to attribute each entity to the correct user, client, or account record, even where references are indirect or context-dependent (e.g., associating pronouns or relational phrases such as "my retirement account" with a specific IRA account owner). In some embodiments, the SLM may enable contextual entity resolution by linking financial relationships and/or account mentions that appear across sentences or turn boundaries within a multi-threaded communication. In some embodiments, the SLM may use placeholder harmonization so that each unique entity is consistently mapped to a specific placeholder tag across the entire communication workflow, ensuring no cross-entity confusion and improving audit trail clarity and privacy integrity.

In some embodiments, PII redaction may further support secure rehydration, wherein masked placeholders are restored with original PII values only after completion of all orchestration, compliance, and/or audit procedures within a secure, controlled compute boundary. Accordingly, by combining multi-stage rule-based checks, recognition algorithms, and SLM-based logic for entity linking, account attribution, and harmonized placeholder assignment, this enhanced privacy pipeline may enable adaptive, audit-ready PII redaction that preserves message coherence, supports secure entity handling, and addresses firm-specific and/or jurisdictional requirements. As such, this approach ensures communications are kept clear and private while supporting effective auditability and traceability throughout the workflow, wherein persistent placeholder assignment may preserve referential integrity for downstream modules (e.g., bot orchestration engine 133 and compliance engine 143), enabling privacy-cleansed messages to maintain coherence, logical structure, and consistent entity references for subsequent processing.

GUI 1000 of FIG. 10A depicts the operational state and output of this privacy redaction process, illustrating a user-facing anonymization workflow where PII redaction engine 139 performs automated PII redaction on incoming communication context prior to downstream processing. As shown in GUI 1000, the system anonymizes sensitive identifiers in the message composition in real-time. The SLM's retrainable architecture allows for ongoing adaptation, enabling redaction logic to continuously improve as new entity types, codes, or context patterns are identified through audit processes or explicit user feedback.

As a final measure of step 204, compliance engine 143 may apply additional privacy or jurisdiction-specific redaction rules to the output produced by PII redaction engine 139 when required by regulatory frameworks or contractual obligations. For example, communications subject to GDPR may trigger additional mandatory removal of full addresses, postal codes, or personal contact details from emails or attachments originating from or sent to EU residents, such as Bob Wilson's correspondence if he is a European client. Similarly, state-level insurance marketing laws may require masking of city names or insurance license numbers in messages sent to or from clients in certain jurisdictions. Compliance engine 143 references a mapped set of dynamic jurisdictional rules and, upon detection of applicable triggers in the message metadata or user context, performs further redaction actions (e.g., removing or obfuscating fields such as street addresses, phone numbers, client locations, corporate registration IDs, or regulated policy references), beyond those already redacted in standard privacy processing. These additional redaction events may be recorded in the compliance audit log (e.g., at step 270) to maintain regulatory traceability. This layered and adaptive approach ensures that agentic AI framework 100 maintains ongoing alignment with evolving legal and contractual data privacy requirements, thereby reducing operational and regulatory risk while supporting secure, audit-ready communication workflows.

Figure 15:
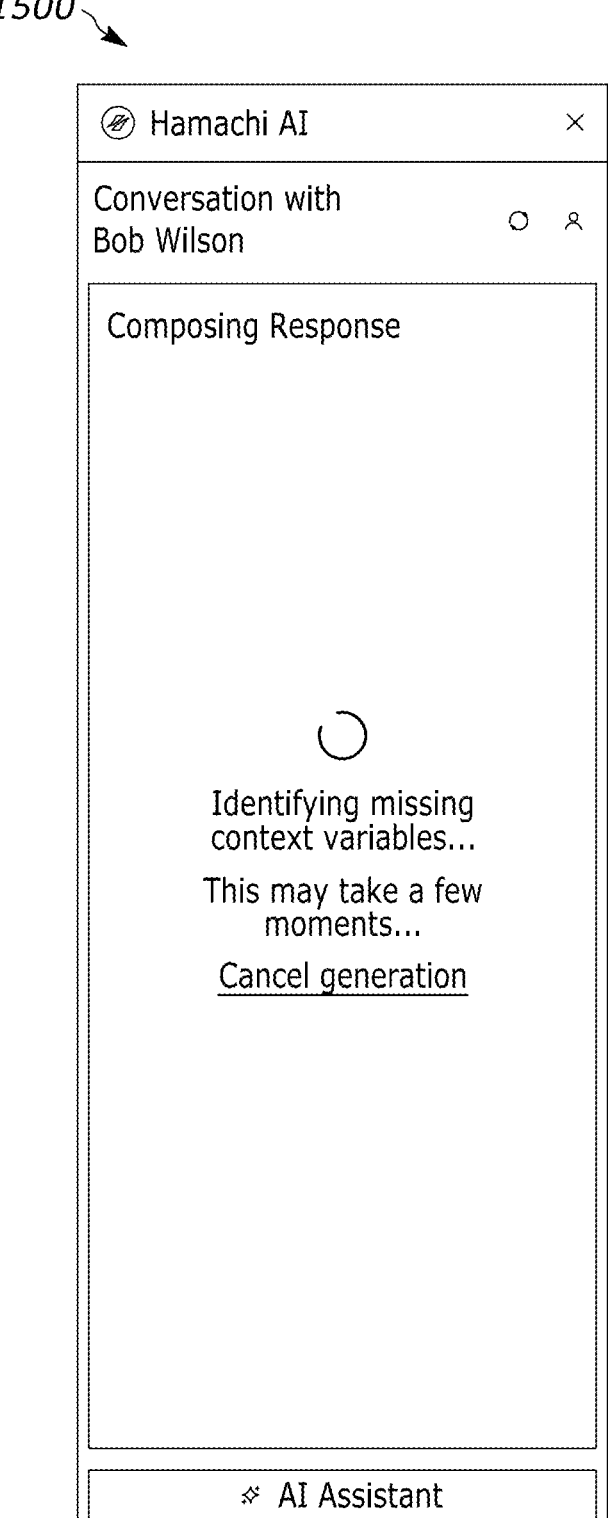
FIG. 15 depicts an exemplary graphical user interface 1500 of a Hamachi AI-powered conversational assistant application, illustrating a session in which the assistant is identifying missing context variables during response composition, in accordance with various aspects herein.

At step 206, after platform data and user context have been redacted by PII redaction engine 139, server computing instructions 137 may extract context data for downstream operations without requiring access to original PII. Server computing instructions 137 may parse structured and unstructured fields, such as sender and recipient roles (e.g., identifying Bob Wilson as a client, the advisor as recipient), workflow metadata ("investment suitability review," "KYC refresh"), message type, timestamps, product or policy references, and relevant thread markers. As depicted in FIG. 15, GUI 1500 displays an "Identifying missing context variables . . . " state, visually indicating that the server computing instructions 137 is analyzing the communication to detect any required context data that may be incomplete or unavailable.

Even with fields like names and contact details redacted, the system may utilize placeholder tags, workflow labels, prior message IDs, or non-PII attributes from normalized metadata to determine operational context and conversation structure. This process may also leverage conversation history, role labels, regulatory categories, and firm-specific workflow parameters linked from integration layer 135. The extraction process may normalize these attributes into a structured context vector that captures operational factors, regulatory triggers, user preferences, and/or organizational-specific policies. The resulting context vector, free of direct identifiers but rich in operational and regulatory cues, may be used for subsequent bot orchestration (by bot orchestration engine 133), compliance evaluation (by compliance engine 143), and prompt generation or personalization for LLM 160. This approach improves privacy posture by separating sensitive identifiers from process-critical workflow signals, allowing compliant, automated downstream handling even in scenarios where all direct personal data elements have been removed.

At step 208, bot orchestration engine 133 may use the structured, PII-cleansed context vector (from step 206), produced by the server computing instructions 137 to programmatically access and evaluate the set of the agentic AI bots 131 stored in memory 130 of the server 150. Bot orchestration engine 133 may reference the "bot store," which may be implemented as a registry or directory listing all available agentic AI bots, with each entry specifying operational metadata, stakeholder assignment, eligibility logic, workflow rules, bot function (e.g., sponsor bots 208*a*, expert bots 208*b*, company bots 208*c*), and configuration parameters such as activation conditions, data requirements, or subscription details. In some embodiments, the bot store may further support sponsor-configured or subscription-based agentic AI bots, where bot availability and priority are governed by commercial logic such as impression limits, licensing terms, tiered access, or contract-based entitlements.

In some embodiments, some agentic AI bots (e.g., sponsor bots), may be dynamically ranked or selected based on sponsor bidding logic, contextual relevance scoring, contractual requirements, or other business factors, permitting prioritization of specific entities or products within the workflow. Bot orchestration engine 133 may additionally implement a ranking or auction-based selection mechanism that evaluates eligible sponsor bots based on one or more criteria such as contextual relevance, engagement performance, bid value, or brand priority rules, while ensuring compliance policies take precedence over sponsor placement. Additionally, in some implementations, the set of agentic AI bots 131 may be configured to access third-party data or content providers (e.g., Zacks, Morningstar, or Bloomberg) when assembling outputs and/or performing context-aware analysis, in accordance with entitlement checks, API integration parameters, and applicable data policy constraints. In certain configurations, the set of agentic AI bots (e.g., which may be configured as expert or sponsor bots) may also invoke third-party data and content providers (e.g., financial research APIs) when supplementing content or performing context-aware analysis, subject to entitlement checks and data policy constraints.

For each transaction (e.g., financial inquiry from Bob Wilson), orchestration engine 133 may compare the extracted context data against the operational logic, context rules, and eligibility parameters defined in each bot store entry. This evaluation determines which bots are required for the current workflow instance. For example, matching workflow type, sender and recipient roles, regulatory triggers, product references, and message metadata.

In response to the matching process, bot orchestration engine 133 may (i) instantiate new agentic AI bot instances in memory 130 as required by the context; (ii) update the operational parameters for an existing bot already allocated in memory 130; or (iii) instantiate a bot using configuration data from an external provider if dictated by context or workflow policy.

For example, if the context vector indicates the need for a bot that is not currently present in memory 130, bot orchestration engine 133 may instantiate a new agentic AI bot instance (e.g., creating a sponsor bot tasked with generating rotation-strategy disclosures for a financial product inquiry from Bob Wilson). Alternatively, if an agentic AI bot of the required type is already allocated in memory 130, bot orchestration engine 133 may update the bot's operational parameters (e.g., assigning the bot to operate on a new workflow instance, updating regulatory configuration, or injecting additional context from the current transaction) so it processes the new context appropriately without requiring re-allocation. Alternatively, if workflow policy or extracted context require specialized logic (e.g., sponsorship, compliance, or language support provided by a third party or external system) bot orchestration engine 133 may instantiate a bot using configuration data, rules, or entity profiles fetched from an external provider or subscription service. In such cases, configuration or runtime metadata (e.g., current regulatory rules, updated product templates, or sponsor-specific verbiage) may be retrieved on demand and embedded in the bot instance as part of its initialization.

Once instantiated or updated, bot orchestration engine 133 may supply each active agentic AI bot 131 with contextually relevant, privacy-cleansed input for the bot's operation. As discussed, this approach ensures that the system only allocates memory and computing resources for the necessary set of agentic AI bots required by the business logic, regulatory state, and specific workflow attributes of the current communication, supporting efficient, context-adaptive processing throughout the cycle.

After selecting and activating the relevant handler agentic AI bots for the transaction (e.g., a sponsor bot and an expert bot for Bob Wilson's investment inquiry), bot orchestration engine 133 may collect, aggregate, and sequentially organize their generated outputs. For example, this may include specialized disclosure language from the sponsor bot (e.g., product-specific rotation strategy details), compliance annotations or risk warnings from the expert bot, personalization fragments from company bots, or workflow escalations as dictated by business rules. Bot orchestration engine 133 may manage priority logic or execution dependencies (e.g., as ensuring compliance language is appended before sponsor disclosures or that required disclaimers appear in mandated sequence) based on internal workflow policies, regulatory order, or external orchestration instructions. Bot orchestration engine 133 may resolve conflicts or missing dependency blocks (e.g., if a compliance annotation is missing for a sponsor disclosure) by applying fallback logic, escalating, or recursively invoking additional bots if allowed by operational policy.

Bot orchestration engine 133 may aggregate and normalize these outputs into a consolidated, structured set of content fragments, each tagged with metadata denoting its role (e.g., regulatory disclosure, sponsor language, compliance annotation, risk statement, workflow escalation, or user personalization instruction). The engine sequences these fragments according to predetermined workflow logic, business rules, and policy-mandated order, resolving any dependency requirements or content conflicts identified during aggregation.

This structured output packet may then be prepared as input for prompt construction at step 212, where server computing instructions 137 assemble the fragments into an engineered prompt for LLM 160. The prompt, comprised solely of privacy-cleansed, context-driven fragments, encodes all firm, regulatory, sponsor, and workflow requirements necessary for compliant message generation. This ensures that when LLM 160 generates a draft output, LLM 160 receives every mandated disclosure, compliance element, sponsor attribution, and contextual instruction required by the operational, legal, and business demands described throughout the agentic AI framework 100.

At step 212, server computing instructions 137 may construct an engineered prompt by systematically aggregating and synthesizing the normalized outputs received from the set of handler agentic AI bots 131 selected in step 208 by bot orchestration engine 133. For example, in the Bob Wilson scenario, the sponsor bot may contribute up-to-date rotation-strategy disclosure language for S&P 500 alternatives, while the expert bot may output SEC- and FINRA-mandated compliance commentary and risk notices. Each bot's fragment (e.g., sponsor verbiage, compliance annotation, firm-branded disclaimers, or personalized tone specification) may be encoded using a predefined prompt template or tokenization schema, ensuring compatibility with LLM 160 requirements.

Server computing instructions 137 may order these fragments according to business logic and regulatory sequence, remove redundancies, and ensure all role- or jurisdiction-specific components are included. As depicted in FIG. 11, GUI 1100 may display a "Composing Response" state, visually indicating real-time aggregation and assembly of required talking points and compliance elements as the prompt is built. The result is a single, structured, privacy-cleansed prompt that encapsulates all regulatory, sponsor, and firm-mandated messaging requirements, prepared for downstream LLM-based draft generation.

During prompt construction, server computing instructions 137 may concatenate additional metadata fields, contextual vectors, and regulatory triggers ensuring that all information necessary for compliance requirements, firm policy enforcement, and workflow-driven personalization are represented in the engineered prompt. For the Bob Wilson example, metadata may indicate the request originated from a client regarding an S&P 500 alternative, with compliance flags for SEC review and sponsor disclosure.

Server computing instructions 137 may enforce sequence control and apply logic rules to maintain the correct order of prompt components, guaranteeing that compliance disclosures precede sponsor language, risk statements are not omitted, and required regulatory text appears in mandated sequence. Server computing instructions 137 may also manage prompt size, ensuring it stays within LLM 160 token capacity, and resolve any inter-bot dependencies or conflicts (e.g., preventing duplicate or mutually exclusive content), so that the final prompt is both complete and properly structured for downstream draft generation.

If context data or bot outputs indicate the need for dynamic augmentation (e.g., injecting time-sensitive language, jurisdiction-specific legal requirements, current financial product details, or the latest compliance disclaimers), server computing instructions 137 may retrieve supplemental configuration, template fragments, or regulatory rules from memory 130 or, if required, access linked external data sources. For example, if Bob Wilson's inquiry concerns a product available only in certain states or one with newly updated sponsor disclosures, the system may pull the most recent mandated language or regional compliance clause and append it to the prompt. All dynamically added elements may be further normalized and integrated with existing prompt components, ensuring that LLM 160 receives a sequenced, and privacy-cleansed set of structured instructions, supporting accurate and regulation-aligned draft generation regardless of operational variability or recent policy change.

At step 214, the agentic AI server 150 may use server computing instructions 137 to transmit the full assembled engineered prompt, compiled in step 212 using outputs from the set of selected agentic AI bots 131 via bot orchestration engine 133, as input to the LLM 160. The engineered prompt presents LLM 160 with a complete, privacy-cleansed, and context-sequenced set of instructions that may include compliance disclosures, sponsor language, workflow directives, and any personalized elements relevant to the communication, such as those required for Bob Wilson's investment inquiry.

LLM 160 may process this prompt using advanced natural language generation algorithms and tokenization logic, interpreting role tags, context cues, regulatory mandates, and templated fragments to synthesize a coherent, compliant, and context-sensitive message draft. For example, the generated draft may include proper rotation-strategy sponsor language, mandatory SEC or FINRA risk statements, and client-specific personalization while preserving firm policy hierarchy. Once LLM 160 produces the draft (e.g., email), server computing instructions 137 may receive and record the output, routing it for further compliance evaluation, anomaly or error checking, and audit logging in accordance with subsequent steps specified in the workflow and consistent with the process outlined in FIG. 2B (e.g., method 250). At this stage, as depicted in FIG. 12, display 116 may render GUI 1200 to indicate that the AI draft composition is underway, such as displaying a "Drafting email with AI . . . " progress banner and real-time activity feedback during the LLM generation process at step 214.

Finally, at step 214, LLM 160 may generate a draft output (e.g., client email reply to Bob Wilson, an internal compliance review message), personalized for the user, recipient, and specific workflow, while maintaining full adherence to organizational policies and regulatory requirements. The generated draft may be returned in a variety of structured formats, including, but not limited to text, audio, graphical markup, or alternative modalities as dictated by the workflow scenario or user profile. The example in method 200 above describes email, but the same framework supports multiple output modalities, such as SMS, voice transcriptions, or structured data for record entry.

Upon receipt, agentic AI server 150 may store the draft in memory 130 or datastore 125, linking each result to associated prompt metadata, including model version, generation timestamp, context vector, and the specific handler agentic AI bots 131 involved in the prompt assembly.

Moving now to FIG. 2B, an example method 250 generally relates to evaluating, enforcing, and auditing compliance of network communications generated by the agentic AI framework 100, according to various aspects herein. At a high level, method 250 may include receiving a draft output (e.g., the engineered output from LLM 160 as described in step 214 in method 200), scoring the output for compliance using a configurable set or rules, policies, regulatory mandates, client-specific requirements, and/or organizational workflows. Compliance Engine 143 may determine whether the draft outputs generated by LLM 160 meet all necessary, detect violations/deficiencies, blocking or quarantining non-compliant draft outputs (if necessary). if violations or deficiencies are detected (e.g., disclosures, improper language, or nonconforming sponsor statements), compliance engine 143 may block the draft, quarantine it for further review, or auto-correct by inserting mandatory content prior to approval.

Flagged or non-compliant drafts may be presented to users through platform app 122 for manual review, editing, and corrective annotation. All such actions, as well as compliant approvals, are logged in memory 130 or datastore 125, ensuring persistent traceability. Audit logs may be used for real-time post-send compliance monitoring, policy trend analysis, and to inform continuous workflow improvements through feedback learning engine 141. Integration layer 135 may facilitate both inbound compliance checks and outbound log consolidation with data archived for regulatory response, operational reporting, or system retraining, as described in FIG. 1.

At a high level, method 250 may include receiving a draft output generated by LLM 160 and/or handler agentic AI bots 131 (e.g., a personalized, compliance-tagged response to Bob Wilson's investment inquiry), then triggering automated compliance checks using compliance engine 143 under direction of server computing instructions 137. Compliance engine 143 may evaluate the draft by scoring it against a cascade of rule sets, which may encode jurisdiction-specific regulatory requirements (e.g., SEC or FINRA for Bob Wilson's inquiry), firm-mandated policy templates, and scenario- or client-specific mandates (e.g., product disclosures required for particular S&P 500 alternatives). If compliance engine 143 identifies missing disclosures, improper phrasing, out-of-sequence regulatory language, or any other policy violation, it may block the draft from further transmission, automatically quarantine it for additional review, or inject required sponsor, regulatory, or risk disclosures as needed to bring the message into compliance before release.

Referring to the Bob Wilson example, if compliance engine 143 flags the draft response for any deficiency, the non-compliant message may be routed to client device 110 for user review. The user may approve, correct, edit, or annotate the flagged message as required by policy or context. After revisions are made, compliance engine 143 may re-evaluate the updated draft to confirm all criteria are now met before authorizing approval and downstream transmission. Throughout every edit, decision, and outcome in this compliance workflow, method 250 may persistently log actions, interventions, approvals, and compliance states in memory 130 or datastore 125, creating a detailed, audit-ready record for future regulatory reporting and operational traceability. Simultaneously, every compliance evaluation event, user intervention, audit trail update, or final message disposition (e.g., review, correction, and approval of Bob Wilson's draft) may be persistently stored in memory 130 and/or datastore 125.

After the finalized, compliance-approved draft (e.g., final response to Bob Wilson's inquiry) has been transmitted to its intended recipient via the appropriate software platform, feedback learning engine 141 may analyze the complete set of audit log records, user edits, and compliance outcomes associated with the transaction. This data may be used to refine agentic AI bot decision logic, update regulatory rule retrieval routines, and improve the heuristics used by bot orchestration engine 133 for selecting relevant bots in future workflows. Additionally, feedback learning engine 141 may process engagement metrics, user interventions, and outcome data in post-send learning cycles to retrain handler agentic AI bots 131 and adjust selection logic for subsequent transactions. By coordinating, applying, and recording these updates across all relevant engine components, method 250 enables agentic AI framework 100 to maintain robust, adaptive, and auditable compliance workflows, supporting ongoing regulatory certification, operational transparency, automated risk reduction, and system explainability.

At step 252, method 250 may begin with compliance engine 143 receiving a draft message generated by LLM 160, which has been assembled from the outputs of the set of handler agentic AI bots 131. For example, this draft might be the response to Bob Wilson's investment product inquiry, containing sponsor-mandated language, SEC/FINRA-required disclosures, and personalized content as dictated by the workflow. Compliance engine 143 may apply one or more configurable, hierarchical rule sets to the draft, referencing jurisdictional regulatory mandates (e.g., SEC or FINRA rules for investment messages about S&P 500 alternatives), organization-wide policies, and any client- or product-specific stipulations flagged earlier in upstream steps in methods 200 and 250. Server computing instructions 137 may coordinate the compliance evaluation, instructing compliance engine 143 to parse the draft for required legal and regulatory language, ensure all sponsor and firm disclosures are present and positioned correctly, validate risk or forward-looking statements, and confirm that the overall message conforms to organizational standards for language, formatting, tone, and external requirements.

At step 254, compliance engine 143 may initiate advanced validation checks on the draft. This may include verifying that the draft content structurally aligns with required communication templates (e.g., those mandated for investment inquiries from clients like Bob Wilson). Compliance engine 143 may parse the draft to confirm all relevant agentic AI bot outputs have been properly integrated, checking for required sponsor language blocks generated by sponsor bots (e.g., mandated S&P 500 disclosure paragraphs), context-driven regulatory guidance from expert bots (e.g., risk language, forward-looking disclaimers), and company bot personalization. Compliance engine 143 may detect and flag unauthorized, outdated, or prohibited content (e.g., deprecated sponsor attributions, references to retired products, unsupported investment advice, or previously blacklisted phrases). Such cases may include detection of template mismatches that arise if an old template is mistakenly invoked for a new regulation, hybrid-document workflows (e.g., combining CRM and email records where only partial context is available), or overlapping output blocks where two bots inject similar content. As depicted in FIG. 14, GUI 1400 displays a "Checking compliance . . . " state, visually indicating that compliance engine 143 is actively evaluating the draft output against applicable regulatory rules and organizational policies in real-time. Compliance engine 143 may parse the draft to confirm all relevant agentic AI bot outputs have been properly integrated . . . .

Further checks may involve referencing workflow and historical context, like confirming thread continuity (e.g., Bob Wilson's follow-up referencing prior compliance approvals), verifying continuity of sponsor or risk language across message chains, and ensuring all temporal requirements are met (e.g., referencing the most up-to-date regulatory text or compliance version applicable at the time of message generation). Compliance engine 143 may cross-validate time stamps or version tags on each inserted fragment, and trace prior thread annotations or audit markers to ensure current draft alignment with historical communication and regulatory context.

Figure 13:
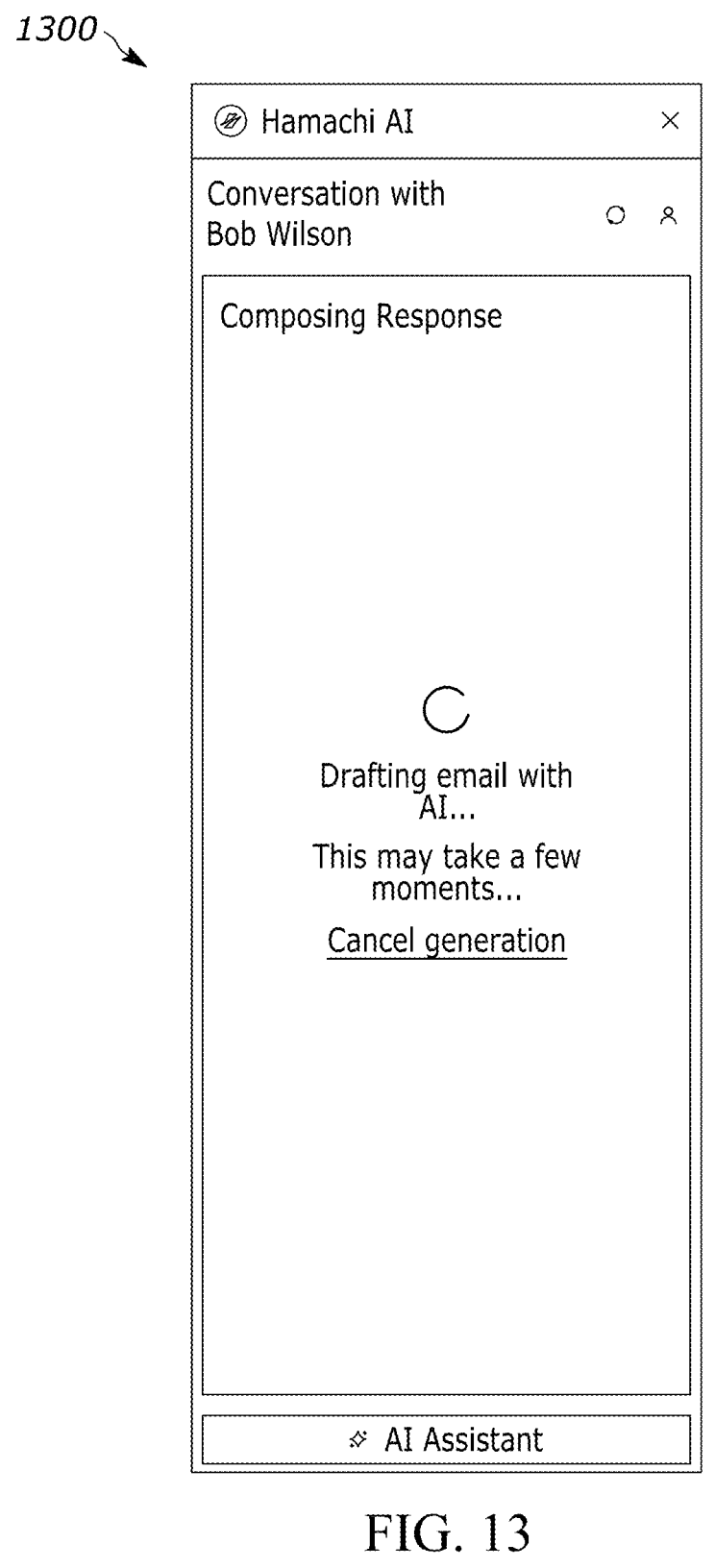

Compliance engine 143 may generate a structured compliance score for the draft output, denoting the status of each rule or requirement (e.g., pass or fail), recording each identified compliance issue, and logging these results to memory 130 or datastore 125 for audit and downstream gating. Display 116 may show the compliance check state in real-time to the user, providing progress status, detected compliance issues, and confirmation banners as depicted in GUI 1300 of FIG. 13.

At decision 256, compliance engine 143 may evaluate the structured compliance score and granular rule evaluation results performed at step 254 to make a final determination as to whether the draft output fully complies with all active regulatory, organizational, and client-specific requirements. Compliance engine 143 may review each rule and content block for pass/fail indicators, verifying that all required regulatory disclosures, sponsor attributions, legal statements, and mandated risk warnings are present, accurate, and positioned correctly within the draft. This evaluation may also account for additional context-driven compliance criteria, including jurisdictional language or disclaimers (e.g. state-specific insurance notices for an email to Bob Wilson if required), unique client mandates, or recent regulatory changes flagged earlier in the workflow. Compliance engine 143 may also handle instances where there are overlapping or ambiguous compliance triggers (e.g., a communication simultaneously referencing products regulated by more than one authority), multiple workflow paths converging in a single communication, or conditional requirements where certain content is mandated only under specific thresholds or transaction types. Decision 256 may use these contextual signals, alongside static rule results, to render a binary (e.g., pass/fail) or graduated compliance outcome (e.g., warning), which in turn controls subsequent routing, either approving the draft for downstream delivery or blocking/quarantining it for further review and remediation.

Figure 16A:
FIG. 16A depicts an exemplary graphical user interface of Hamachi AI-powered conversational assistant application, illustrating a session in which the assistant presents a draft email marked as compliant for user review and provides options for email submission, in accordance with various aspects herein.
Figure 16B:
FIG. 16B depicts a graphical user interface Hamachi AI-powered conversational assistant application, illustrating a session in which the assistant presents a draft email marked as not compliant, in accordance with various aspects herein.

If, at decision 256, compliance engine 143 determines that the draft output fails to satisfy one or more regulatory, organizational, or client-specific requirements (e.g., step 256a), compliance engine 143 may block transmission of the draft, route it to a quarantine state for further action, or require remediation before approval. Compliance engine 143 generates a structured review compliance report that is rendered to the designated user via display 116 on client device 110 or platform app 122. The compliance report, as depicted in FIGS. 16A and 16B, may enumerate each instance of a violation, pinpoints the location of each violation within the draft, and provides recommendations to remediate the violation.

Conversely, if, at decision 256, compliance engine 143 determines that the draft output meets all required regulatory, organizational, and client-specific compliance criteria (e.g., step 256b), compliance engine 143 may authorize the draft for downstream transmission. Before release, compliance engine 143 may append any required jurisdictional, regulatory, or sponsor-mandated language needed to align the message with the recipient's location or transaction specifics (e.g., inserting a jurisdiction-specific disclosure relevant to Bob Wilson's investment inquiry). Server computing instructions 137 and integration layer 135 may flag the finalized and approved draft as compliant, and transmit the draft to the designated recipient or platform. As depicted in FIG. 16A, platform app 122 may render GUI 1600 to visually indicate the draft's compliant status and readiness for secure dispatch, confirming to the user that all necessary compliance and disclosure elements are included.

Figure 18:
FIG. 18 depicts an exemplary graphical user interface of Hamachi AI-powered conversational assistant application for an adaptive feedback loop, showing how user edits and compliance overrides propagate updates to orchestration logic, prompt structures, and compliance heuristics, in accordance with various aspects herein.

At step 258, regardless of whether compliance engine 143 has scored the draft as compliant or non-compliant at decision 256, agentic AI server 150 may present the draft output on client device 110 via platform app 122 or display 116 for user review and remediation. As illustrated in FIG. 18, GUI 1800 illustrates an adaptive feedback loop workflow, showing how users can review draft emails alongside referenced source documents. In some implementations, GUI 1800 may display both the generated draft content and the underlying source material (e.g., "Main-Mgt-Sector-Rotation-Benefits.pdf"), enabling users to verify accuracy, provide corrections, and submit feedback that propagates updates to orchestration logic, prompt structures, and compliance heuristics through feedback learning engine 141.

If the draft is flagged for compliance issues at step 258, platform app 122 may surface annotated problem areas with inline explanations and guided remediation instructions. As illustrated in FIG. 16B, GUI 1650 may display a "not compliant" status banner, enumerate specific failed regulatory or policy rules, and visually highlight exact segments of the draft where mandated language is missing or misplaced. In FIG. 17A, GUI 1700 may display medium-severity findings such as omitted risk disclosures or misaligned legal disclaimers may be cross-referenced to their triggering rule (e.g., "SEC Rule 206(4)-1"), enabling targeted correction. As shown in FIG. 17B, GUI 1750 may alternatively display high-severity violations (e.g., implied guarantees, promissory language, unqualified performance claims) may require mandatory revision before progression, with the system displaying clear severity indicators and corrective guidance.

At step 260, as depicted in FIG. 20, agentic AI server 150 may initiate audit logging for each communication following user review and editing at step 258. Server computing instructions 137 may produce a granular, immutable audit record in memory 130 and/or datastore 125, capturing the entire compliance lifecycle (e.g., all evaluations performed by compliance engine 143, user-initiated revisions, system-inserted disclosures, or workflow escalations). Each record may further include, inter alia, metadata such as sender and recipient identifiers, workflow context, timestamps, applied regulatory and sponsor rule versions, or full version histories for all draft revisions. The audit record may further enumerate, inter alia, every agentic AI bots 131 selection and execution sequence, associated rationales, all user and reviewer annotations, blocking/override/quarantine events, and any post-send discrepancies or escalation triggers. Each compliance decision, scoring outcome, and remediation suggestion may be cross-referenced with its originating rule set, ensuring explainability and transparency for regulators, auditors, and internal reviewers.

As shown in GUI 2100 of FIG. 20, users (e.g., audit and compliance officers) may access these logs through a user interface that lists all generated communications, their current state (e.g., "Draft," "Used," or "Quarantined"), and provides drill-down access to full compliance histories, thus enabling end-to-end visibility, traceability, and governance of AI-assisted communications. In some aspects, GUI 2100 illustrates an example audit-logging interface within platform app 122 showing generated and transmitted communications managed by the agentic AI framework 100. GUI 2100 provides a searchable table of system-generated emails and associated metadata such as sender, recipient, date, and status (e.g., Draft, Used, Quarantined). Each entry corresponds to a persistent audit record in datastore 125, enabling authorized users to review message-level compliance outcomes, version history, and rule-set references for traceability and governance.

The audit records generated at step 260 (and displayed in produce a traceable history of all compliance and workflow events associated with each processed network communication. These records support downstream audit inspection by users (e.g., compliance officers and authorized administrators), enable regulatory compliance verification during internal or external reviews, and power dashboard reporting such as that depicted in GUI 2100 in platform app 122. Additionally, the structured audit data may be accessed by feedback learning engine 141 for continuous retraining and optimization of handler agentic AI bots 131, adjustment of orchestration logic in bot orchestration engine 133, and refinement of privacy policies and routines in PII redaction engine 139. This system-wide access to event-level audit history ensures that all agentic AI framework 100 components maintain alignment with regulatory mandates, operational requirements, and ongoing enterprise policy adaptation.

At step 262, once audit logging is completed, server computing instructions 137 may transmit the finalized draft output to the designated recipient(s) (e.g., Bob Wilson) by invoking integration layer 135 to determine and utilize the correct delivery interface. For example, the finalized draft output may be transmitted as an email via email platform 171, updated record in CRM system 172, posted to marketing platform 173, forwarded to chatbot environment 175, or delivered to another specified channel, as dictated by workflow context and message routing metadata.

During transmission (e.g., step 262), server computing instructions 137 may capture recipient details, channel or platform identifier, draft version, transmission timestamp, delivery status codes, and confirmation receipts. These delivery records are associated with the original audit entry and can be accessed and visualized through the audit dashboard shown in GUI 2100.

At step 264, as depicted in GUI 2000 of FIG. 20, compliance engine 143 may perform a post-send compliance check upon completion of transmission at step 262. Compliance engine 143 may retrieve each delivered message from integration layer 135, reconstruct its corresponding audit record from datastore 125, and compare the delivered message against the last compliance-approved draft stored prior to transmission (e.g., at decision 256). The post-send compliance check performed by compliance engine 143 may include byte-level and field-level comparison to confirm that no unauthorized alterations (e.g., removal of mandatory regulatory disclosures, modification of risk warnings, or insertion of unapproved or prohibited content occurred during or after delivery across any connected platform (e.g., email platform 171). Compliance engine 143 may cross-verify all message metadata, timestamps, and delivery receipts, and may, where applicable, validate message integrity by digital signature or cryptographic hash-based attestation.

As further depicted in FIG. 20, GUI 2000 (on display 116 and/or platform app 122, in conjunction with datastore 125) may render an interactive post-send compliance analytics interface that aggregates post-transmission evaluation results. In some aspects, GUI 2000 may display overall compliance metrics such as volumes of messages processed, issues prevented, and disclosures added to outbound communications, as well as present flagged messages categorized by risk level, regulatory rule type, user, and delivery channel. Each flagged record may provide a navigable link to the underlying audit entry in datastore 125, enabling reviewers and authorized compliance personnel to trace the complete compliance chain from content creation through message transmission. In some embodiments, the analytics interface may further operate as a compliance intelligence layer, generating trend analytics to identify recurring policy or regulatory rule breaches, user- or entity-specific risk signals, frequency of mandatory modifications, and disclosure efficacy rates across communication types.

In addition to operational visibility and support for explainable auditing, the analytics interface may further relay compliance telemetry and trend data to feedback learning engine 141 to drive automated policy optimization, continuous compliance rule-set refinement, and proactive governance.

If, at decision 266, compliance engine 143 detects any discrepancies and/or violations during the post-send compliance check (e.g., as described in step 264), the method proceeds to step 270. At step 268, the user may edit the communication and address the identified compliance issues, with all edits and compliance outcomes recorded in datastore 125 for audit purposes. The compliance outcomes may include user corrections, override decisions, remediation actions taken, and final compliance status.

At step 270, compliance engine 143 may alert the user and/or compliance officer of the detected discrepancies or violations. The alert may include detailed information about the nature of the violation, the specific regulatory rule or policy that was breached, the location of the discrepancy within the delivered message, and recommended corrective actions. As depicted for FIGS. 19A and/or 19B, the alert may be presented via display 116 on client device 110 or platform app 122, providing the designated user with actionable information to review and remediate the flagged communication.

If compliance engine 143 detects a discrepancy (e.g., detected delivered message differs from the compliance-approved) and/or violations (e.g., missing disclosure, unauthorized edits, or integrity failures), compliance engine 143 may record a violation or discrepancy event, flag the communication for further review, and update the compliance audit log in datastore 125, as shown for FIGS. 19A and/or 19B. In response to a detected discrepancy or violation, compliance engine 143 may trigger an alert to the designated user at step 268, presenting the flagged message and required actions (similarly described in 256a), such that the designated user may review and correct the issue as specified. This post-send monitoring process enables continuous validation and detection of compliance issues from draft approval through external delivery, providing the basis for automated alerting, escalation, corrective workflows, and iterative system learning as outlined elsewhere in the agentic AI framework 100.

Following user notification and remediation at step 270, the method proceeds to step 272, where feedback learning engine 141 may aggregate the compliance outcomes, user edits, violation patterns, and remediation actions from step 268 into a system learning and feedback module. At step 272, feedback learning engine 141 may analyze the collected data to identify recurring compliance issues, user intervention patterns, false positive rates, and opportunities for system optimization. This analysis may include statistical evaluation of compliance rule effectiveness, identification of ambiguous policy areas requiring clarification, and detection of emerging compliance risks not adequately covered by existing rule sets.

At step 274, based on the analysis performed at step 272, feedback learning engine 141 may initiate retraining of compliance engine 143 and prompt logic used by bot orchestration engine 133 and server computing instructions 137. The retraining process may include updating compliance rule sets to address newly identified violation patterns, refining compliance scoring algorithms to reduce false positives or negatives, adjusting prompt engineering templates to better incorporate compliance requirements, updating handler agentic AI bots 131 to generate more compliant outputs, and modifying orchestration logic to prioritize compliance-critical content. Each retraining action may be versioned, logged, and benchmarked against historical performance metrics to ensure continuous improvement of the agentic AI framework 100's compliance capabilities.

Conversely, if at decision 266, no discrepancies or violations are detected during the post-send compliance check, the method may proceed directly to step 272 for routine system learning and feedback processing, where feedback learning engine 141 may analyze successful compliance outcomes to reinforce effective patterns and optimize system performance.

Additional Aspects of the Disclosure

The following provides non-limiting example aspects of the disclosure herein.

Aspect 1. An agentic artificial intelligence (AI) bot system configured to implement secured networked communications, the agentic AI bot system comprising: a server comprising one or more processors and one or more memories; a set of agentic AI bots each configurable for instantiation in the one or more memories of the server, each agentic AI bot accessible by the one or more processors of the server, a bot orchestration engine configured to programmatically access the set of agentic bots, an integration layer communicatively coupled to the bot orchestration engine and exposing one or more application programming interfaces (APIs) accessible, via a computer network, by one or more software platforms, computing instructions stored on the one or more memories that, when executed by the one or more processors of the server, cause the one or more processors to: (a) ingest, by the integration layer, a network communication via the computer network, the network communication generated for transmission between a client device and a software platform of the one or more software platforms, wherein the network communication comprises platform data generated by the software platform, (b) extract context data from the platform data, the context data comprising one or more data attributes of the network communication, (c) dynamically select from the set of agentic AI bots, by the bot orchestration engine and based on the context data, one or more handler agentic AI bots detected as operable for the network communication, (d) dynamically generate an engineered prompt for a large language model (LLM), wherein the engineered prompt comprises one or more portions each generated as output by each of the one or more handler agentic AI bots, (e) generate, by providing the engineered prompt as input to the LLM, a draft output, (f) analyze the draft output to identify omissions or errors, (g) transmit the draft output to the client device, and (h) receive feedback data from the client device, the feedback data defining updates or corrections to the draft output.

Aspect 2. The agentic AI bot system of aspect 1, further comprising a feedback learning engine, wherein the computing instructions, when executed by the one or more processors of the server, further cause the one or more processors to: input the feedback data in the feedback learning engine, wherein the feedback learning engine updates at least one of: (a) one or more of the handler agentic AI bots based on the feedback data to adjust outputs of the one or more portions each generated as output by each of the one or more handler agentic AI bots; or (b) the bot orchestration engine to select additional or different handler agentic bots as selected from the set of agentic AI bots.

Aspect 3. The agentic AI bot system of aspect 2, wherein at least one agentic AI bot comprises a personalized agentic AI bot allocated in memory for a given user, wherein the computing instructions, when executed by the one or more processors of the server, further cause the one or more processors to: update the personalized agentic AI bot based on the feedback data with one or more entity preferences identified within the feedback data for the user.

Aspect 4. The agentic AI bot system of aspect 2, wherein at least one agentic AI bot comprises a sponsor agentic AI bot allocated in memory for a given entity, wherein the sponsor agentic AI bot has been trained with entity data or instructions, wherein the computing instructions, when executed by the one or more processors of the server, further cause the one or more processors to: update the sponsor agentic AI bot based on the feedback data with one or more additional or different entity data or instructions identified within the feedback data for the entity.

Aspect 5. The agentic AI bot system of aspect 1-4, wherein each agentic AI bot of the set of agentic AI bots comprises a microservice programmatically accessible via an application programming interface (API).

Aspect 6. The agentic AI bot system of aspect 1-5, wherein one or more agentic AI bots of the set of agentic AI bots is instantiated in the memory when it is fetched and instructed by the bot orchestration engine by least one of: (a) updating an existing agentic AI bot instance with new data and/or parameters; (b) creating a new AI bot instance in response to the context data received via the integration layer; or (c) instantiating an agentic AI bot based on third-party data or subscription profile managed by an external data provider, wherein instantiation is triggered by the bot orchestration engine.

Aspect 7. The agentic AI bot system of aspect 1-6, wherein one or more agentic AI bots of the set of agentic AI bots is deallocated after at least one of: (a) providing output, or (b) not being accessed after a preset time period by the bot orchestration engine.

Aspect 8. The agentic AI bot system of aspect 1-7 further comprising a personal identifiable information (PII) redaction engine, wherein the computing instructions, when executed by the one or more processors of the server, further cause the one or more processors to: generate a redacted version of the platform data by removing PII from the platform data, where the context data is extracted from the redacted version of the platform data.

Aspect 9. The agentic AI bot system of aspect 8, wherein the PII redaction engine comprises a multi-stage privacy processing pipeline configured to sequentially apply a plurality of privacy detection and removal mechanisms, each operable to redact personal identifiable information from the platform data, including at least one of: (a) regular expression matching, (b) named entity recognition, (c) a small language model (SLM), or (d) a locally installed, retrainable SLM.

Aspect 10. The agentic AI bot system of aspect 8, wherein a compliance engine is further configured to apply one or more policies based on jurisdiction-specific or client-specific policy rules.

Aspect 11. The agentic AI bot system of aspect 8, wherein the computing instructions, when executed by the one or more processors of the server, further cause the one or more processors to generate and store, in the memory, an audit log of detected personal identifiable information for each processed network communication.

Aspect 12. The agentic AI bot system of aspect 1-11, wherein the platform data is in a native platform format provided from the software platform, and wherein extracting the context data comprises formatting the native platform format to create a structured data format for input into any one or more of: the one or more handler agentic AI bots, the bot orchestration engine, or the LLM.

Aspect 13. The agentic AI bot system of aspect 1-12, wherein the computing instructions, when executed by the one or more processors of the server, further cause the one or more processors to: obtain data from an entity or user via the integration layer from external and internal data sources, including customer relationship management (CRM) systems, format the data to a structure data format compatible with at least one agentic AI bot instantiated in the memory, and provide the agentic AI bot with the structured data format to modify an agentic AI bot's response generation.

Aspect 14. The agentic AI bot system of aspect 8, wherein the structured data format comprises natural language or natural language tokens comprise text-based tokens.

Aspect 15. The agentic AI bot system of aspect 1-14, wherein the draft output comprises one or more of: (a) text; (b) an audio output; (c) a graphical output, or (e) a video output.

Aspect 16. The agentic AI bot system of aspect 1-15, wherein the computing instructions (137), when executed by the one or more processors of the server, further cause the one or more processors to: implement one of: (a) visibly flag the draft output as blocked or quarantined based on one or more regulatory rules; or (b) augment the draft output for compliance with the one or more regulatory rules.

Aspect 17. The agentic AI bot system of aspect 1-16, wherein the one or more regulatory rules are stored in and dynamically accessed by the handler agentic AI bots from a rules datastore, and wherein updates to the rules datastore causes modification of the one or more portions as output by the one or more handler agentic AI bots.

Aspect 18. The agentic AI bot system of aspect 1-17, wherein the one or more software platforms comprise: (a) an enterprise email platform, (b) a customer relationship management (CRM) platform, (c) a collaboration platform, (d) a chat platform, (e) a marketing platform, (f) a portfolio management platform, (g) a trading platform, (h) a billing platform, (i) an accounting platform, (j) a content management system (CMS), (k) a document management platform, (l) an SMS platform, (m) a broadcast email platform, (n) an application programming interface (API) endpoint, or (o) any combination thereof.

Aspect 19. The agentic AI bot system of aspect 1-18, wherein platform data comprises data generated, stored, transmitted, or processed by any of the one or more software platforms, the data including communications, transaction data, account information, user profiles, documents, workflow metadata, or activity logs.

Aspect 20. The agentic AI bot system of aspect 1-19, wherein the context data comprises data, including one or more of: (a) user profile data; (b) firm profile data; (c) message content; (d) workflow context; or (e) customer relationship management (CRM) data; or (f) software platform data, wherein the context data is obtained during processing of the network communication, the context data obtained by at least one of: (i) by dynamic retrieval across the computer network; or (ii) by accessing stored information on a local memory by the one or more processors.

Aspect 21. The agentic AI bot system of aspect 8, wherein the PII redaction engine further comprises: replacing each PII element with a unique placeholder prior to LLM processing, and restoring each placeholder tag to its original value within a secure environment before output transmission, replacing each detected PII element with a unique placeholder tag prior to processing by the LLM, and restoring each placeholder tag to its corresponding original value within a secure processing environment prior to output transmission, wherein the LLM processes only the placeholder tags and never accesses the original PII values.

Aspect 22. The agentic AI bot system of aspect 10, wherein the compliance engine is further configured to: compute a weighted compliance score across multiple risk categories for the draft output, compare the weighted compliance score against configurable policy thresholds, and gate message transmission based on whether the weighted compliance score satisfies the configurable policy thresholds.

Aspect 23. The agentic AI bot system of aspect 10, wherein the compliance engine generates remediation actions including: (i) advisory remediation actions that provide guidance without blocking message transmission, and (ii) mandatory remediation actions that prevent message transmission until compliance requirements are satisfied, wherein only failure to address mandatory remediation actions blocks progression of a communication workflow.

Aspect 24. The agentic AI bot system of aspect 3, wherein the bot orchestration engine further comprises: applying deterministic precedence rules when aggregating outputs from multiple handler agentic AI bots.

Aspect 25. An agentic artificial intelligence (AI) bot system configured to implement secured networked communications, the agentic AI bot system comprising: a server comprising one or more processors and one or more memories, a set of agentic AI bots each configurable for instantiation in the one or more memories of the server, each agentic AI bot accessible by the one or more processors of the server, a bot orchestration engine configured to programmatically access the set of agentic bots, an integration layer communicatively coupled to the bot orchestration engine and exposing one or more application programming interfaces (APIs) accessible, via a computer network, by one or more software platforms, computing instructions stored on the one or more memories that, when executed by the one or more processors of the server, cause the one or more processors to: (a) ingesting, by the integration layer, a user-drafted network communication from a client device, wherein the user-drafted network communication comprises platform data generated by the software platform, (b) extract context data from the platform data, the context data comprising one or more data attributes of the user-drafted network communication, (c) dynamically select from the set of agentic AI bots, by the bot orchestration engine and based on the context data, one or more handler agentic AI bots detected as operable for the user-drafted network communication, (d) analyze the user-drafted network communication, by the one or more handler agentic AI bots, for compliance with one or more regulatory rules, (e) implement one of: (i) visibly flagging, by the one or more handler agentic AI bots, the user-drafted network communication as blocked or quarantined based on a determination that the user-drafted network communication fails to comply with one or more regulatory rules, whereby transmission of the user-drafted network communication is prevented until corrective action is taken, or (ii) augmenting, by the one or more handler agentic AI bots, the user-drafted network communication to include modifications, required disclosures, or annotations necessary to bring the user-drafted network communication into compliance with the one or more regulatory rules, wherein the augmented user-drafted network communication is enabled for transmission to the client device, (f) receive feedback data from the client device, the feedback data defining updates or corrections to the user-drafted network communication.

Aspect 26. A computer-implemented method configured to implement secured networked communications, the computer-implemented method comprising: (a) ingesting, by an integration layer, a network communication via a computer network, the network communication generated for transmission between a client device and a software platform of the one or more software platforms, wherein the network communication comprises platform data generated by the software platform, (b) extracting context data from the platform data, the context data comprising one or more data attributes of the network communication, (c) dynamically selecting from a set of agentic AI bots, by a bot orchestration engine and based on context data, one or more handler agentic AI bots detected as operable for the network communication, (d) dynamically generating an engineered prompt for a large language model (LLM), wherein the engineered prompt comprises one or more portions each generated as output by each of the one or more handler agentic AI bots, (e) generating, by providing the engineered prompt as input to the LLM, a draft output, (f) analyzing the draft output to identify omissions or errors, (g) transmitting the draft output to the client device, and (h) receiving feedback data from the client device, the feedback data defining updates or corrections to the draft output.

Aspect 27. The computer-implemented method of aspect 26, further comprising: inputting feedback data into a feedback learning engine, wherein the feedback learning engine updates at least one of: (a) one or more of the handler agentic AI bots based on the feedback data to adjust outputs of the one or more portions each generated as output by each of the one or more handler agentic AI bots; or (b) the bot orchestration engine to select additional or different handler agentic bots as selected from the set of agentic AI bots.

Aspect 28. The computer-implemented method of aspect 26, further comprising: updating a personalized agentic AI bot based on the feedback data with one or more entity preferences identified within the feedback data for a user.

Aspect 29. The computer-implemented method of aspect 26, further comprising: updating a sponsor agentic AI bot based on the feedback data with one or more additional or different entity data or instructions identified within the feedback data for the entity.

Aspect 30. The computer-implemented method of aspect 26, further comprising: instantiating one or more agentic AI bots in the memory when it is fetched and instructed by the bot orchestration engine by at least one of: (a) updating an existing agentic AI bot instance with new data and/or parameters; (b) creating a new agentic AI bot instance in response to context data received via the integration layer; or (c) instantiating an agentic AI bot based on third-party data or a subscription profile managed by an external data provider, wherein instantiation is triggered by the bot orchestration engine.

Aspect 31. The computer-implemented method of aspect 26, further comprising: deallocating one or more agentic AI bots after at least one of: (a) providing output, or (b) not being accessed after a preset time period by the bot orchestration engine.

Aspect 32. The computer-implemented method of aspect 26, further comprising: generating a redacted version of the platform data by removing personally identifiable information (PII) from the platform data using a PII redaction engine, wherein the context data is extracted from the redacted version of the platform data.

Aspect 33. The computer-implemented method of aspect 32, further comprising: applying, by the PII redaction engine, a multi-stage privacy processing pipeline configured to sequentially apply a plurality of privacy detection and removal mechanisms, each operable to redact personal identifiable information from the platform data, including at least one of: (a) regular expression matching, (b) named entity recognition, (c) a small language model (SLM), or (d) a locally installed, retrainable SLM.

Aspect 34. The computer-implemented method of aspect 32, further comprising: applying, by a compliance engine, one or more policies based on jurisdiction-specific or client-specific policy rules.

Aspect 35. The computer-implemented method of aspect 32, further comprising: generating and storing an audit log of detected personally identifiable information for each processed network communication.

Aspect 36. The computer-implemented method of aspect 26, further comprising: formatting platform data in a native platform format provided in the software platform to create a structured data format for input into any one or more of: the one or more handler agentic AI bots, the bot orchestration engine, or the LLM.

Aspect 37. The computer-implemented method of aspect 26, further comprising: obtaining data from an entity or user via the integration layer from external and internal data sources, including customer relationship management (CRM) systems, formatting the data to a structure data format compatible with at least one agentic AI bot instantiated in the memory, and providing the agentic AI bot with the structured data to modify the agentic AI bot's response generation.

Aspect 38. The computer-implemented method of aspect 26-37, further comprising: implementing one of: (a) visibly flagging the draft output as blocked or quarantined based on one or more regulatory rules, or (b) augmenting the draft output for compliance with the one or more regulatory rules.

Aspect 39. The computer-implemented method of aspect 26-38, further comprising: storing one or more security or regulatory rules in a rules datastore, and dynamically accessing the rules by the handler agentic AI bots from the rules datastore, and modifying one or more portions output by the one or more handler agentic AI bots.

Aspect 40. The computer-implemented method of aspect 32, wherein the PII redaction further applies a reversible tagging process, comprising: replacing each PII element with a unique placeholder prior to LLM processing, and restoring each placeholder tag to its original value within a secure environment before output transmission.

Aspect 41. The computer-implemented method of aspect 32, wherein the PII redaction engine further comprises: replacing each PII element with a unique placeholder prior to LLM processing, and restoring each placeholder tag to its original value within a secure environment before output transmission, replacing each detected PII element with a unique placeholder tag prior to processing by the LLM, and restoring each placeholder tag to its corresponding original value within a secure processing environment prior to output transmission, wherein the LLM processes only the placeholder tags and never accesses the original PII values.

Aspect 42. The computer-implemented method of aspect 34, wherein the compliance engine is further configured to: compute a weighted compliance score across multiple risk categories for the draft output, compare the weighted compliance score against configurable policy thresholds, and gate message transmission based on whether the weighted compliance score satisfies the configurable policy thresholds.

Aspect 43. The computer-implemented method of aspect 34, wherein the compliance engine generates remediation actions including: (i) advisory remediation actions that provide guidance without blocking message transmission, and (ii) mandatory remediation actions that prevent message transmission until compliance requirements are satisfied, wherein only failure to address mandatory remediation actions blocks progression of a communication workflow.

Aspect 44. The computer-implemented method of aspect 28-43, wherein the bot orchestration engine further comprises: applying deterministic precedence rules when aggregating outputs from multiple handler agentic AI bots.

Aspect 45. A computer-implemented method configured to implement secured networked communications, the computer-implemented method comprising: (a) ingesting, by the integration layer, a user-drafted network communication from a client device, the user-drafted network communication comprising platform data generated by a software platform, (b) extracting context data from the platform data, the context data comprising one or more data attributes of the user-drafted network communication, (c) dynamically selecting, from the set of agentic AI bots (131), by a bot orchestration engine (133) and based on the context data, one or more handler agentic AI bots detected as operable for the user-drafted network communication; (d) analyzing, by the one or more handler agentic AI bots, the user-drafted network communication for compliance with one or more regulatory rules; (e) implementing one of: (i) visibly flagging, by the one or more handler agentic AI bots, the user-drafted network communication as blocked or quarantined based on a determination that the user-drafted network communication fails to comply with one or more regulatory rules, whereby transmission of the user-drafted network communication is prevented until corrective action is taken, or (ii) augmenting, by the one or more handler agentic AI bots, the user-drafted network communication to include modifications, required disclosures, or annotations necessary to bring the user-drafted network communication into compliance with the one or more regulatory rules, wherein the augmented user-drafted network communication is enabled for transmission to the client device, and (f) receiving feedback data from the client device, the feedback data defining updates or corrections to the user-drafted network communication.

Aspect 46. A non-transitory computer-readable medium storing processor-executable instructions, that when executed by one or more processors, cause the one or more processors to perform operations comprising: (a) ingesting, by an integration layer, a network communication via a computer network, the network communication generated for transmission between a client device and a software platform of the one or more software platforms, wherein the network communication comprises platform data generated by the software platform, (b) extracting context data from the platform data, the context data comprising one or more data attributes of the network communication, (c) dynamically selecting from a set of agentic AI bots, by a bot orchestration engine and based on the context data, one or more handler agentic AI bots detected as operable for the network communication, (d) dynamically generating an engineered prompt for a large language model (LLM), wherein the engineered prompt comprises one or more portions each generated as output by each of the one or more handler agentic AI bots, (e) generating, by providing the engineered prompt as input to the LLM, a draft output, (f) analyzing the draft output to identify omissions or errors, (g) transmitting the draft output to the client device, and (h) receiving feedback data from the client device, the feedback data defining updates or corrections to the draft output.

ADDITIONAL CONSIDERATIONS

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of ordinary skill in the art will appreciate still additional alternative structural and functional designs for the methods and systems described herein through the disclosed principles herein. Thus, while particular embodiments and applications have been illustrated and described, it is to be understood that the disclosed embodiments are not limited to the precise construction and components disclosed herein. Various modifications, changes, and variations, which will be apparent to those of ordinary skill in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited, and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, which are intended to define the spirit and scope of this invention.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present), and B is false (or not present), A is false (or not present), and B is true (or present), and both A and B are true (or present).

As used herein, "software platform" may include, inter alia, any cloud-based, on-premises, or local application, system, or downloadable add-in, including, but not limited to: enterprise email, CRM, marketing, collaboration, content management, accounting, document management, trading, and chat platforms, as well as downloadable connectors or plugins for such systems. "Platform data" or "software data" includes all data and content generated, accessed, received, transmitted, or processed by such platforms, whether in native or normalized format, such as message payloads, account records, documents, attachments, logs, settings, profiles, user activity streams, or workflow state information exchanged with or by the agentic AI framework. Platform data may further include compliance, supervisory, or regulatory artifacts (e.g., audit records, retention metadata, or message supervision flags) that are integrated or referenced by the framework to support privacy enforcement, explainability, and end-to-end traceability across software environments.

As used herein, "bot store" may include, inter alia, any registry, repository, directory, database, or data structure (i.e., local, remote, or distributed) configured to maintain, organize, and provide access to agentic AI bots 131 for selection and instantiation by bot orchestration engine 133. The bot store may include, but is not limited to, operational metadata (e.g., bot identity, version, role, or description), eligibility criteria (e.g., jurisdictional scope, user permissions, workflow context, or product/license entitlements), configuration parameters (e.g., API endpoints, triggers, and activation thresholds), sponsor or organizational ownership attributes (e.g., entity assignment, branding, or compliance certification), usage statistics, and status indicators. The bot store may support dynamic updates, version tracking, secure onboarding, access controls, or third-party integrations, and may be implemented as part of platform memory, a stand-alone server-side module, or a federated component accessible via APIs. In certain embodiments, the bot store may further maintain policy precedence rules (e.g., compliance>sponsor>personalization) and optional auction or bidding parameters (e.g., keyword targeting, theme weights, bid ceilings, time-based bid windows) enabling bot orchestration engine 133 to apply both eligibility filtering and revenue-aware placement selection when determining which agentic AI bot(s) to instantiate for a particular workflow context.

As used herein, "context data" may include, inter alia, any structured or unstructured information, data attribute, record, or signal derived from communications, user profiles, workflow triggers, software platform data, or associated metadata, that collectively or individually inform, enable, or guide personalization, compliance scoring, bot selection logic, content generation, or automation workflows throughout the agentic AI framework. Context data may further include message content, conversation history, sender and recipient roles, user preferences, organizational attributes, compliance and audit history, workflow state, trigger events, and external or internal platform metadata. The system may extract, normalize, and enrich context data from one or more data sources (e.g., CRM records, platform logs, activity streams, or third-party services) and may utilize such data to drive eligibility filtering, operational role assignment, bot instantiation, rules-based gating, audit logging, or feedback learning within the platform. In certain embodiments, context data used for downstream bot selection, personalization, or compliance evaluation may be generated only after multi-stage PII redaction, and comprises privacy-preserved placeholders, vectorized representations, or structured context features such that raw PII is never exposed to the large language model, the bot orchestration engine 133, or any downstream module outside the secure redaction boundary.

In addition, the use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of ordinary skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

What is claimed is:

1. An agentic artificial intelligence (AI) bot system configured to implement secured networked communications, the agentic AI bot system comprising:
   a server comprising one or more processors and one or more memories;
   a set of agentic AI bots each configurable for instantiation in the one or more memories of the server, each agentic AI bot accessible by the one or more processors of the server,
   a bot orchestration engine configured to programmatically access the set of agentic bots,
   an integration layer communicatively coupled to the bot orchestration engine and exposing one or more application programming interfaces (APIs) accessible, via a computer network, by one or more software platforms,
   computing instructions stored on the one or more memories that, when executed by the one or more processors of the server, cause the one or more processors to:
      (a) ingest, by the integration layer, a network communication via the computer network, the network communication generated for transmission between a client device and a software platform of the one or more software platforms,
      wherein the network communication comprises platform data generated by the software platform,
      (b) extract context data from the platform data, the context data comprising one or more data attributes of the network communication,
      (c) dynamically select from the set of agentic AI bots, by the bot orchestration engine and based on the context data, one or more handler agentic AI bots detected as operable for the network communication,
      (d) dynamically generate an engineered prompt for a large language model (LLM), wherein the engineered prompt comprises one or more portions each generated as output by each of the one or more handler agentic AI bots,
      (e) generate, by providing the engineered prompt as input to the LLM, a draft output,
      (f) analyze the draft output to identify omissions or errors,
      (g) transmit the draft output to the client device, and
      (h) receive feedback data from the client device, the feedback data defining updates or corrections to the draft output.

2. The agentic AI bot system of claim 1, further comprising a feedback learning engine, wherein the computing instructions, when executed by the one or more processors of the server, further cause the one or more processors to:
   input the feedback data in the feedback learning engine,
   wherein the feedback learning engine updates at least one of: (a) one or more of the handler agentic AI bots based on the feedback data to adjust outputs of the one or more portions each generated as output by each of the one or more handler agentic AI bots; or (b) the bot orchestration engine to select additional or different handler agentic bots as selected from the set of agentic AI bots.

3. The agentic AI bot system of claim 2, wherein at least one agentic AI bot comprises a personalized agentic AI bot allocated in memory for a given user, wherein the computing instructions, when executed by the one or more processors of the server, further cause the one or more processors to:

update the personalized agentic AI bot based on the feedback data with one or more entity preferences identified within the feedback data for the user.

4. The agentic AI bot system of claim 2, wherein at least one agentic AI bot comprises a sponsor agentic AI bot allocated in memory for a given entity, wherein the sponsor agentic AI bot has been trained with entity data or instructions, wherein the computing instructions, when executed by the one or more processors of the server, further cause the one or more processors to:
   update the sponsor agentic AI bot based on the feedback data with one or more additional or different entity data or instructions identified within the feedback data for the entity.

5. The agentic AI bot system of claim 1, wherein each agentic AI bot of the set of agentic AI bots comprises a microservice programmatically accessible via an application programming interface (API).

6. The agentic AI bot system of claim 1, wherein one or more agentic AI bots of the set of agentic AI bots is instantiated in the memory when it is fetched and instructed by the bot orchestration engine by least one of: (a) updating an existing agentic AI bot instance with new data and/or parameters; (b) creating a new AI bot instance in response to the context data received via the integration layer; or (c) instantiating an agentic AI bot based on third-party data or subscription profile managed by an external data provider, wherein instantiation is triggered by the bot orchestration engine.

7. The agentic AI bot system of claim 1, wherein one or more agentic AI bots of the set of agentic AI bots is deallocated after at least one of: (a) providing output, or (b) not being accessed after a preset time period by the bot orchestration engine.

8. The agentic AI bot system of claim 1 further comprising a personal identifiable information (PII) redaction engine, wherein the computing instructions, when executed by the one or more processors of the server, further cause the one or more processors to:
   generate a redacted version of the platform data by removing PII from the platform data, where the context data is extracted from the redacted version of the platform data.

9. The agentic AI bot system of claim 8, wherein the PII redaction engine comprises a multi-stage privacy processing pipeline configured to sequentially apply a plurality of privacy detection and removal mechanisms, each operable to redact personal identifiable information from the platform data, including at least one of:
   (a) regular expression matching,
   (b) named entity recognition,
   (c) a small language model (SLM), or
   (d) a locally installed, retrainable SLM.

10. The agentic AI bot system of claim 8, wherein a compliance engine is further configured to apply one or more policies based on jurisdiction-specific or client-specific policy rules.

11. The agentic AI bot system of claim 1, wherein the platform data is in a native platform format provided from the software platform, and wherein extracting the context data comprises formatting the native platform format to create a structured data format for input into any one or more of: the one or more handler agentic AI bots, the bot orchestration engine, or the LLM.

12. The agentic AI bot system of claim 1, wherein the computing instructions, when executed by the one or more processors of the server, further cause the one or more processors to:

obtain data from an entity or user via the integration layer from external and internal data sources, including customer relationship management (CRM) systems, format the data to a structure data format compatible with at least one agentic AI bot instantiated in the memory, and provide the agentic AI bot with the structured data format to modify an agentic AI bot's response generation.

13. The agentic AI bot system of claim 1, wherein the one or more software platforms comprise: (a) an enterprise email platform, (b) a customer relationship management (CRM) platform, (c) a collaboration platform, (d) a chat platform, (e) a marketing platform, (f) a portfolio management platform, (g) a trading platform, (h) a billing platform, (i) an accounting platform, (j) a content management system (CMS), (k) a document management platform, (l) an SMS platform, (m) a broadcast email platform, (n) an application programming interface (API) endpoint, or (o) any combination thereof.

14. The agentic AI bot system of claim 1, wherein the context data comprises data, including one or more of: (a) user profile data; (b) firm profile data; (c) message content; (d) workflow context; or (e) customer relationship management (CRM) data; or (f) software platform data, wherein the context data is obtained during processing of the network communication, the context data obtained by at least one of: (i) by dynamic retrieval across the computer network; or (ii) by accessing stored information on a local memory by the one or more processors.

15. The agentic AI bot system of claim 8, wherein the PII redaction engine further comprises:

replacing each PII element with a unique placeholder prior to LLM processing, and restoring each placeholder tag to its original value within a secure environment before output transmission, replacing each detected PII element with a unique placeholder tag prior to processing by the LLM, and restoring each placeholder tag to its corresponding original value within a secure processing environment prior to output transmission, wherein the LLM processes only the placeholder tags and never accesses the original PII values.

16. The agentic AI bot system of claim 10, wherein the compliance engine is further configured to:

compute a weighted compliance score across multiple risk categories for the draft output, compare the weighted compliance score against configurable policy thresholds, and gate message transmission based on whether the weighted compliance score satisfies the configurable policy thresholds.

17. The agentic AI bot system of claim 10, wherein the compliance engine generates remediation actions including:

(i) advisory remediation actions that provide guidance without blocking message transmission, and (ii) mandatory remediation actions that prevent message transmission until compliance requirements are satisfied, wherein only failure to address mandatory remediation actions blocks progression of a communication workflow.

18. The agentic AI bot system of claim 3, wherein the bot orchestration engine further comprises:

applying deterministic precedence rules when aggregating outputs from multiple handler agentic AI bots.

19. A computer-implemented method configured to implement secured networked communications, the computer-implemented method comprising:

(a) ingesting, by an integration layer, a network communication via a computer network, the network communication generated for transmission between a client device and a software platform of one or more software platforms, wherein the network communication comprises platform data generated by the software platform, (b) extracting context data from the platform data, the context data comprising one or more data attributes of the network communication, (c) dynamically selecting from a set of agentic AI bots, by a bot orchestration engine and based on context data, one or more handler agentic AI bots detected as operable for the network communication, (d) dynamically generating an engineered prompt for a large language model (LLM), wherein the engineered prompt comprises one or more portions each generated as output by each of the one or more handler agentic AI bots, (e) generating, by providing the engineered prompt as input to the LLM, a draft output, (f) analyzing the draft output to identify omissions or errors, (g) transmitting the draft output to the client device, and (h) receiving feedback data from the client device, the feedback data defining updates or corrections to the draft output.

20. The computer-implemented method of claim 19, further comprising:

inputting feedback data into a feedback learning engine, wherein the feedback learning engine updates at least one of: (a) one or more of the handler agentic AI bots based on the feedback data to adjust outputs of the one or more portions each generated as output by each of the one or more handler agentic AI bots; or (b) the bot orchestration engine to select additional or different handler agentic bots as selected from the set of agentic AI bots.

21. The computer-implemented method of claim 19, further comprising:

updating a personalized agentic AI bot based on the feedback data with one or more entity preferences identified within the feedback data for a user.

22. The computer-implemented method of claim 19, further comprising:

updating a sponsor agentic AI bot based on the feedback data with one or more additional or different entity data or instructions identified within the feedback data for the entity.

23. The computer-implemented method of claim 19, further comprising:

instantiating one or more agentic AI bots in a memory when it is fetched and instructed by the bot orchestration engine by at least one of: (a) updating an existing agentic AI bot instance with new data and/or parameters; (b) creating a new agentic AI bot instance in response to context data received via the integration layer; or (c) instantiating an agentic AI bot based on third-party data or a subscription profile managed by an external data provider, wherein instantiation is triggered by the bot orchestration engine.

24. The computer-implemented method of claim 19, further comprising:

deallocating one or more agentic AI bots after at least one of: (a) providing output, or (b) not being accessed after a preset time period by the bot orchestration engine.

25. The computer-implemented method of claim 19, further comprising:

generating a redacted version of the platform data by removing personally identifiable information (PII) from the platform data using a PII redaction engine, wherein the context data is extracted from the redacted version of the platform data.

26. The computer-implemented method of claim 25, further comprising:

generating and storing an audit log of detected personally identifiable information for each processed network communication.

27. The computer-implemented method of claim 19, further comprising:

formatting platform data in a native platform format provided in the software platform to create a structured data format for input into any one or more of: the one or more handler agentic AI bots, the bot orchestration engine, or the LLM.

28. The computer-implemented method of claim 19, further comprising:

implementing one of: (a) visibly flagging the draft output as blocked or quarantined based on one or more regulatory rules, or (b) augmenting the draft output for compliance with the one or more regulatory rules.

29. The computer-implemented method of claim 28, wherein the bot orchestration engine further comprises:

applying deterministic precedence rules when aggregating outputs from multiple handler agentic AI bots.

30. A non-transitory computer-readable medium storing processor-executable instructions, that when executed by one or more processors, cause the one or more processors to perform operations comprising:

(a) ingesting, by an integration layer, a network communication via a computer network, the network communication generated for transmission between a client device and a software platform of the one or more software platforms, wherein the network communication comprises platform data generated by the software platform, (b) extracting context data from the platform data, the context data comprising one or more data attributes of the network communication, (c) dynamically selecting from a set of agentic AI bots, by a bot orchestration engine and based on the context data, one or more handler agentic AI bots detected as operable for the network communication, (d) dynamically generating an engineered prompt for a large language model (LLM), wherein the engineered prompt comprises one or more portions each generated as output by each of the one or more handler agentic AI bots, (e) generating, by providing the engineered prompt as input to the LLM, a draft output, (f) analyzing the draft output to identify omissions or errors, (g) transmitting the draft output to the client device, and (h) receiving feedback data from the client device, the feedback data defining updates or corrections to the draft output.

* * * * *